US012515162B2

(12) United States Patent
Detra et al.

(10) Patent No.: US 12,515,162 B2
(45) Date of Patent: Jan. 6, 2026

(54) FILTER ASSEMBLIES AND ELEMENTS UTILIZING MULTILAYERED AND WRAPPED FILTER MEDIA

(71) Applicant: CUMMINS FILTRATION IP, INC., Columbus, IN (US)

(72) Inventors: Kelly A. Detra, Brooklyn, WI (US); Christopher E. Holm, Madison, WI (US); Mark V. Holzmann, Stoughton, WI (US); Jerald J. Moy, Oregon, WI (US); Scott W. Schwartz, Cottage Grove, WI (US); Ken Tofsland, Stoughton, WI (US); Robert A. Bannister, Ames, IA (US); Jeremiah Cupery, Madison, WI (US); Orvin D. Kendall, Cambridge, WI (US); Matthew Louison, McFarland, WI (US); Dane Philip Miller, Madison, WI (US); Daniel Potratz, Stoughton, WI (US); Yashpal Subedi, Madison, WI (US); Thomas H. Steger, Jr., Cookeville, TN (US); Gregory K. Loken, Stoughton, WI (US)

(73) Assignee: ATMUS FILTRATION IP INC., Nashville, TN (US)

( * ) Notice: Subject to any disclaimer, the term of this patent is extended or adjusted under 35 U.S.C. 154(b) by 795 days.

(21) Appl. No.: 17/637,012

(22) PCT Filed: Aug. 23, 2019

(86) PCT No.: PCT/US2019/047861
§ 371 (c)(1),
(2) Date: Feb. 21, 2022

(87) PCT Pub. No.: WO2021/040676
PCT Pub. Date: Mar. 4, 2021

(65) Prior Publication Data
US 2022/0355235 A1 Nov. 10, 2022

(51) Int. Cl.
*B01D 46/52* (2006.01)
(52) U.S. Cl.
CPC ......... *B01D 46/526* (2013.01); *B01D 46/527* (2013.01); *B01D 2275/206* (2013.01); *B01D 2275/207* (2013.01); *B01D 2275/208* (2013.01)
(58) Field of Classification Search
CPC ....... B01D 46/525–527; B01D 2275/206–208; B01D 2271/022; B01D 2265/026
See application file for complete search history.

(56) References Cited

U.S. PATENT DOCUMENTS 6,953,124 B2   10/2005   Winter et al.
2002/0073668 A1   6/2002   Tokar et al.
(Continued)

FOREIGN PATENT DOCUMENTS

DE   10309661 A1 *  9/2004  ......... B01D 46/0012
EP   2 134 444 B1   12/2009
(Continued)

OTHER PUBLICATIONS

Extended Search Report issued for European Patent Application No. 24189271.0 issued Sep. 17, 2024, 9 pages.
(Continued)

*Primary Examiner* — Robert Clemente
(74) *Attorney, Agent, or Firm* — Foley & Lardner LLP

(57) ABSTRACT

A filter assembly comprises a filter element and an outlet flange. The filter element comprises a filter media pack comprising a plurality of filter media layers stacked on top of each other to form the filter media pack. The filter media pack has an inlet surface being at an inlet portion of the filter media pack, and an outlet surface being at an outlet portion of the filter media pack. An outlet flange is coupled to the outlet portion of the filter media pack.

20 Claims, 43 Drawing Sheets

(56) References Cited

U.S. PATENT DOCUMENTS

| | | | |
|---|---|---|---|
| 2003/0217534 A1* | 11/2003 | Krisko | B01D 50/20 |
| | | | 55/482 |
| 2006/0174598 A1 | 8/2006 | Mills et al. | |
| 2007/0271886 A1 | 11/2007 | Rieger et al. | |
| 2008/0250766 A1* | 10/2008 | Schrage | B01D 46/527 |
| | | | 55/498 |
| 2009/0114590 A1* | 5/2009 | Merritt | B01D 46/527 |
| | | | 210/493.4 |
| 2010/0219139 A1 | 9/2010 | Welch et al. | |
| 2010/0258493 A1* | 10/2010 | Kindkeppel | B01D 46/10 |
| | | | 210/450 |
| 2012/0042616 A1 | 2/2012 | Widerski et al. | |
| 2013/0292875 A1* | 11/2013 | Swanson | B01D 46/2411 |
| | | | 264/255 |
| 2013/0327218 A1 | 12/2013 | Izzi et al. | |
| 2016/0045848 A1 | 2/2016 | Campbell et al. | |
| 2016/0108866 A1 | 4/2016 | Dewit et al. | |
| 2017/0157550 A1* | 6/2017 | Merritt | B01D 39/16 |
| 2017/0333824 A1* | 11/2017 | Merritt | B01D 25/001 |
| 2018/0015402 A1* | 1/2018 | Parsons | B01D 46/0005 |
| 2018/0311605 A1* | 11/2018 | Merritt | B01D 25/24 |
| 2018/0333668 A1* | 11/2018 | Krull | B01D 39/18 |
| 2018/0345201 A1* | 12/2018 | Krull | B01D 46/527 |
| 2021/0362087 A1* | 11/2021 | Lin | B01D 46/0001 |

FOREIGN PATENT DOCUMENTS

| | | |
|---|---|---|
| WO | WO-2014/210541 | 12/2014 |
| WO | WO-2017/055918 | 4/2017 |
| WO | WO-2017/106752 | 6/2017 |
| WO | WO-2018/013577 | 1/2018 |
| WO | WO-2018/081148 | 5/2018 |
| WO | WO-2018/169648 A1 | 9/2018 |
| WO | WO-2019/046614 | 3/2019 |
| WO | WO-2019/060904 A2 | 3/2019 |

OTHER PUBLICATIONS

Supplementary Search Report in European Patent Application No. 19942689.1 issued Apr. 4, 2023.

International Search Report and Written Opinion issued for PCT Application No. PCT/US2019/047861 issued Dec. 13, 2019, 15 pages.

PCT Search Report and Written Opinion issued for PCT Application No. PCT/US2018/048907 issued Jan. 14, 2019, 15 pages.

* cited by examiner

FILTER ASSEMBLIES AND ELEMENTS UTILIZING MULTILAYERED AND WRAPPED FILTER MEDIA

CROSS-REFERENCE TO RELATED APPLICATION

The present application is a National Phase of PCT Application No. PCT/US2019/047861, filed Aug. 23, 2019. The contents of this application are hereby incorporated by reference in their entirety.

TECHNICAL FIELD

The present disclosure relates generally to filters for use with internal combustion engine systems.

BACKGROUND

Internal combustion engines use various fluids during operation. For example, fuel (e.g., diesel, gasoline, natural gas, etc.) is used to run the engine. Air may be mixed with the fuel to produce an air-fuel mixture, which is then used by the engine to run under stoichiometric or lean conditions. Furthermore, one or more lubricants may be provided to the engine to lubricate various parts of the engine (e.g., piston cylinder, crank shaft, bearings, gears, valves, cams, etc.). These fluids may become contaminated with particulate matter (e.g., carbon, dust, metal particles, etc.) which may damage the various parts of the engine if not removed from the fluid. To remove such particulate matter or other contaminants, the fluid is generally passed through a filter assembly (e.g., a fuel filter, a lubricant filter, an air filter, a water filter assembly, etc.) including a filter element structured to remove the particulate matter from the fluid prior to delivering the fluid. Many mounts or structures in which the filter assemblies are installed may be space constrained and have unique shapes, and complex filter element shapes may be desired to accommodate the filter element within such mounting structures.

SUMMARY

Embodiments described herein relate generally to filter assemblies including multilayered or wrapped filter elements having a polymeric layer disposed on sidewalls of a filter media pack of the filter element to form a housing thereof, having indentations defined in the filter media pack, or defining non-circular cross-sections.

In a first set of embodiments, a filter assembly comprises a filter element. The filter element comprises a filter media pack comprising a plurality of filter media layers stacked on top of each other to form the filter media pack, the filter media pack having an inlet surface being at an inlet portion of the filter media pack, and an outlet surface being at an outlet portion of the filter media pack. An outlet flange is coupled to the outlet portion of the filter media pack.

In another set of embodiments, a filter element comprises a core having a non-circular core cross-sectional shape; and a filter media pack comprising a plurality of filter media layers stacked on an outer periphery of the core such that the filter media pack has a filter media pack cross-sectional shape that corresponds to the core cross-sectional shape.

In still another set of embodiments, a filter element comprises a core, a filter media pack comprising a plurality of filter media layers stacked on an outer periphery of the core, and a filter housing. The filter housing comprises a housing portion defining an internal volume within which the filter media pack is disposed, an outer radial surface of the filter media pack bonded to an inner radial surface of the housing portion, and a coupling portion fluidly coupled to the housing portion distal from the filter media pack, the coupling portion defining an opening for allowing fluid to flow therethrough, the coupling portion configured to be coupled to a conduit.

In yet another embodiment, a filter element comprises a filter media pack comprising a plurality of filter media layers stacked on top of each other to form the filter media pack. The filter media pack has an inlet surface at an inlet portion of the filter media pack, and an outlet surface at an outlet portion of the filter media pack.

In still another embodiment, a filter element, comprises a core having a non-circular core cross-sectional shape. A filter media pack comprises a filter media layer wrapped around an outer periphery of the core such that the filter media pack has a filter media pack cross-sectional shape that corresponds to the non-circular core cross-sectional shape.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing in this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
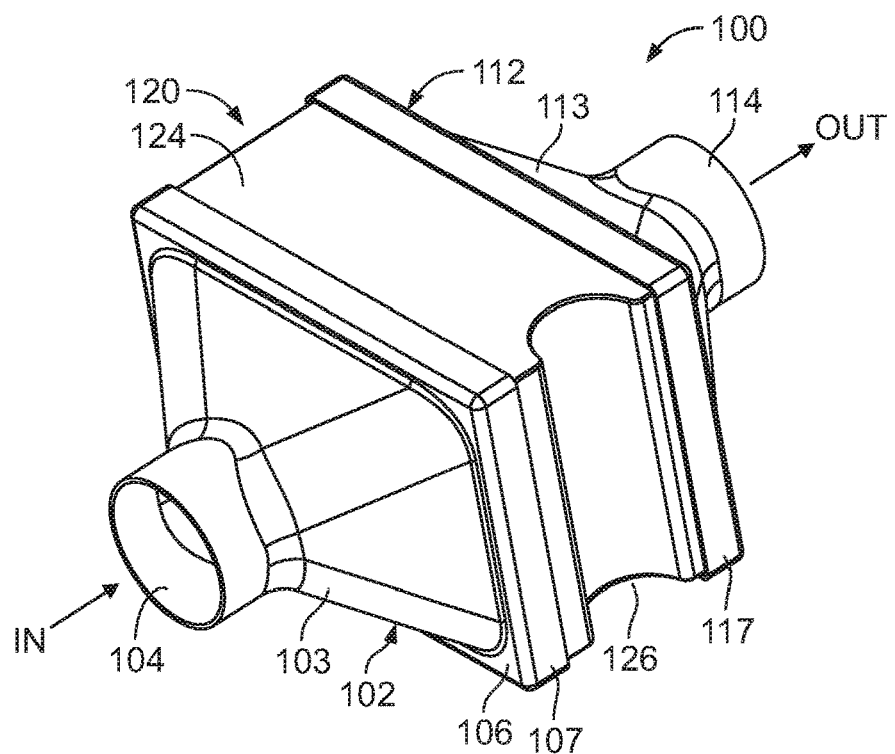
FIG. 1 is a perspective view of a filter assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to filter assemblies including multilayered or wrapped filter elements having a polymeric layer disposed on sidewalls of a filter media pack of the filter element to form a housing thereof, having indentations defined in the filter media pack, or defining non-circular cross-sections.

Many mounts or structures in which the filter assemblies are installed may be space constrained and have unique shapes, and complex filter element shapes may be desired to accommodate the filter element within such mounting structures. Embodiments of filter elements and filter assemblies described herein may provide one or more benefits including, for example: (1) allowing formation of complex shaped filter elements that can be installed in complex shaped housing; (2) disposing a polymeric layer around sidewalls of the filter media pack which serves as a sealing member as well as an integrated housing for the filter media pack; (3) providing more efficient sealing and reduce pressure drop across filter elements; and (4) reducing manufacturing costs.

Figure 2:
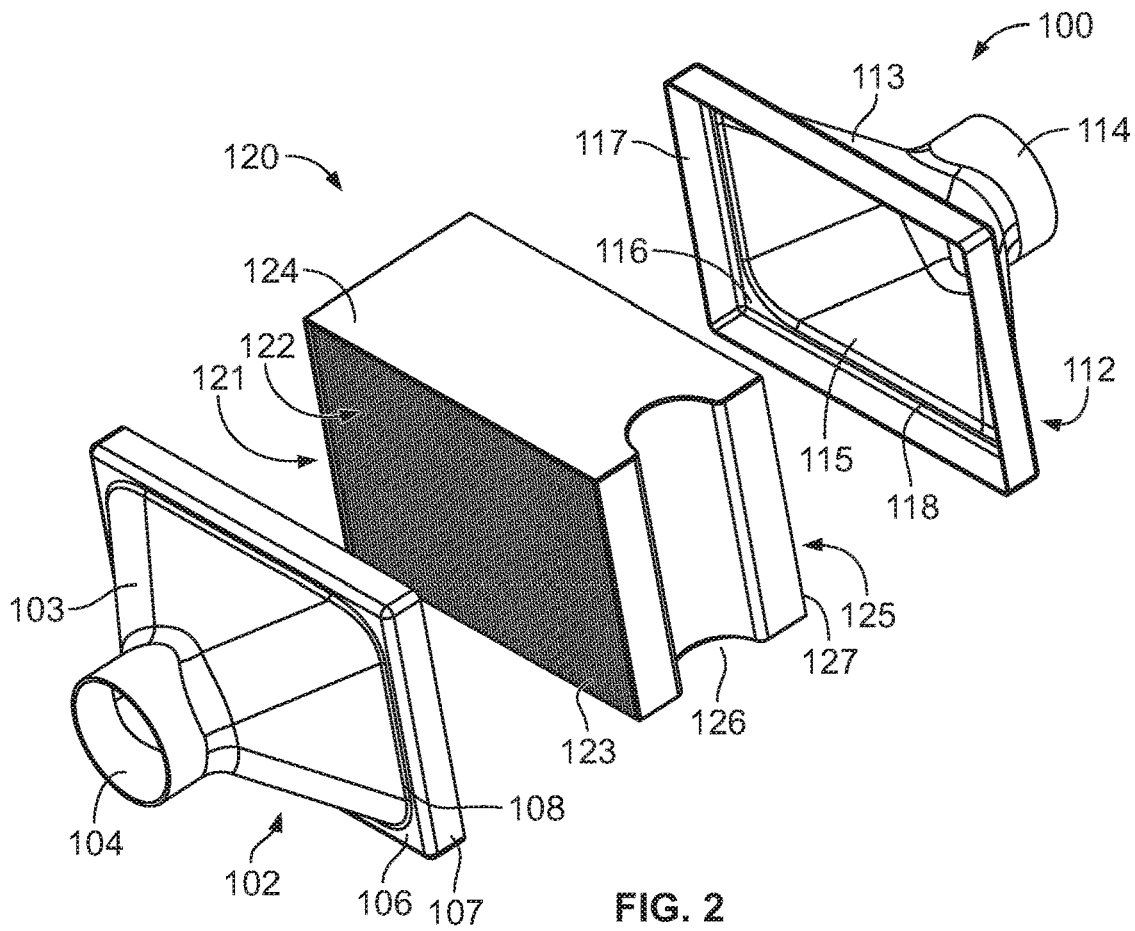
FIG. 2 is an exploded view of the filter assembly of FIG. 1.
Figure 4:
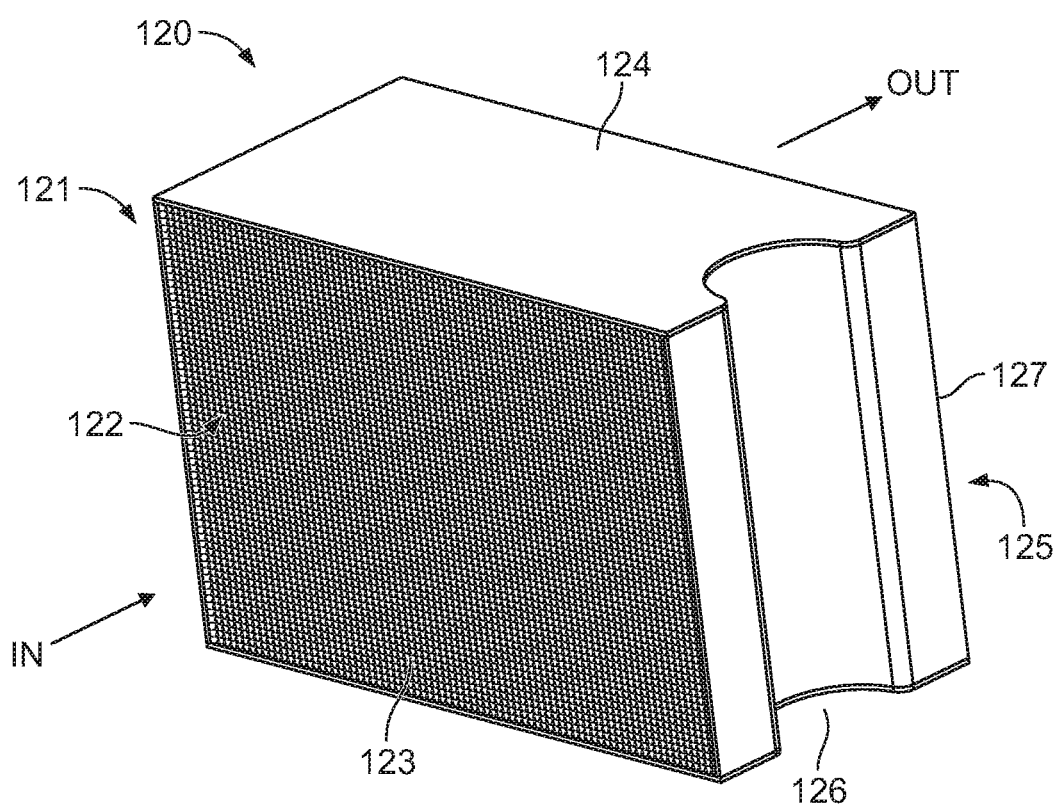
FIG. 4 is a front perspective view of the filter element included in the filter assembly of FIG. 1, according to an embodiment.
Figure 5:
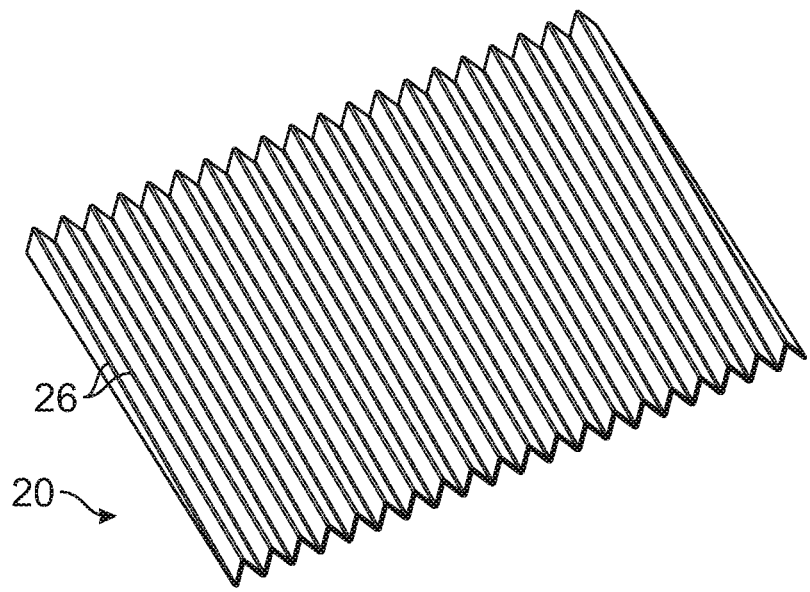
FIG. 5 is a perspective view of a filter media defining a plurality of tetrahedron channels, according to an embodiment.

FIG. 1 is a perspective view, and FIG. 2 is an exploded view of a filter assembly 100, according to an embodiment. The filter assembly 100 may comprise a filter element 120, an outlet flange 112 and in some embodiments, may also include an inlet flange 102. FIG. 4 is a front perspective view of the filter element 120 included in the filter assembly 100 of FIG. 1, according to an embodiment. The filter element 120 may be used to filter air, fuel, air/fuel mixtures, water, lubricants, or other fluids. In some embodiments, the filter assembly 100 may be used in a vehicle, equipment or power generation system.

Figure 3:
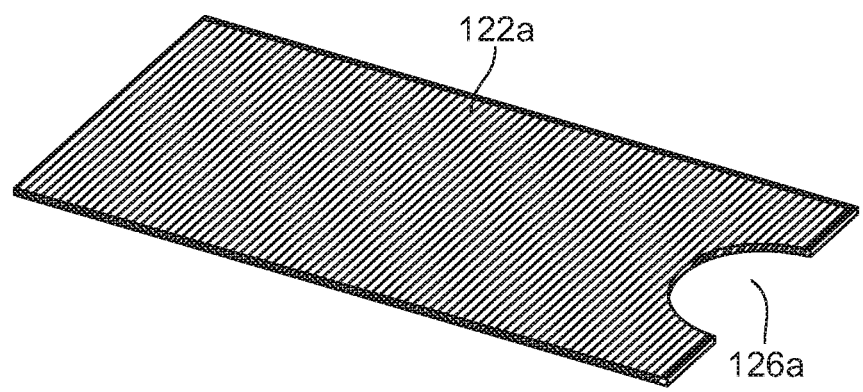
FIG. 3 is top perspective view of one filter media layer of a plurality of filter media layers that are stacked to form a filter media pack included in a filter element of the filter assembly of FIG. 1, according to an embodiment.

The filter element 120 includes a multilayered filter media pack 122 having an inlet portion 121 and an outlet portion 125. Expanding further, the filter media pack 122 includes a plurality of filter media layers 122a. As shown in FIG. 3, the plurality of filter media layers 122a are stacked on top of each other to form the filter media pack 122. The filter media pack 122 comprises a porous material having a predetermined pore size and configured to filter particulate matter from a fluid flowing therethrough so as to produce filtered fluid. The filter media pack 122 may include any suitable filter media. In some embodiments, the filter media pack 122 may comprise a tetrahedral media, i.e., a filter media including or formed into a tetrahedral shape (e.g., formed into tetrahedral pleats), as described in detail herein. In other embodiments, the filter media pack 122 may be formed of fluted media, a straw media, an origami media or any other suitable filter media. While FIGS. 1-4 shows the filter media pack 122 as having a generally rectangular shape, in other embodiments, the filter media pack 122 may have any suitable shape, for example, square, polygonal, circular, oval, elliptical, asymmetric, etc.

The filter media pack 122 defines an inlet surface 123 being at the inlet portion 121 configured to receive unfiltered fluid, and an outlet surface 127 being at the outlet portion 125 configured to expel fluid that has been filtered after passing through the filter media pack 122. A polymeric layer 124 is disposed on at least one sidewall of a plurality of sidewalls of the filter media pack 122 located generally parallel to a flow path of the filter media pack 122. In particular implementations, the polymeric layer 124 is disposed on all outer surfaces of the filter media pack 122 except on the inlet portion 121 and the outlet portion 125, e.g., except on the inlet surface 123 and the outlet surface 127, and adheres to the plurality of sidewalls so as to form a housing of the filter media pack 122. The polymeric layer 124 may be coated (e.g., spray coated or dip coated), attached via an adhesive, wrapped around the filter media pack 122, or disposed on the at least one sidewall using any suitable mechanism.

In some embodiments, the polymeric layer 124 may include a foam urethane or structural polyurethane that may be spray coat, drop coated or dip coated on the plurality of sidewalls of the filter media pack 122. In various embodiments, the inlet surface 123, the outlet surface 127, and any other mounting surfaces may be masked with a masking layer (e.g., a plastic sheet) before application of the polymeric layer, for example, immersion of the filter media pack 122 into a vat of the polymeric material. The polymeric material adheres to and solidifies on the sidewalls, thereby forming the polymeric layer 124 surrounding the filter media pack 122 so as to form a housing of the filter element 120 that has the same cross-section as the cross-section defined by the filter media pack 122. In this manner, complex shapes may be formed that can comply with constrained spaces or complex mounting structures. The masking layers are then removed to expose the inlet surface 123 and the outlet surface 127.

In some embodiments, one or more indentations (e.g., a slot, a cavity, a depression, a notch, etc.) may be formed or cut in at least one sidewall of the plurality of sidewalls of filter media pack 122. For example, one or more indentations may be formed in the one or more of the sidewalls of the filter media pack 122 transverse to the fluid flow axis, or on the inlet surface 123 and/or outlet surface 127. For example, FIGS. 1, 2, and 4 show a semi-circular indentation 126 formed into a sidewall of filter media pack 122 located parallel to a flow path defined through the filter media pack 122. In some embodiments, the filter media indentation 126 may be formed after the plurality of filter media layers 122a have been stacked to form the filter media pack 122 using any suitable means, for example, water jet cutting or laser cutting. In other embodiments, a filter media layer indentation 126a may be formed in each filter media layer 122a before stacking, and the plurality of filter media layers 122a may then be stacked such that each filter media layer indentation 126a is axially aligned with each other to form the filter media indentation 126. The polymeric layer 124 is thereafter disposed on the sidewalls of the filter media pack 122. In this manner, asymmetric and complex shapes can be formed, while eliminating the use of a separate housing for the filter element 120.

The inlet flange 102 is coupled to the inlet portion 121, and the outlet flange 112 is coupled to the outlet portion 125. The inlet flange 102 includes an inlet flange base 106 positioned in a confronting relationship with the inlet surface 123 of the filter media pack 122 and defining an inlet flange opening therein. The inlet flange base 106 has a cross-section generally corresponding to a transverse cross-section of the filter media pack 122. In some embodiments, the inlet flange base 106 may include ridge, ribs, detents or protrusions projecting from the inlet flange base 106 towards the inlet surface 123 of the filter media pack 122, and may be in contact therewith. An inlet flange peripheral sidewall 107 projects from outer edges of the inlet flange base 106 towards the filter media pack 122 and is disposed around a perimeter of the sidewalls of the filter media pack 122 proximate to the inlet surface 123. An inlet conduit 104 is fluidly coupled to the inlet flange opening. For example, as shown in FIGS. 1-2, the inlet conduit 104 has a cross-section that is smaller than a cross-section of the inlet flange opening. In such embodiments, the inlet flange 102 further comprises an inlet flange connecting wall 103 extending from an outer edge of the inlet conduit 104 to a rim 108 of the inlet flange opening, i.e., the inlet flange connecting wall 103 has a tapered cross-section that expands from the inlet conduit 104 towards the inlet flange base 106.

Similar to the inlet flange 102, the outlet flange 112 includes an outlet flange base 116 positioned in a confronting relationship with the outlet surface 127 of the filter media pack 122 and defining an outlet flange opening 115 therein. The outlet flange base 116 has a cross-section generally corresponding to a transverse cross-section of the filter media pack 122. In some embodiments, the outlet flange base 116 may include ridge, ribs, detents or protrusions projecting from the outlet flange base 116 towards the outlet surface 127 of the filter media pack 122, and may be in contact therewith. An outlet flange peripheral sidewall 117 projects from outer edges of the outlet flange base 116 towards the filter media pack 122 and is disposed around a perimeter of the sidewalls of the filter media pack 122 proximate to the outlet surface 127. An outlet conduit 114 is fluidly coupled to the outlet flange opening 115. The outlet conduit 114 has a cross-section that is smaller than a cross-section of the outlet flange opening 115, and the outlet flange 112 further comprises an outlet flange connecting wall 113 extending from an outer edge of the outlet conduit 114 to a rim 118 of the outlet flange opening 115. In some embodiments, the outlet flange 112 is substantially similar to the inlet flange 102.

In various embodiments, the inlet flange 102 and the outlet flange 112 are secured to the filter element 120 via adhesive tape. In other embodiments, the filter media pack 122 may be potted into the inlet flange 102 and/or outlet flange 112, or hot melted therein. For example, adhesive tape may be wound around the sidewalls of filter element 120 proximate to the inlet portion 121 and the outlet portion 125 such that a portion of the respective adhesive tapes overlap the inlet flange peripheral sidewall 107 and the outlet flange peripheral sidewall 117, thereby securing the inlet flange 102 and the outlet flange 112 to the filter element 120. Thus, sealing may not be used which reduces manufacturing complexity and cost. Furthermore, mounting brackets with straps and/or mounting feet may be used to facilitate mounting of the filter assembly 100.

In some embodiments, the filter media pack 122 or any other filter media pack described herein, may comprise a tetrahedral filter media. For example, in particular embodiments, the filter media pack 122 may comprise tetrahedral filter media defined by a plurality of tetrahedron channels as described in U.S. Pat. No. 8,397,920, which is incorporated herein by reference in its entirety. Expanding further, FIGS. 5-8 show a filter media 20 which can be used to form the filter media pack 122 of the filter element 120. The filter media 20 has an upstream inlet 22 receiving incoming dirty fluid as shown at arrows 23, and having a downstream outlet 24 discharging clean filtered fluid as shown at arrows 25. The filter media 20 is manipulated along a plurality of bend lines 26. The bend lines extend axially along an axial direction 28, FIGS. 5-8, and include a first set of bend lines 30 extending from the upstream inlet 22 towards the downstream outlet 24, and a second set of bend lines 32 extending from the downstream outlet 24 axially towards the upstream inlet 22. The filter media 20 has a plurality of filter media wall segments 34 extending in serpentine manner between the bend lines. The wall segments extend axially and define axial flow channels 36 therebetween. The channels 36 have a height 38 along a transverse direction 40, which transverse direction 40 is perpendicular to axial direction 28, FIG. 9. The channels 36 have a lateral width 42 along a lateral direction 44, which lateral direction 44 is perpendicular to axial direction 28 and perpendicular to transverse direction 40. At least some of the noted bend lines taper in the noted transverse direction as they extend axially in the noted axial direction, to be described.

Figure 6:
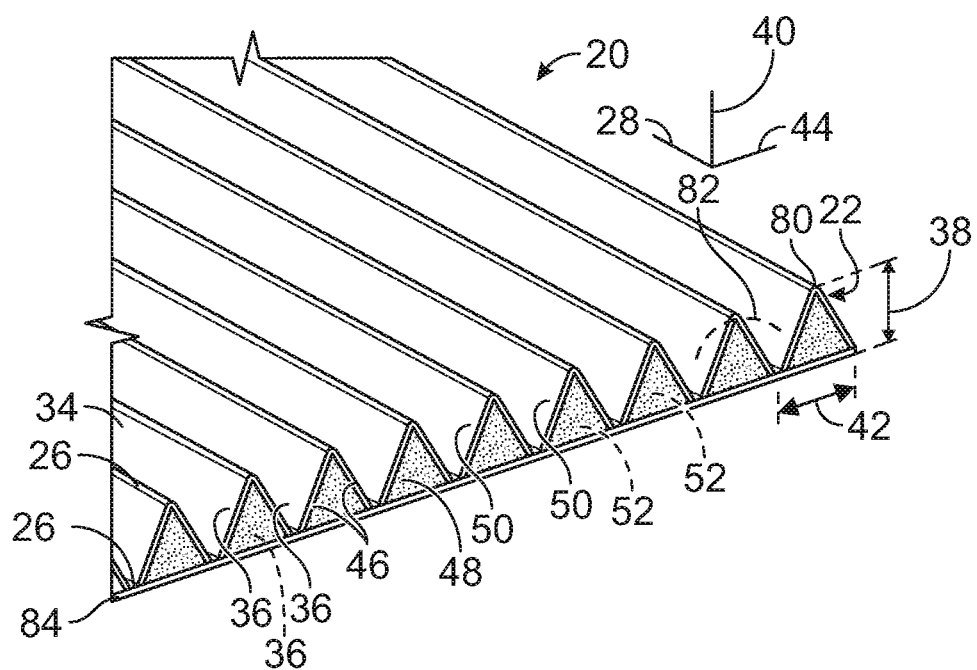
FIG. 6 is an enlarged perspective view of a filter media defining a plurality of tetrahedron channels.
Figure 7:
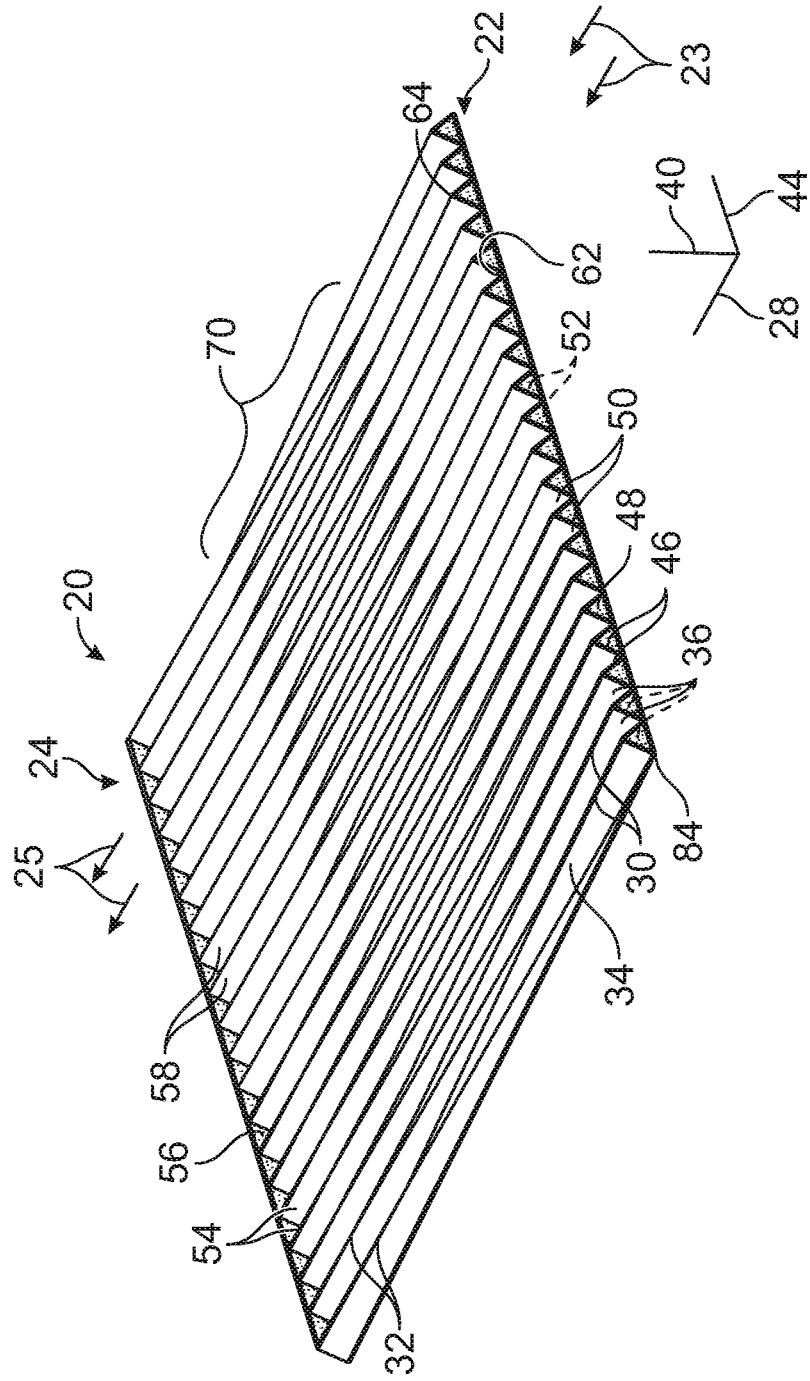
FIG. 7 shows the filter media of FIG. 2 from the inlet end.
Figure 8:
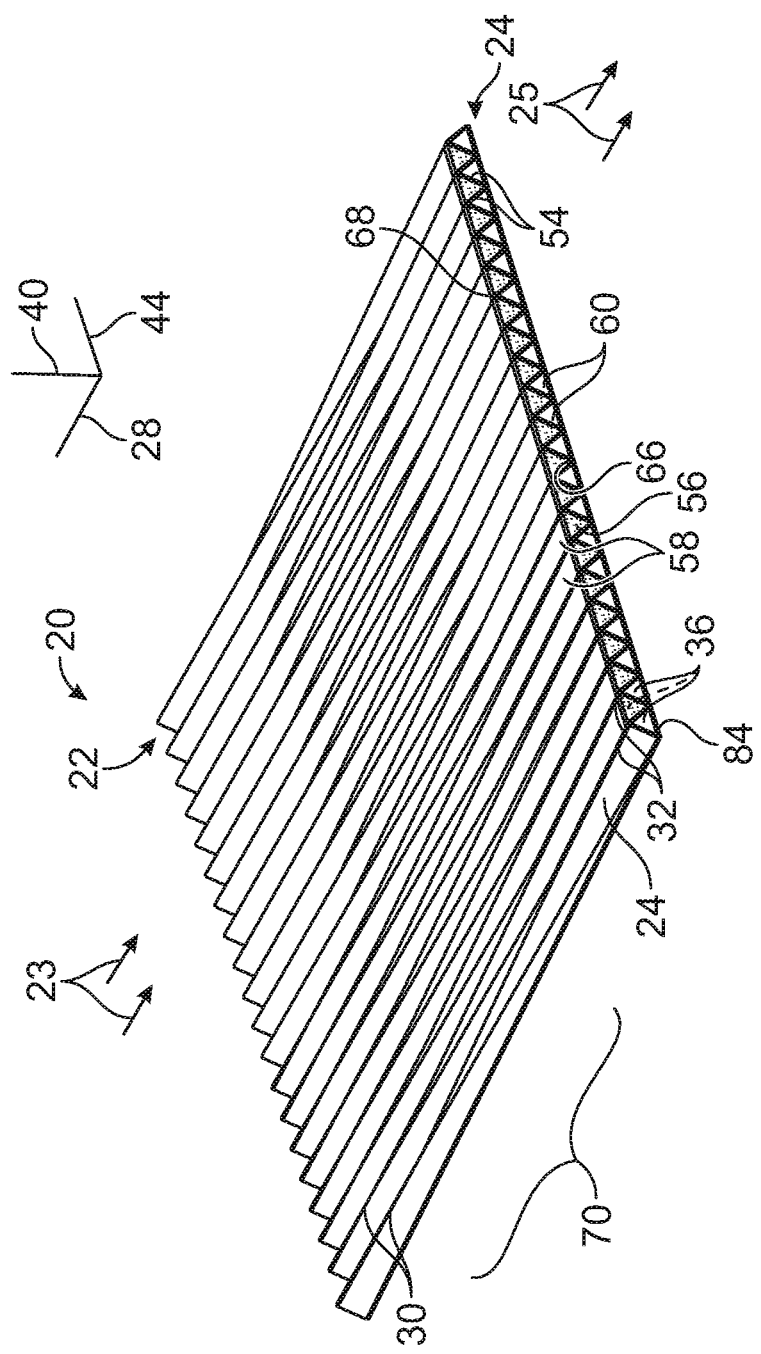
FIG. 8 shows the filter media of FIG. 2 from the outlet end.

The wall segments include a first set of wall segments 46, FIGS. 6, 7, alternately sealed to each other at the upstream inlet 22, e.g. by adhesive 48 or the like, to define a first set of channels 50 having open upstream ends, and a second set of channels 52 interdigitated with the first set of channels and having closed upstream ends. The wall segments include a second set of wall segments 54, FIGS. 7, 8, alternately sealed to each other at the downstream outlet 24, e.g., by adhesive 56 or the like, to define a third set of channels 58 having closed downstream ends, and a fourth set of channels 60, FIG. 8, having open downstream ends. The first set of bend lines 30 includes a first subset of bend lines 62 defining the first set of channels 50, and a second subset of bend lines 64 defining the second set of channels 52. The second subset of bend lines 64 taper in transverse direction 40 as they extend from the upstream inlet 22 axially towards the downstream outlet 24, FIGS. 9-11. The second set of bend lines 32 includes a third subset of bend lines 66 defining the third set of channels 58, and a fourth subset of bend lines 68 defining the fourth set of channels 60. The fourth subset of bend lines 68 taper in the transverse direction 40 as they extend from the downstream outlet 24 axially towards the upstream inlet 22, FIGS. 9-11. The second set of channels 52 have a decreasing transverse channel height 38 along transverse direction 40 as the second set of channels 52 extend axially along axial direction 28 towards the downstream outlet 24. The tapering of the second subset of bend lines 64 in the transverse direction 40 provides the decreasing transverse channel height 38 of the second set of channels 52. The fourth set of channels 60 have a decreasing transverse channel height along transverse direction 40 as the fourth set of channels 60 extend axially along axial direction 28 towards the upstream inlet 22. The tapering of the fourth subset of bend lines 68 in the transverse direction 40 provides the decreasing transverse channel height 38 of the fourth set of channels 60.

Incoming dirty fluid 23 to be filtered flows along axial direction 28 into open channels 50 at the upstream inlet 22 and passes laterally and/or transversely through the filter media wall segments of the filter media 20 and then flows axially along axial direction 28 as clean filtered fluid 25 through open channels 60 at the downstream outlet 24. Second subset of bend lines 64 provides lateral cross-flow thereacross along lateral direction 44 between respective channels downstream of the upstream inlet 22. Fourth subset of bend lines 68 provides lateral cross-flow thereacross along lateral direction 44 between respective channels upstream of the downstream outlet 24. Second and fourth subsets of bend lines 64 and 68 have axially overlapping sections 70, and the noted lateral cross-flow is provided at least at axially overlapping sections 70.

Figure 9:
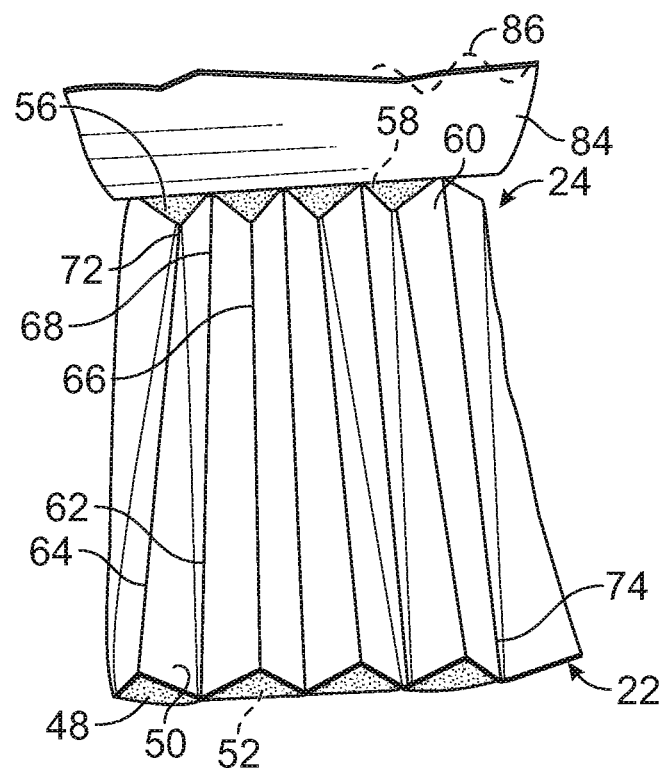
FIG. 9 is an exploded perspective view showing a portion of a filter media defining tetrahedron channels, according to an embodiment
Figure 10:
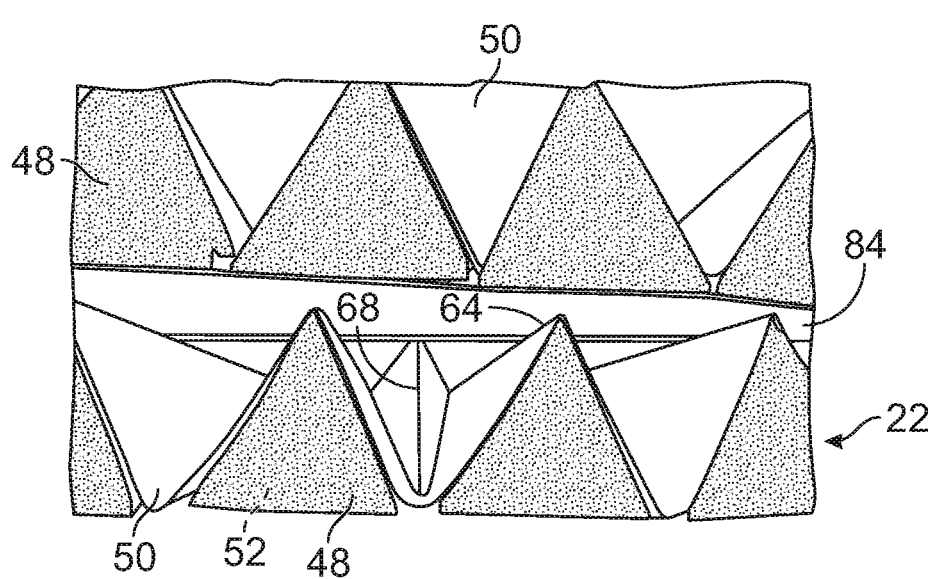
FIG. 10 is an enlarged perspective view showing a portion of a filter media defining tetrahedron channels, according to an embodiment.
Figure 11:
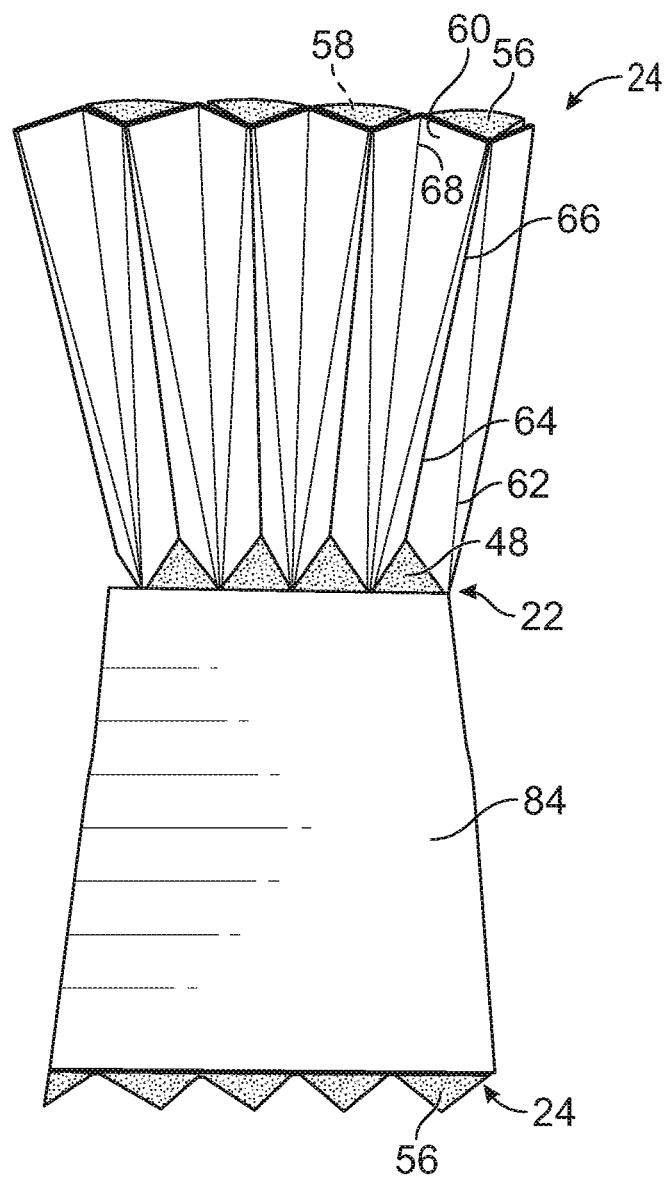
FIG. 11 is a view from the opposite end of the filter media shown in FIG. 10.

The second subset of bend lines 64 taper to respective termination points 72, FIGS. 9-11, providing at such termination points the minimum transverse channel height 38 of the second set of channels 52. The fourth subset of bend lines 68 taper to respective termination points 74 providing at such termination points the minimum transverse channel height 38 of the fourth set of channels 60. Termination points 72 of second subset of bend lines 64 are axially downstream of termination points 74 of fourth subset of bend lines 68. This provides the noted axially overlapping sections 70. Termination points 72 of second subset of bend lines 64 are at the downstream outlet 24 in one embodiment, and in other embodiments are axially upstream of the downstream outlet 24. Termination points 74 of fourth subset of bend lines 68 are at the upstream inlet 22 in one embodiment, and in other embodiments are axially downstream of the upstream inlet 22.

The first set of wall segments 46 are alternately sealed to each other at adhesive 48 at the upstream inlet 22 define a first set of tetrahedron channels 50 having open upstream ends, and a second set of tetrahedron channels 52 interdigitated with the first set of tetrahedron channels 50 and having closed upstream ends. The second set of wall segments 54 are alternately sealed to each other at adhesive 56 at the downstream outlet 24 define a third set of tetrahedron channels 58 having closed downstream ends, and a fourth set of tetrahedron channels 60 interdigitated with the third set of tetrahedron channels 58 and having open downstream ends. The first set of bend lines 30 includes the first subset of bend lines 62 defining the first set of tetrahedron channels 50, and the second subset of bend lines 64 defining the second set of tetrahedron channels 52. The second subset of bend lines 64 taper in the transverse direction 40 as they extend from the upstream inlet 22 axially towards the downstream outlet 24. The second set of bend lines 32 includes the third subset of bend lines 66 defining the third set of tetrahedron channels 58, and the fourth subset of bend lines 68 defining the fourth set of tetrahedron channels 60. The fourth subset of bend lines 68 taper in the transverse direction 40 as they extend from the downstream outlet 24 axially towards the upstream inlet 22.

First and second sets of tetrahedron channels 50 and 52, shown in FIGS. 7-11, face oppositely to third and fourth sets of tetrahedron channels 58 and 60. Each of the tetrahedron channels 50, 52, 58, 60 is elongated in the axial direction 28. Each of the tetrahedron channels has a cross-sectional area along a cross-sectional plane defined by the transverse and lateral directions 40 and 44. The cross-sectional areas of the first and second sets of tetrahedron channels 50 and 52 decrease as the first and second sets of tetrahedron channels 50 and 52 extend along axial direction 28 from the upstream inlet toward the downstream outlet 24. The cross-sectional areas of third and fourth sets of tetrahedron channels 58 and 60 decrease as the third and fourth sets of tetrahedron channels 58 and 60 extend along axial direction 28 from the downstream outlet 24 toward the upstream inlet. In one embodiment, bend lines 26 are bent at a sharp pointed angle, as shown at 80, FIG. 6. In other embodiments, the bend lines are rounded along a given radius, as shown in dashed line at 82, FIG. 6.

Figure 12:
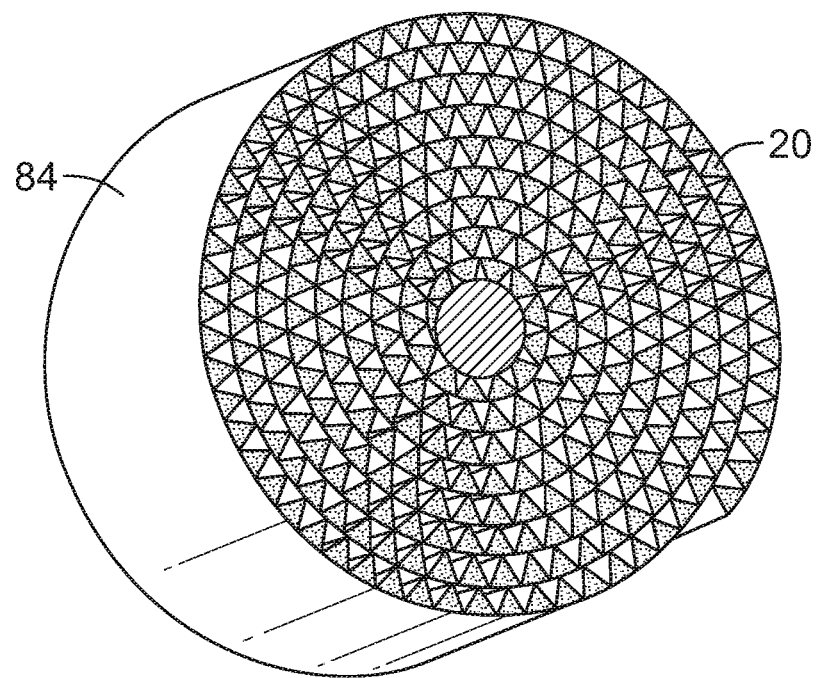
FIG. 12 is a perspective view showing one implementation of a filter media, according to an embodiment.
Figure 13:
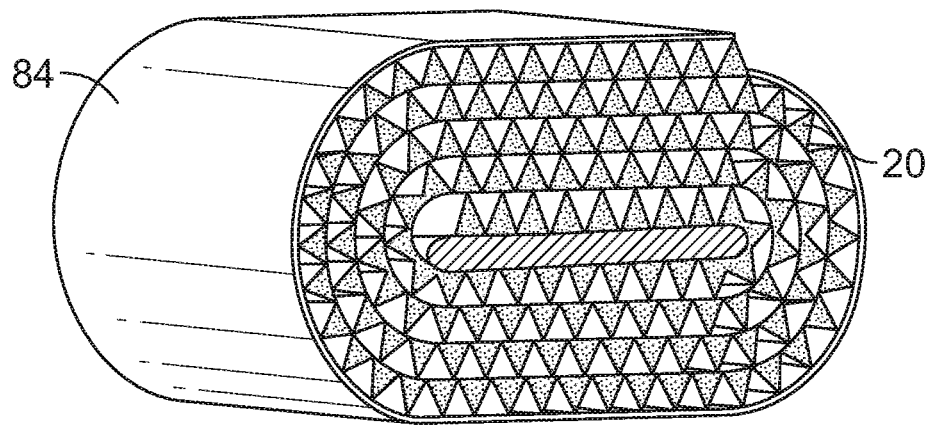
FIG. 13 is a perspective view showing another implementation of a filter media, according to an embodiment.
Figure 14:
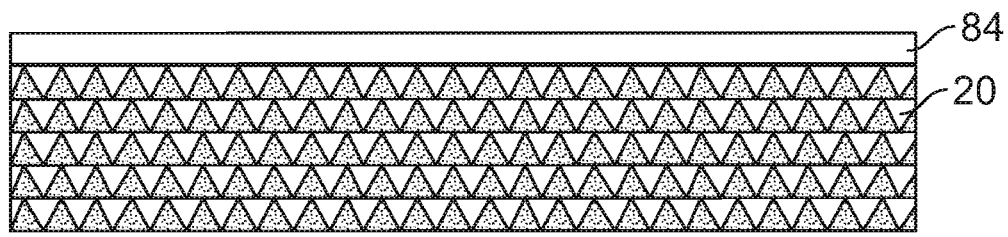
FIG. 14 is an end view showing another implementation of a filter media, according to an embodiment.
Figure 15:
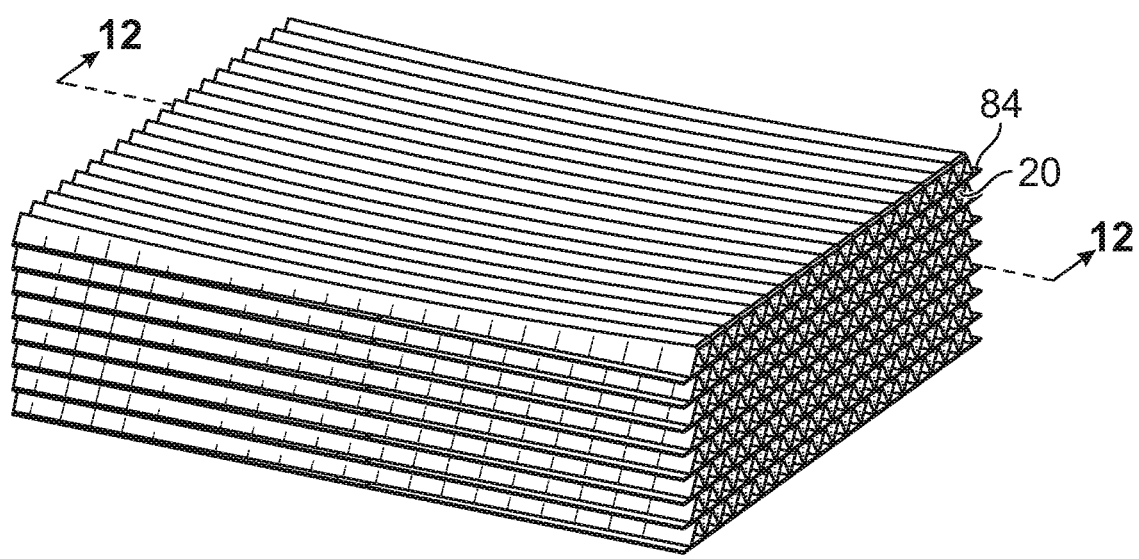
FIG. 15 is a perspective view further showing the implementation of FIG. 14.
Figure 16:
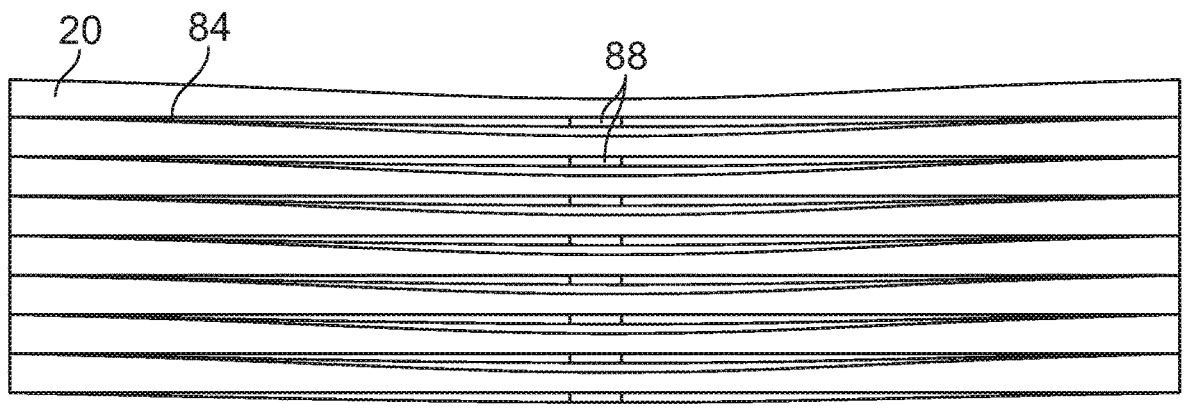
FIG. 16 is a sectional view taken along line 12-12 of FIG. 15.

The filter media 20 is further provided with a substantially flat sheet 84 extending laterally across the bend lines. In one embodiment, the sheet is formed of filter media material, which may be the same filter media material as the filter element including wall segments 34. Sheet 84 extends axially along the full axial length along axial direction 28 between the upstream inlet and the downstream outlet 24, and extends laterally along the full lateral width along lateral direction 44 across and sealing the channels to prevent bypass of dirty upstream air to clean downstream air without passing through and being filtered by a wall segment 34. In one embodiment, sheet 84 is rectiplanar along a plane defined by axial direction 28 and lateral direction 44. In another embodiment, sheet 84 is slightly corrugated, as shown in dashed line at 86, FIG. 9. In one implementation, sheet 84 is rolled with the filter media 20 into a closed loop, and in various embodiments the closed loop has a shape selected from the group of circular, FIG. 12, racetrack (two curved ends joined by two straight or substantially straight portions), FIG. 13, oval, oblong, and other closed-loop shapes. In other embodiments, a plurality of filter media layers 20 and sheets are stacked upon each other in a stacked panel arrangement, FIGS. 14-16. Spacer strips or embossments such as 88 may be used as needed for spacing and support between stacked elements.

Figure 17:
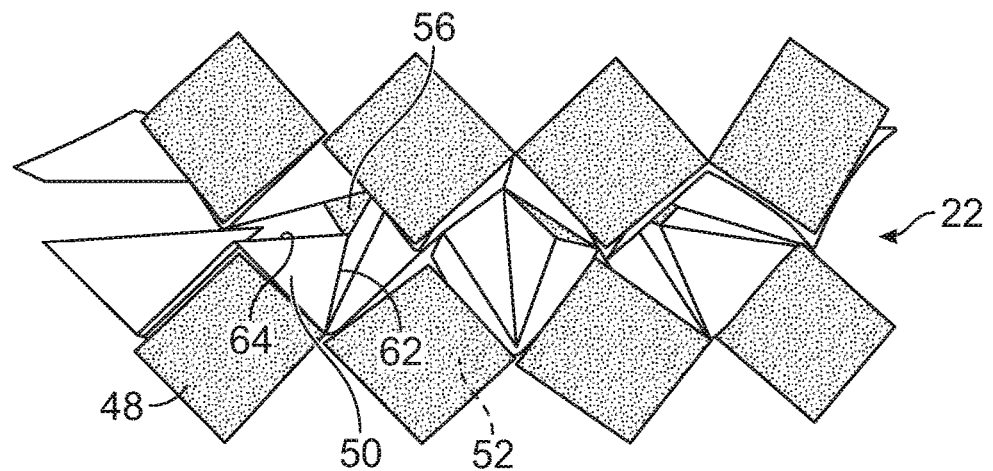
FIG. 17 is similar to FIGS. 9 and 10 and shows another embodiment.
Figure 18:
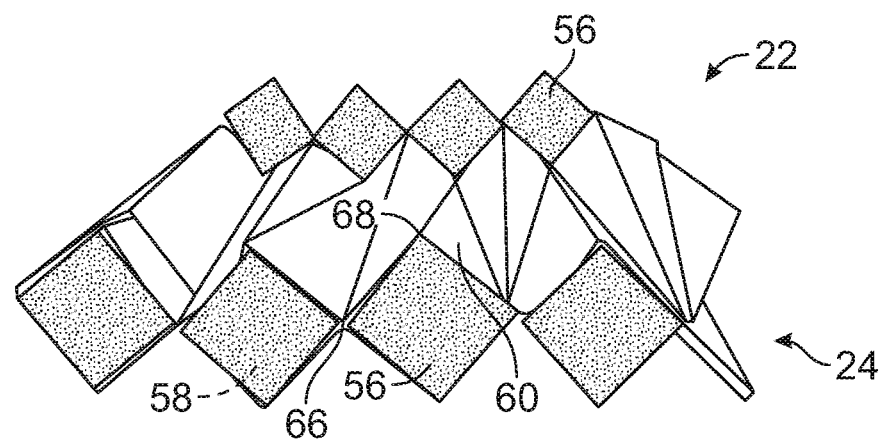
FIG. 18 is similar to FIG. 11 and is a view from the opposite end of FIG. 17.
Figure 19:
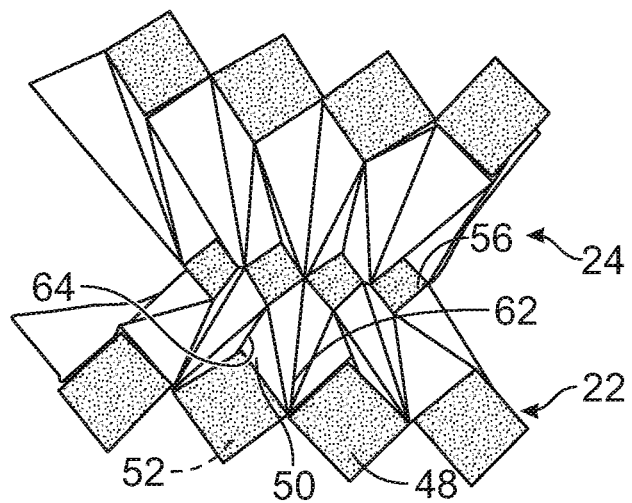
FIG. 19 is similar to FIG. 9 and further shows the construction of FIG. 17.

FIGS. 17-19 show a further embodiment eliminating sheet 84 and are like FIGS. 9-11 and use like reference numerals from above where appropriate to facilitate understanding. The filter element of FIGS. 17-19 has an upstream inlet 22 receiving incoming dirty fluid, and a downstream outlet 24 discharging clean filtered fluid. The wall segments are alternately sealed to each other at upstream inlet 22 as above, e.g. by adhesive or a section of filter media at 48, to define the noted first set of channels 50 having open upstream ends, and the noted second set of channels 52 interdigitated with the first set of channels and having closed upstream ends. The wall segments are alternately sealed to each other at the downstream outlet 24, e.g. by adhesive or a section of filter media at 56, to define the noted third set of channels 58 having closed downstream ends, and the noted fourth set of channels 60 having open downstream ends. The bend lines include the noted first subset of bend lines 62 defining the first set of channels 50, and the noted second subset of bend lines 64 defining the noted second set of channels 52, and the noted third subset of bend lines 66 defining the third set of channels 58, and the noted fourth subset of bend lines 68 defining the noted fourth set of channels 60.

The elongated tetrahedron channels allow for cross-flow between adjacent channels. In air filter implementations, this cross-flow allows for more even dust loading on the upstream side of the media. In one embodiment, the elongated tetrahedron channels are shaped to purposely allow for more upstream void volume than downstream void volume, to increase filter capacity. Various fluids may be filtered, including air, air/fuel mixture or other gases, and including liquids such as fuel, lubricants or water.

Figure 20A:
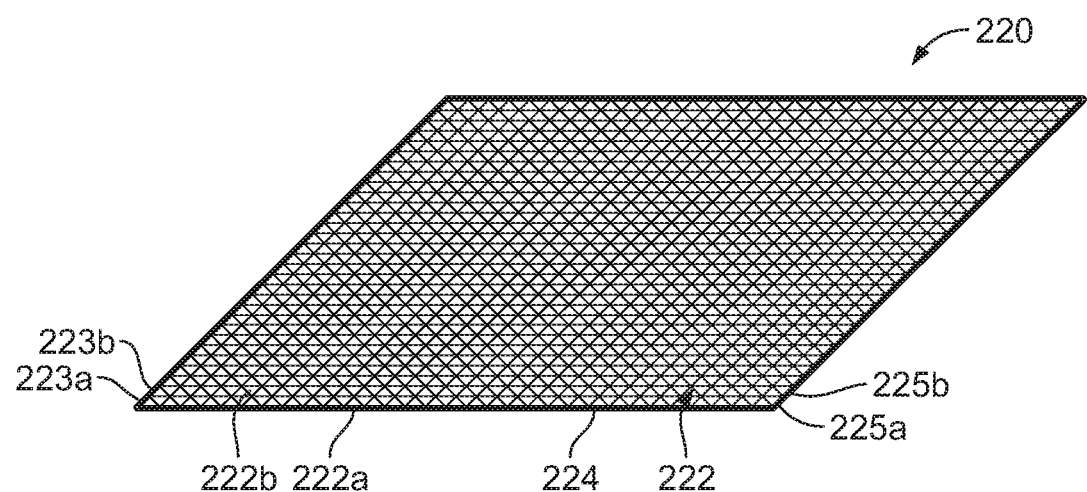
FIG. 20A is a front view.
Figure 20B:
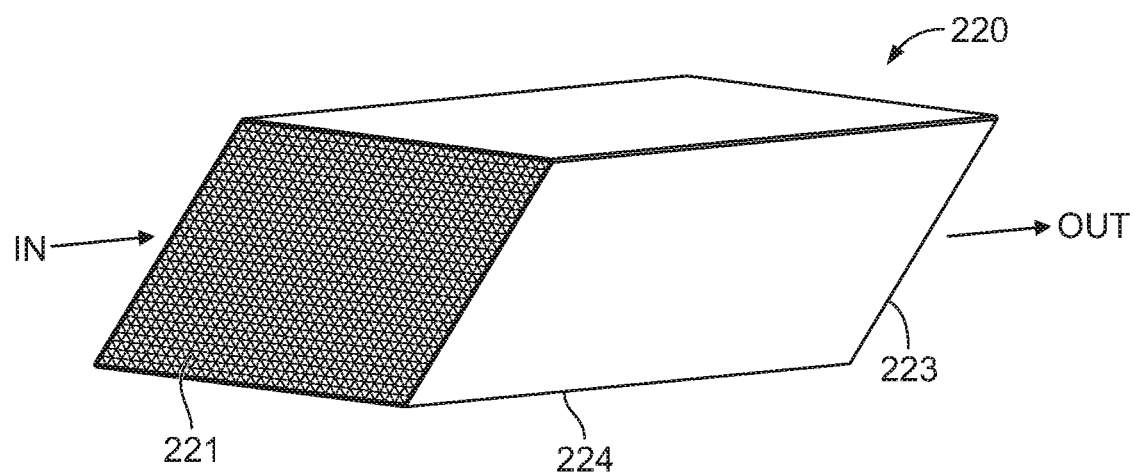
FIG. 20B is a perspective view of a multilayered filter element having a rhomboidal cross-section, according to an embodiment.

In various embodiments, a plurality of filter media layers maybe stacked such that at least one edge or corner of one layer is not aligned with a corresponding edge or corner of another layer disposed thereon. This allows for formation of complex shaped filter elements that provide flexibility in installation. For example, FIG. 20A is a front view, and FIG. 20B is a perspective view of a filter element 220 having a rhomboidal cross-section, according to an embodiment. The filter element 220 includes a filter media pack 222 (e.g., comprising a tetrahedral filter media) having a polymeric layer 224 disposed on at least one sidewall of a plurality of sidewalls thereof that are parallel to a flow axis of the filter element 220. The filter media pack 222 defines an inlet surface 221 through which unfiltered fluid enters the filter media pack 222, and an outlet surface 223 through which filtered fluid is expelled from the filter media pack 222.

The filter media pack 222 comprises a plurality of filter media layers having the same length that are stacked such that an edge thereof is offset from a corresponding edge of a subsequently stacked filter media layer such that the filter media pack 222 has a rhomboidal or parallelogram cross-section. For example, the filter media pack 222 includes a first filter media layer 222a and a second filter media layer 222b disposed on top of the first filter media layer 222a. A second filter media layer first edge 223b of the second filter media layer 222b is offset a predetermined distance from a corresponding first filter media layer first edge 223a of the first filter media layer 222a. As the first filter media layer 222a and the second filter media layer 222b have the same length, a second filter media layer second edge 225b opposite the second filter media layer first edge 223b is also offset from a corresponding first filter media layer second edge 225a, i.e., the filter media layers 222a/b are staggered. This is repeated for each of the filter media layers in the stack such that the filter media pack 222 has a rhomboidal cross-section (i.e., has a parallelogram shape).

Figure 21A:
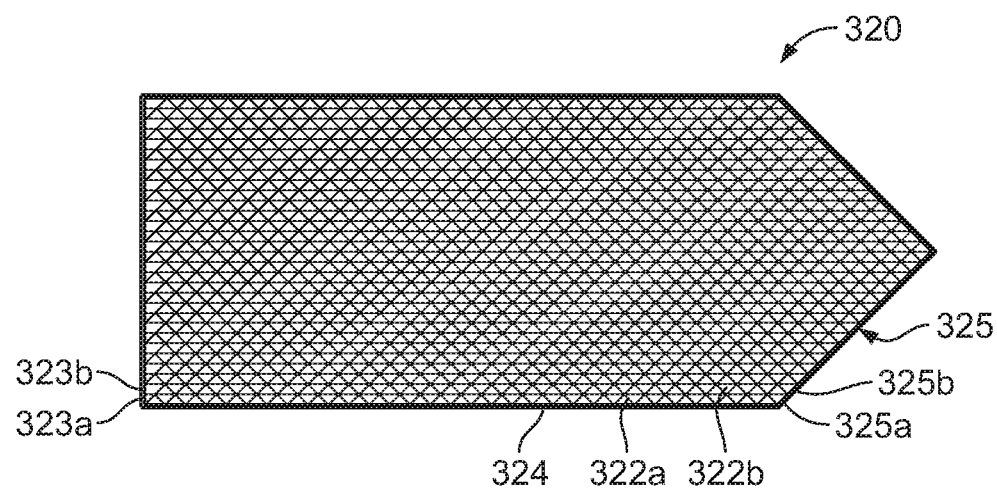
FIG. 21A is a front view.
Figure 21B:
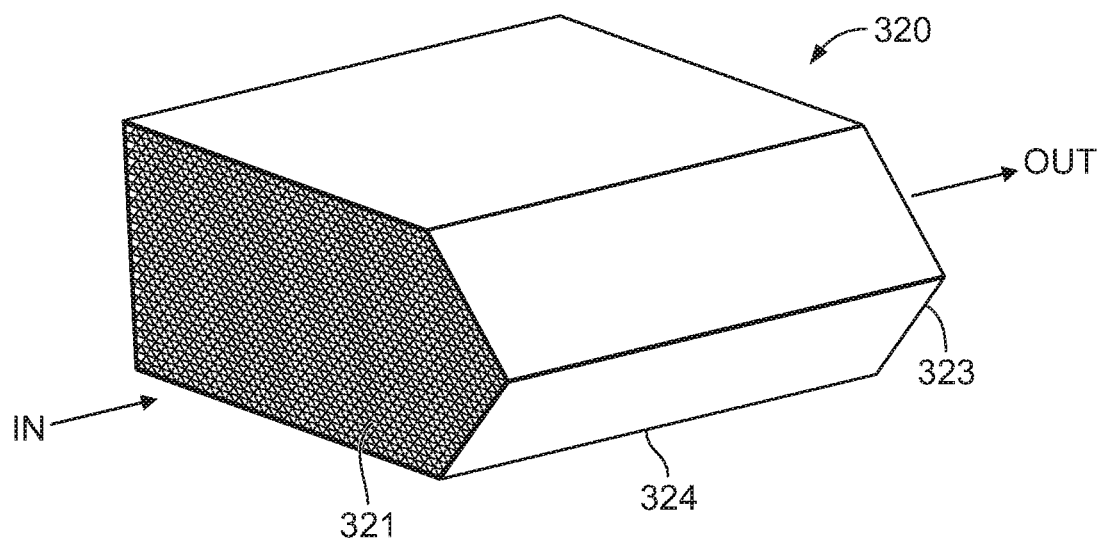
FIG. 21B is a perspective view of a multilayered filter element having a wedge shaped sidewall, according to another embodiment.

In various embodiments, a plurality of different or unequal length filter media layers maybe stacked such that at least one edge or corner of one layer is not aligned with a corresponding edge or corner of another layer disposed thereon. For example, FIG. 21A is a front view, and FIG. 21B is a perspective view of a multilayered filter element 320 having a wedge shaped sidewall, according to another embodiment. The filter element 320 includes a filter media pack 322 (e.g., comprising a tetrahedral filter media) having a polymeric layer 324 disposed on at least one sidewall of a plurality of sidewalls thereof that are parallel to a flow axis of the filter element 320. The filter media pack 322 defines an inlet surface 321 through which unfiltered fluid enters the filter media pack 322, and an outlet surface 323 through which filtered fluid is expelled from the filter media pack 322.

The filter media pack 322 comprises a plurality of filter media layers having different lengths that are stacked such that one edge of a second filter media layer is offset from a corresponding edge of a first filter media layer on which the second filter media layer is disposed, such that a sidewall 325 formed by the corresponding offset edges of the plurality of filter media layers defines a triangular wedge shape. For example, the filter media pack 322 includes a first filter media layer 322a and a second filter media layer 322b disposed on top of the first filter media layer 322a. A second filter media layer first edge 323b of the second filter media layer 322b is aligned with a corresponding first filter media layer first edge 323a of the first filter media layer 322a. As the first filter media layer 322a and the second filter media layer 322b have different lengths, a second filter media layer second edge 325b opposite the second filter media layer first edge 323b is offset from a corresponding first filter media layer second edge 325a. This is repeated for each of the filter media layers in the stack till a center line of the filter media pack 322, i.e., progressively longer filter media layers are stacked till the center line of the filter media pack 322, after which progressively shorter filter media layers are stacked, such that the sidewall 325 defines a triangular wedge shape (i.e., the filter media pack 322 has a pentagon wedge shaped).

Figure 22A:
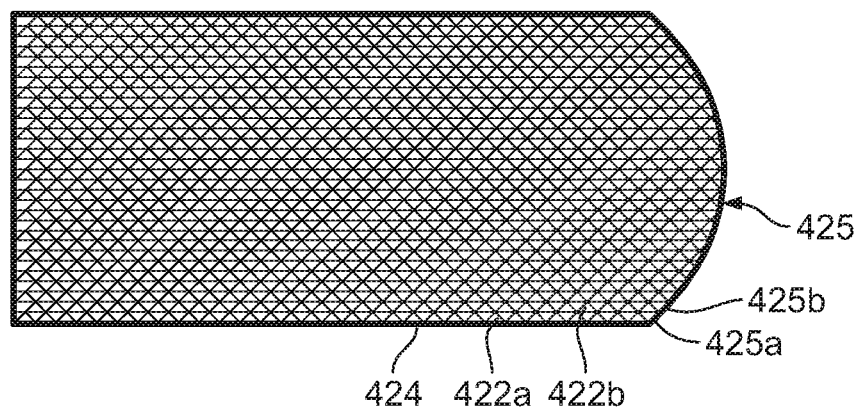
FIG. 22A is a front view.
Figure 22B:
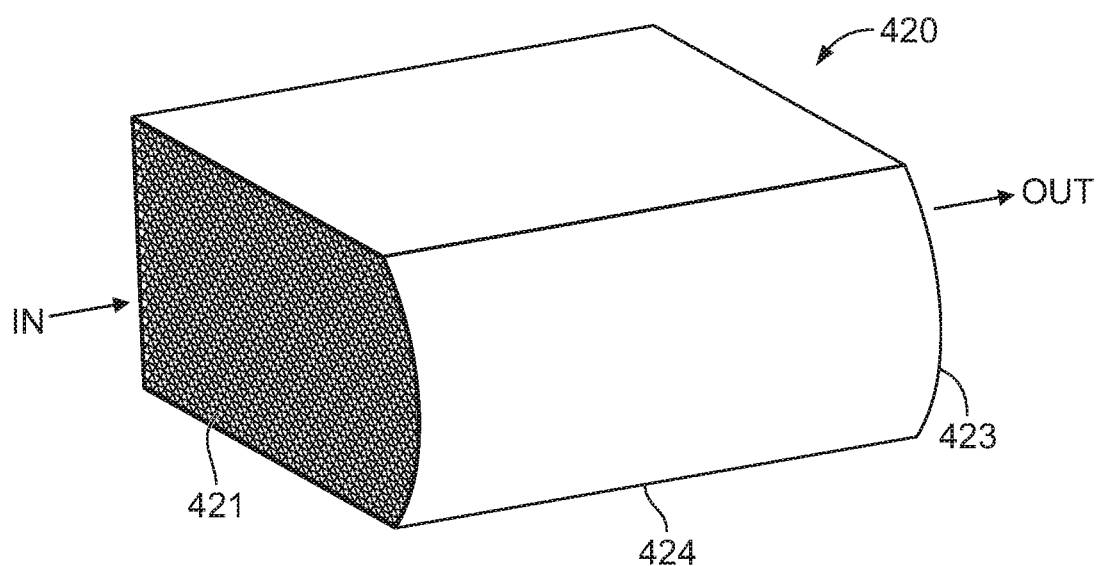
FIG. 22B is a perspective view of a multilayered filter element having a curved sidewall, according to still another embodiment.

In other embodiments, different or unequal length filter media layers may be stacked such that one sidewall of the filter media pack defines a curvature. For example, FIG. 22A is a front view, and FIG. 22B is a perspective view of a multilayered filter element 420 having a curved sidewall, according to still another embodiment. The filter element 420 includes a filter media pack 422 (e.g., comprising a tetrahedral filter media) having a polymeric layer 424 disposed on a plurality of sidewalls thereof that are parallel to a flow axis of the filter element 420. The filter media pack 422 defines an inlet surface 421 through which unfiltered fluid enters the filter media pack 422, and an outlet surface 423 through which filtered fluid is expelled from the filter media pack 422. The filter media pack 422 is constructed similar to filter media pack 322 with the difference that a second filter media layer edge 425b of a second filter media layer 422b is offset from a corresponding first filter media layer edge 425a of a first filter media layer 422a on which the second filter media layer 422b is disposed. This is repeated for each of the filter media layers in the stack till a center line of the filter media pack 422, i.e., progressively longer filter media layers are stacked till the center line of the filter media pack 422, after which progressively shorter filter media layers are stacked, such that the sidewall 425 defines a curvature, for example, a rounded or semi-circular shape, or include a continuous asymmetric curvature defined by a spline.

Figure 23A:
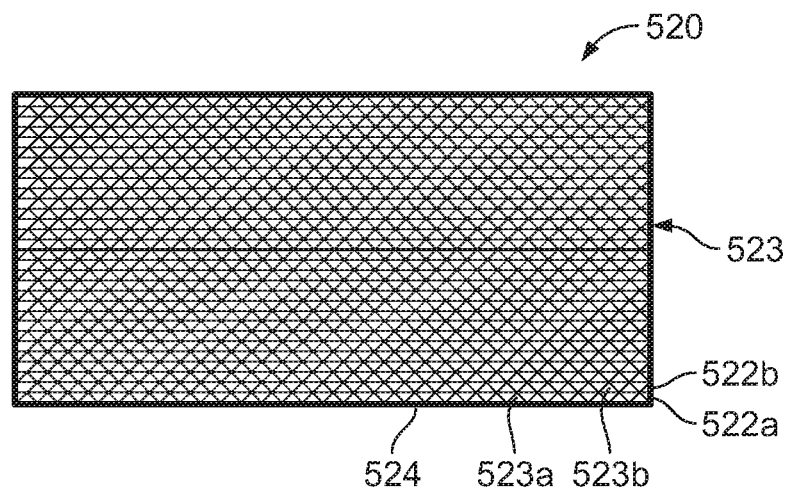
FIG. 23A is a back view and FIG. 23B is a front perspective view of a multilayered filter element having a wedge shaped outlet surface, according to yet another embodiment.
Figure 23B:
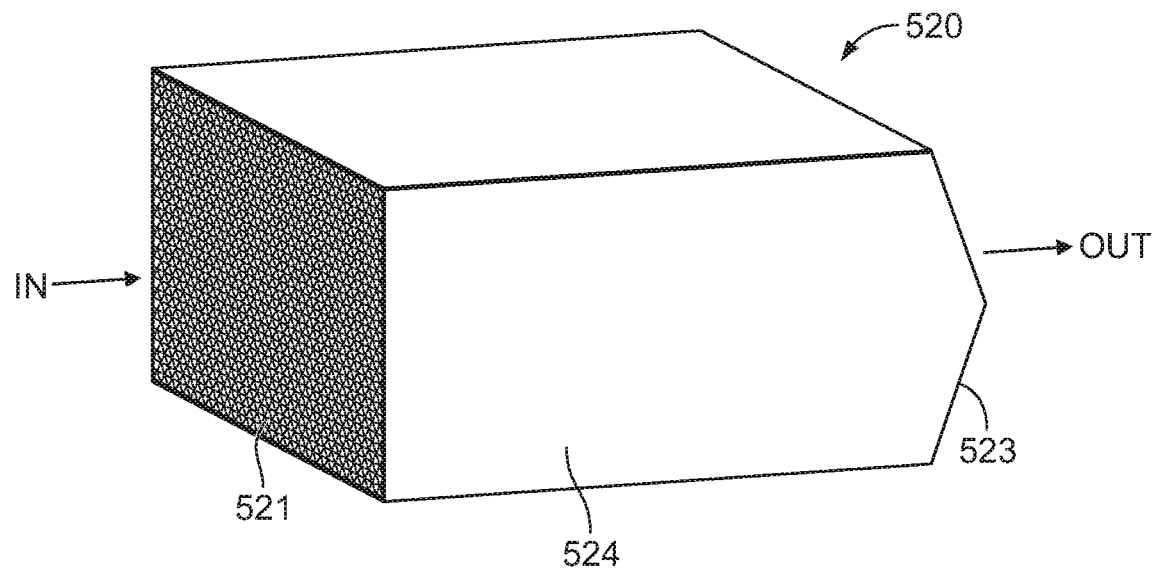

In some embodiments, different or unequal length filter media layers may be stacked to form a filter media pack such that an outlet surface of the filter media pack forms triangular wedge shape. For example, FIG. 23A is a back view and FIG. 23B is a front perspective view of a multilayered filter element 520 having a wedge shaped outlet surface, according to yet another embodiment. The filter element 520 includes a filter media pack 522 (e.g., comprising a tetrahedral filter media) having a polymeric layer 524 disposed on a plurality of sidewalls thereof that are parallel to a flow axis of the filter element 520. The filter media pack 522 defines an inlet surface 521 through which unfiltered fluid enters the filter media pack 522, and an outlet surface 523 through which filtered fluid is expelled from the filter media pack 522. The filter media pack 522 is constructed similar to filter media pack 322 with the difference that a second filter media layer edge 523b of a second filter media layer 522b is offset from a corresponding first filter media layer edge 525a of a first filter media layer 522a on which the second filter media layer 522b is disposed, the corresponding edges forming the outlet surface 523. This is repeated for each of the filter media layers in the stack till a center line of the filter media pack 522, i.e., progressively longer filter media layers are stacked till the center line of the filter media pack 522, after which progressively shorter filter media layers are stacked, such that the outlet surface 523 forms a triangular wedge shape.

Figure 24:
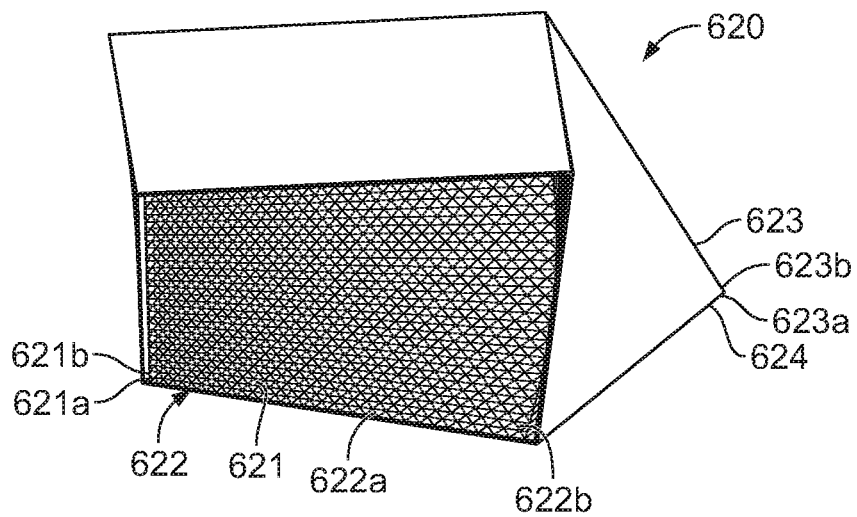
FIG. 24 shows a front perspective view.
Figure 25:
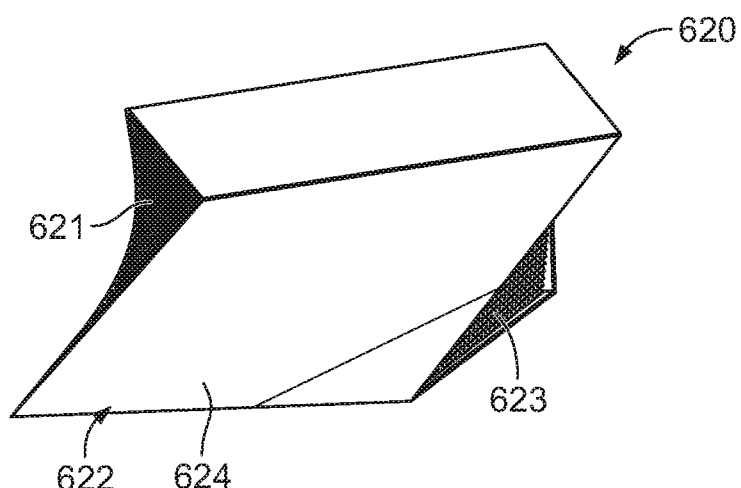
FIG. 25 is a right-side perspective view.
Figure 26:
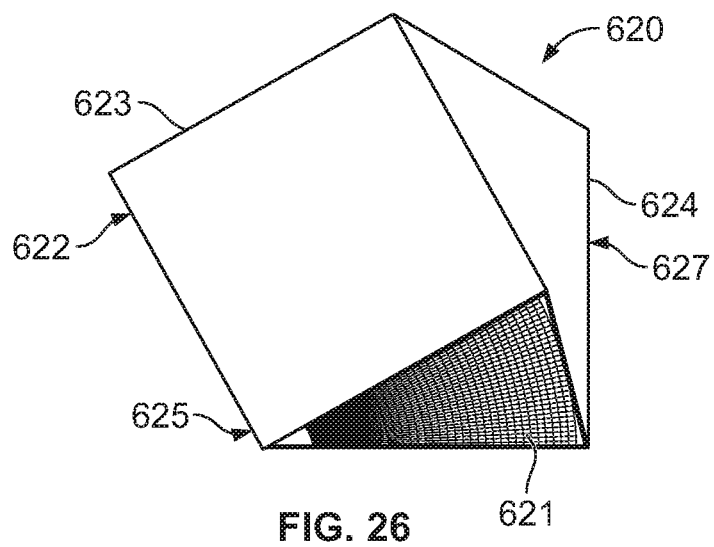
FIG. 26 is a top perspective view of a multilayered filter element having complex shapes with curved sidewalls, according to an embodiment.

FIG. 24-26 show various views of a multilayered filter element 620 having a complex shape with curved sidewalls, according to another embodiment. The filter element 620 includes a filter media pack 622 (e.g., comprising a tetrahedral filter media) having a polymeric layer 624 disposed on a plurality of sidewalls thereof that are parallel to a flow axis of the filter element 620. The filter media pack 622 defines an inlet surface 621 through which unfiltered fluid enters the filter media pack 622, and an outlet surface 623 through which filtered fluid is expelled from the filter media pack 622.

The filter media pack 622 includes a plurality of filter media layers stacked on each other to form the filter media pack 622. Each filter media layer of the plurality of filter media layers may have the same length or different lengths. A second filter media layer first corner 621b of a second filter media layer 622b is aligned with a corresponding first filter media layer first corner 621a of a first filter media layer 622a on which the second filter media layer 622b is disposed. Furthermore, a second filter media layer second corner 623b of the second filter media layer 622b diagonally opposite the second filter media layer first corner 621b of the second filter media layer 622b, is rotationally offset from a corresponding first filter media layer second corner 623a of the first filter media layer 622a. This is repeated for the subsequently stacked filter media layers such that the filter media pack 622 has a continuously curving shape.

While various embodiments have been described with respect to FIGS. 20A-26, these examples are non-limiting and various other embodiments or multilayers filter media packs are envisioned. For example, in various embodiments, the offset between individual filter media layers in a filter media pack may not to be consistent in size through the layered media pack. In some embodiments, a filter media pack may be formed using filter media layers such that the filter media pack has a swooped arched shape, includes a portion of filter media layers that are partially offset and then are flat stacked (i.e., are no offset from each other), includes a combination of shapes (e.g., arch, fixed, flat, etc. in a single filter media pack), or includes asymmetric length filter media layers such that the filter media pack has an asymmetric shape.

Figure 27A:
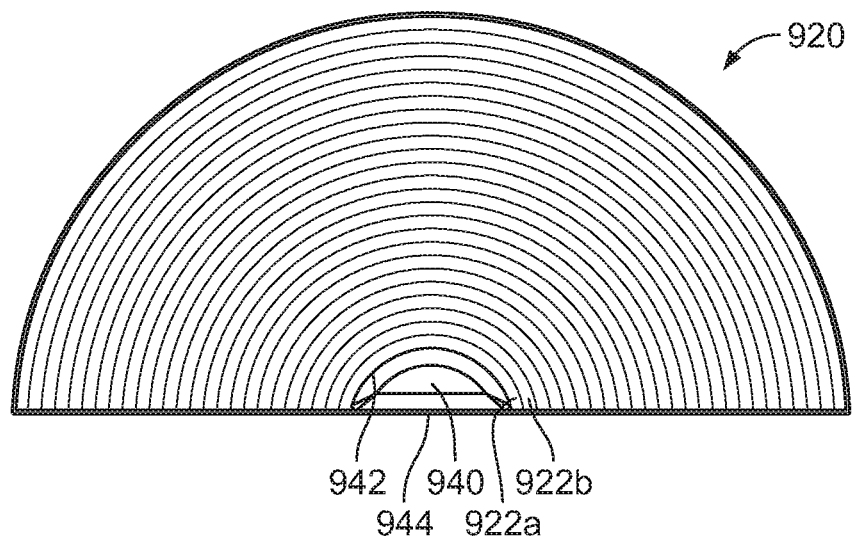
FIG. 27A is a front view.
Figure 27B:
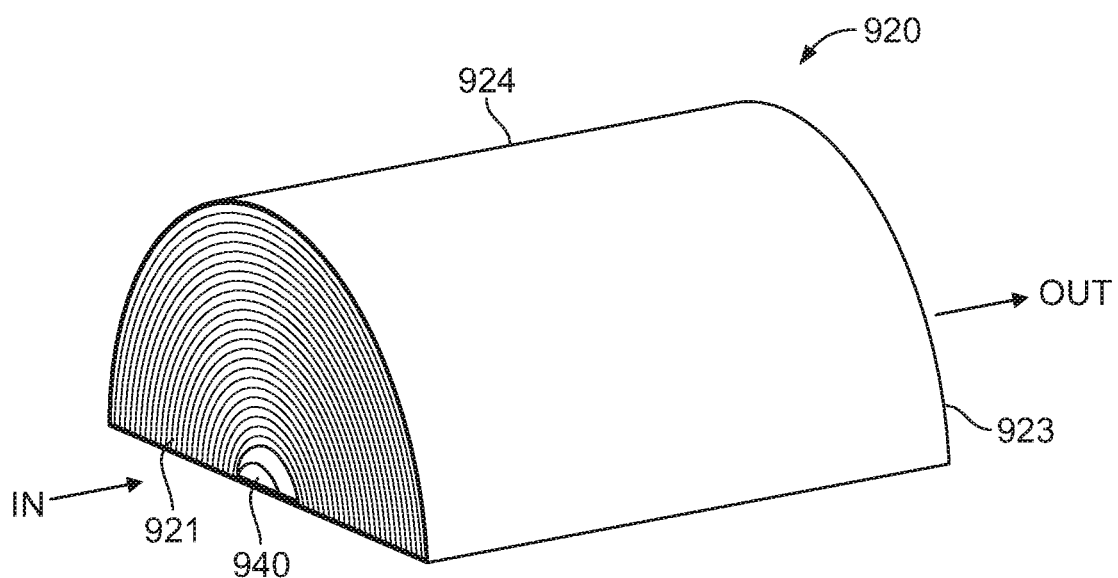
FIG. 27B is a perspective view of a multilayered filter element having a semi-circular cross-section, according to an embodiment.

In some embodiments, a filter element may include a plurality of filter media layers stacked on a core. For example, FIG. 27A is a front view, and FIG. 27B is a perspective view of a multilayered filter element 920 having a semi-circular cross-sectional shape, according to an embodiment. The filter element 920 includes a filter media pack 922 (e.g., comprising a tetrahedral filter media) having a polymeric layer 924 disposed on a plurality of sidewalls thereof that are parallel to a flow axis of the filter element 920. The filter media pack 922 defines an inlet surface 921 and an outlet surface 923.

The filter element 920 may comprise a core 940. A plurality of filter media layers are stacked on an outer surface of the core 940 to form the filter media pack 922. The core 940 may be formed from plastic, polymers or any other suitable material. The filter media layers have different lengths such that the outer edges of the stacked filter media layers are aligned. For example, as shown in FIG. 27A, a first filter media layer 922a having a first length is disposed on a portion 942 of the core 940. A second filter media layer 922b having a second length longer than the first length is disposed on the first filter media layer 922a such that outer edges of the first filter media layer 922a and the second filter media layer 922b are aligned.

The portion 942 of the core 940 define a curved surface such that the filter media pack 922 conforms to the shape of the core 940 and defines a filter media pack cross-sectional shape corresponding to a curvature of the portion 942. For example, as shown in FIGS. 27A-B, the portion 942 is semi-circular such that the filter media pack 922 defines a semicircular shape. An opposite portion 944 of the core is rectiplanar, but in other embodiments, may also be circular. In still other embodiments, the portion 942 may have any other suitable shape, for example, oval, elliptical, polygonal, asymmetrical or any other suitable shape, and the filter media pack 922 has a corresponding shape. Once formed, the core 940 may be removed from the filter element 920 such that the filter element 920 such that the filter media pack 922 defines a central channel defining a central channel cross-sectional shape corresponding to the filter media pack cross-sectional shape. The central channel may then be sealed or plugged (e.g., via end caps or sealant such as polyurethane).

Figure 28:
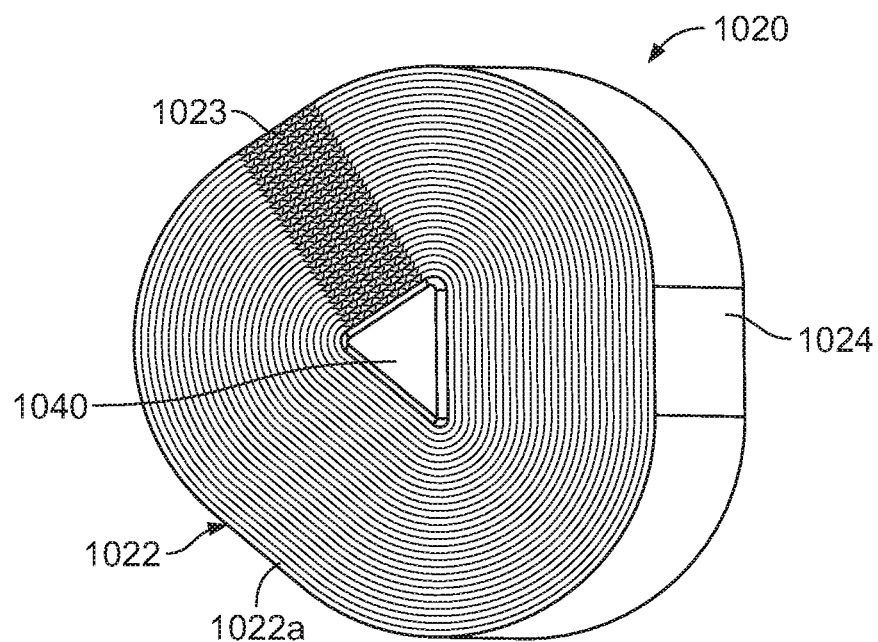
FIG. 28 is a perspective view of a wrapped filter element, according to an embodiment.
Figure 29:
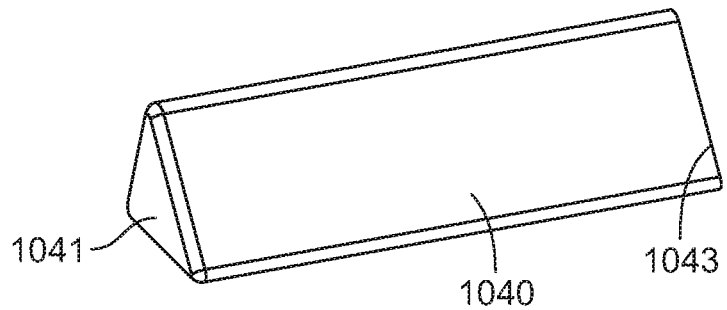
FIGS. 29-30 are perspective views of two embodiments of cores that may be included in the filter element of FIG. 28.

In various embodiments, a filter element may include a layered filter media pack that has a non-circular shape. For example, FIG. 28 is a perspective view of a filter element 1020, according to an embodiment. The filter element 1020 includes a core 1040 having a non-circular core cross-sectional shape, for example, a triangular cross-section as shown in FIG. 29, but may have any other suitable cross-section. The filter element 1020 includes a filter media pack 1022 (e.g., comprising a tetrahedral filter media) disposed around an outer periphery of the core 1040. Expanding further, the filter media pack 1022 comprises a plurality of filter media layers 1022a stacked on an outer periphery of the core 1040 such that the filter media pack 1022 has a filter media pack cross-sectional shape that corresponds to the core cross-sectional shape, for example, is substantially triangular but has rounded edges. In other embodiments, the filter element 1020 may include a filter media layer wrapped around the outer periphery of the core 1040 such that the filter media pack 1022 is a coiled filter media pack. In the implementation shown in FIG. 28, the core has a triangular core cross-section such that the filter media pack 1022 has a tri-lobal shape so as to have a triangular cross-section. A bond 1023 may be formed across a width of the filter media pack 1022 to secure the wrapped filter media pack 1022 and prevent the filter media pack 1022 from unwrapping. In some embodiments, a polymeric layer 1024 (e.g., a urethane or polyurethane layer, rubbers, silicones, etc.) may be disposed on an outer surface of the filter media pack 1022 parallel to a flow axis of the filter media pack 1022, as previously described herein. Once formed, the core 1040 may be removed from the filter element 1020 such that the filter element 1020 such that the filter media pack 1022 defines a central channel defining a central channel cross-sectional shape corresponding to the non-circular filter media pack cross-sectional shape (i.e., has a triangular shape or tri-lobal shape). The central channel may then be sealed or plugged (e.g., via end caps or sealant such as polyurethane).

FIG. 29 shows a side perspective view of the core 1040 included in the filter element 1020. The core 1040 has a uniform cross-section from a first end 1041 to a second end 1043 thereof that is opposite the first end 1041. The core 1040 may be formed from plastic, paper, cardboard, polymers or any other suitable material. In some embodiments, the core 1040 may be solid. In other embodiments, the core 1040 may be hollow.

Figure 30:
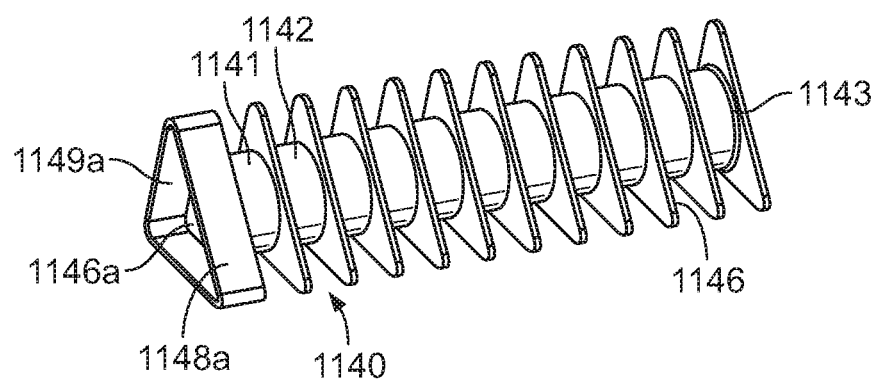

FIG. 30 is a side perspective view of a core 1140, according to another embodiment. Different from the core 1040, the core 1140 comprises a central shaft 1142 extending longitudinally from a first end 1141 to a second end 1143 thereof opposite to the first end 1141. The central shaft 1142 has a circular cross-section. A plurality of circumferential ribs 1146 protrude radially from the central shaft 1142 at predetermined locations on the central shaft 1142, for example, offset at a fixed distance from each other. Each of the plurality of circumferential ribs 1146 define the core cross-section, i.e., have the triangular cross-section. In particular embodiments, a first circumferential rib 1146a of the plurality of circumferential ribs 1146 disposed at the first end 1141 of the central shaft 1142 comprises a rib sidewall 1148a extending from outer edges of the first circumferential rib 1146a away from the central shaft 1142 such that a cavity 1149a is defined between the first circumferential rib 1146a and the rib sidewall 1148a. In various embodiments, the cavity 1149a may be configured to receive a correspondingly shaped pin or key, for example, to be inserted into the cavity 1149a and be rotated for stacking the filter media layer 1022a on the core 1140 so as to form the filter media pack 1022.

Figure 31:
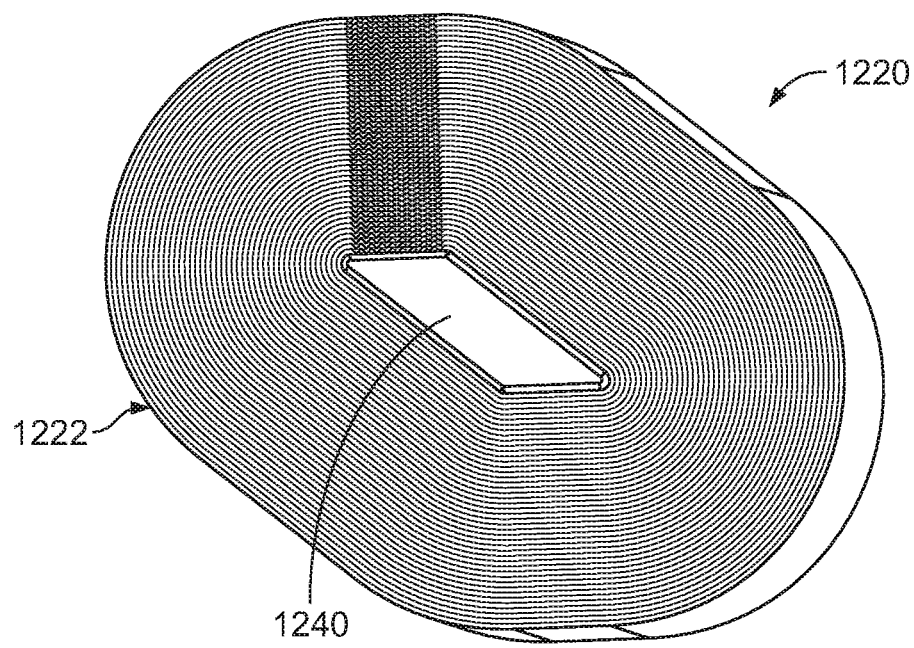
FIGS. 31-32 are perspective views of wrapped filter elements, according to various embodiments.

While the filter element 1020 includes a triangular shaped core 1040 so that the filter media pack 1022 has a triangular or tri-lobal core cross-sectional shape, in other embodiments, any other core having any other core cross-sectional shape may be used, for example, a polygonal cross-sectional shape. For example, FIG. 31 is a perspective view of a wrapped filter element 1220 that includes a filter media pack 1222 (e.g., comprising a tetrahedral filter media) wrapped around a core 1240. The core 1240 has a core cross-sectional shape comprising a rhombus or parallelogram such that the filter media pack 1222 also has a rhomboidal cross-sectional shape. The core 1240 can be removed such that the filter media pack 1222 defines a central channel having a rhomboidal cross-sectional shape. In other embodiments, the filter element 1220 may include a filter media layer wrapped around the outer periphery of the core 1240 such that the filter media pack 1222 is a coiled filter media pack.

Figure 32:
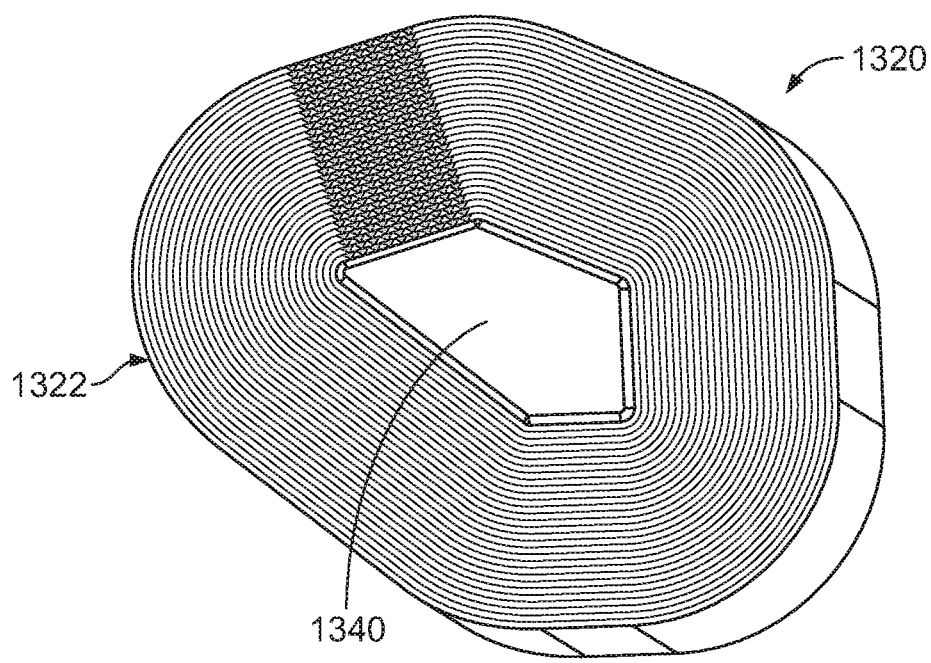

FIG. 32 is a perspective view of a wrapped filter element 1320 that includes a filter media pack 1322 (e.g., comprising a tetrahedral filter media) comprising a plurality of filter media layers stacked on an outer surface of a core 1340. The core 1340 has a polygonal core cross-sectional shape such that the filter media pack 1322 also has a polygonal cross-section corresponding to the core cross-section. The core 1340 can be removed such that the filter media pack 1322 defines a central channel having a polygonal cross-sectional shape. In other embodiments, the filter element 1320 may include a filter media layer wrapped around the outer periphery of the core 1340 such that the filter media pack 1322 is a coiled filter media.

Figure 33:
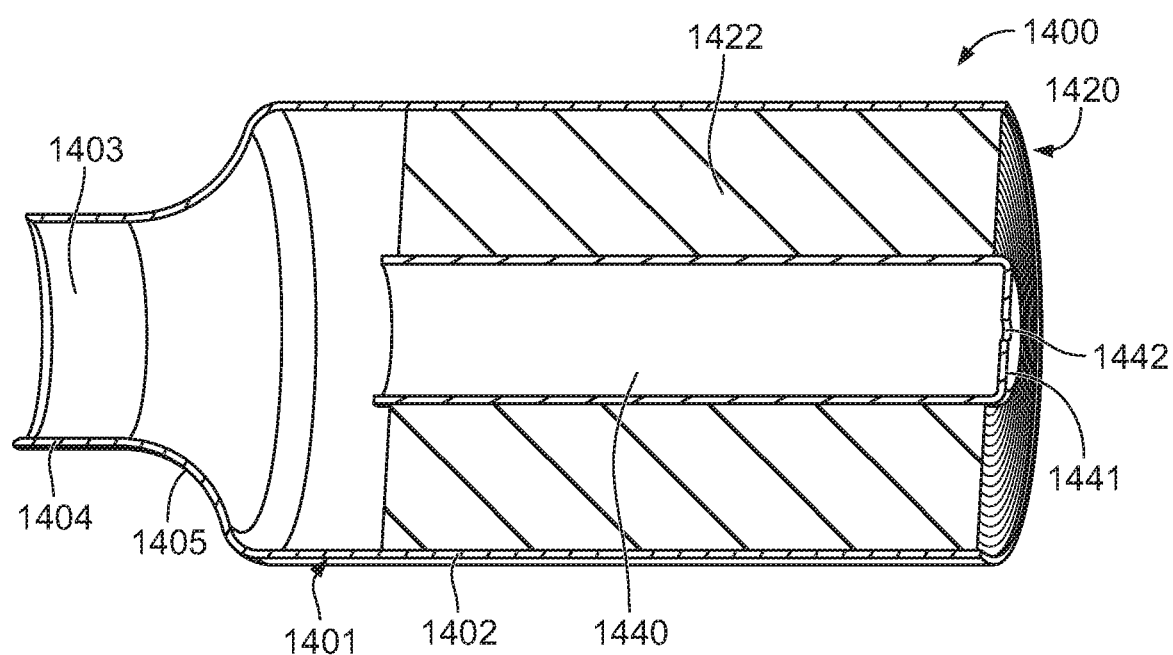
FIG. 33 is a cross-section view of a filter element, according to an embodiment.

In some embodiments, a stacked filter media pack may include an integrated housing bonded or sealed via a sealing member to an outer surface of the stacked filter media pack. For example, FIG. 33 is a cross-section view of a filter assembly 1400, according to an embodiment. The filter assembly 1400 comprises a filter element 1420 having a core 1440, and a filter media pack 1422 (e.g., comprising a tetrahedral filter media) having a plurality of filter media layers stacked on an outer periphery of the core 1440. While FIG. 33 shows the core 1440 as having a circular cross-section, in other embodiments, the core 1440 may have any other suitable cross-section, for example, rhomboidal, square, rectangular, polygonal, elliptical, oval, asymmetrical, etc. In some embodiments, the core 1440 may include a center tube.

The filter assembly 1400 also comprises a filter housing 1401. The filter housing 1401 includes a housing portion 1402 defining an internal volume within which the filter element 1420 is disposed. An outer radial surface of the filter media pack 1422 is bonded to an inner radial surface of the housing portion 1402. For example, the housing portion 1402 may be separately formed and then the filter element 1420 inserted into the housing portion 1402 thereof, and the outer radial surface of the filter media pack 1422 bonded or sealed to the inner radial surface of the housing portion 1402. In other embodiments, the filter housing 1401 may be molded over the filter element 1420, or formed by coating (e.g., spray coating or dip coating) a polymeric material (e.g., foam urethane or structural polyurethane) on the outer radial surface of the filter media pack 1422 so as to form the filter housing 1401 bonded to the outer radial surface of the filter media pack 1422. In this manner, filter assemblies are realized in which the entire cross-section of the filter housing 1401 is utilized by the filter element 1420 disposed therein.

The filter housing 1401 also includes a coupling portion 1404 fluidly coupled to the housing portion 1402 distal from the filter element 1420. The coupling portion 1404 defines an opening 1403 for allowing fluid to flow therethrough, for example, allow unfiltered fluid to flow into the housing portion 1402 and serve as an inlet of the filter housing 1401, or allow filtered fluid to be expelled from the filter housing 1401, therefore serving as an outlet of the filter housing 1401. In some embodiments as shown in FIG. 33, the coupling portion 1404 has a smaller cross-section than the housing portion 1402. In such embodiments, a connecting wall 1405, for example, a tapered or curved wall, extends from a rim of the coupling portion 1404 to a rim of the housing portion 1402 so as to fluidly couple the coupling portion 1404 to the housing portion 1402.

Figure 34A:
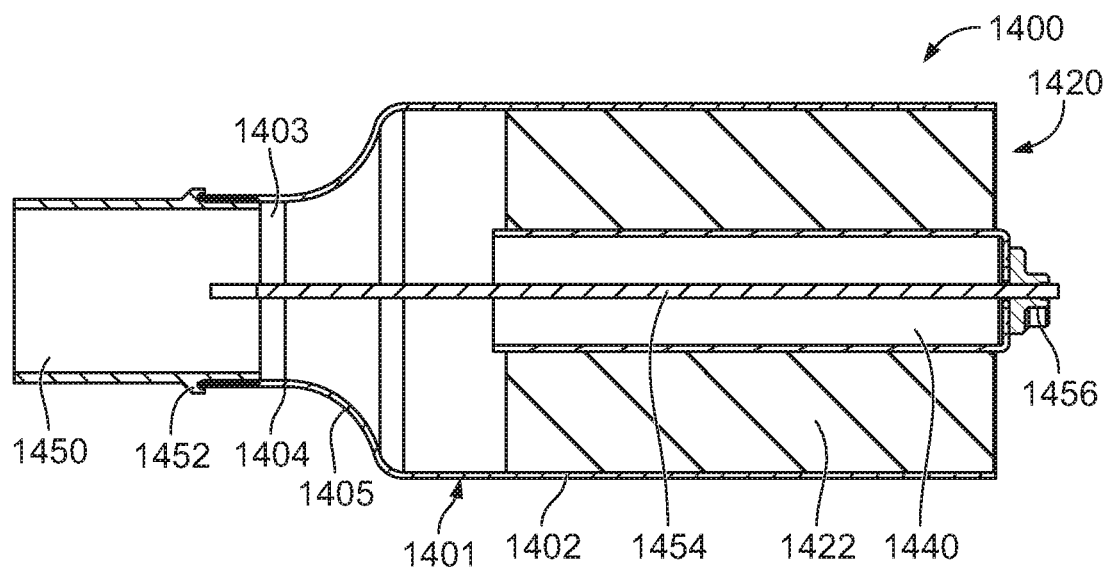
FIG. 34A is a side cross-section view.
Figure 34B:
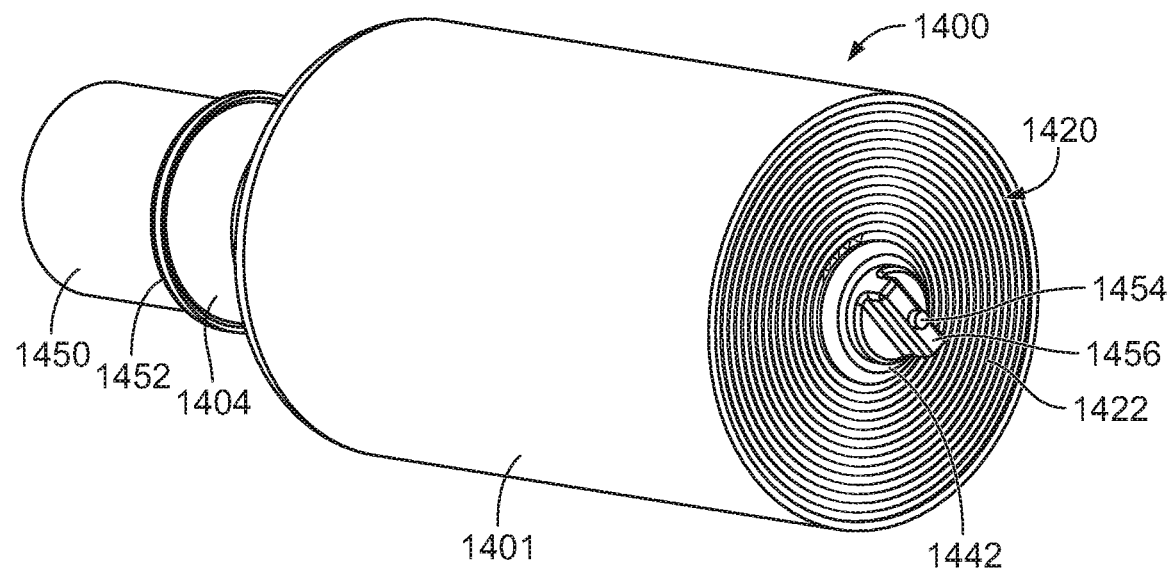
FIG. 34B is a front perspective view of the filter element of FIG. 33 coupled to a conduit, according to an embodiment.

The coupling portion 1404 is configured to be coupled to a conduit. FIGS. 34A-B show a conduit 1450 coupled to the coupling portion 1404, according to a particular embodiment. The core 1440 is hollow, and an aperture 1442 is defined on an end wall 1441 of the core 1440 disposed perpendicular to a longitudinal axis of the filter assembly 1400 distal from the coupling portion 1404. A rod 1454 extends from the conduit 1450 through the hollow core 1440 and through the aperture 1442. The rod 1454 is coupled to an inner surface of the conduit 1450, for example, via a screw, nut, bolt, or welded thereto.

The filter assembly 1400 also comprises a knob 1456 configured to removably engage the rod 1454, i.e., a portion of the rod 1454 that protrudes through the aperture 1442, to secure the filter assembly 1400 to the conduit 1450. For example, as shown in FIG. 34A-B, the portion of the rod 1454 protruding through the aperture 1442 may define threads on an outer surface thereof. The knob 1456 defines a throughhole having mating threads formed on an inner surface of the throughhole, that are structured to removably engage the threads of the rod 1454 so as to removably couple the filter assembly 1400 to the conduit 1450.

The conduit 1450 comprises a circumferential ledge 1452 protruding radially from an outer surface of the conduit 1450. The coupling portion 1404 is configured to be disposed circumferentially around a portion of the conduit 1450 such that an axial edge of the coupling portion 1404 contacts the ledge 1452 and may form an axial seal therewith. Expanding further, as the knob 1456 engages the rod 1454, a surface of the knob 1456 contacts the corresponding end wall 1441 of the core 1440 and pushes the core 1440, and thereby the filter element 1420 and the filter housing 1401 towards the conduit 1450. This causes the axial end of the coupling portion 1404 to press against the ledge 1452, thereby creating an axial seal between the axial edge of the coupling portion 1404 and the ledge 1452. In some embodiments, a radial seal member may be used to seal the coupling portion 1404 to the conduit 1450. In such embodiments, the circumferential ledge 1452 may be excluded.

Figure 35A:
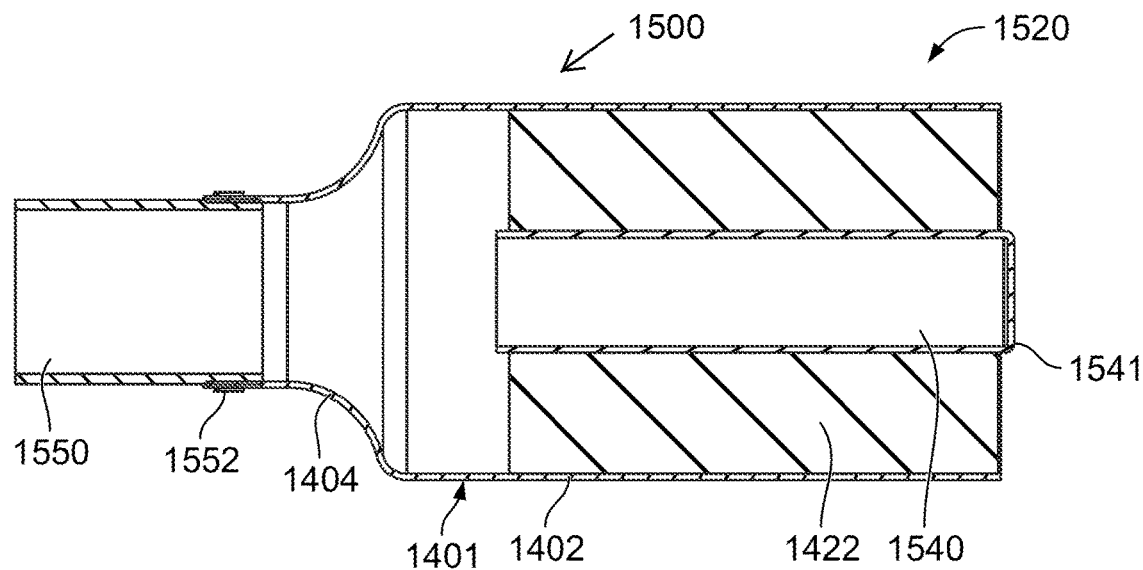
FIG. 35A is a side cross-section view.
Figure 35B:
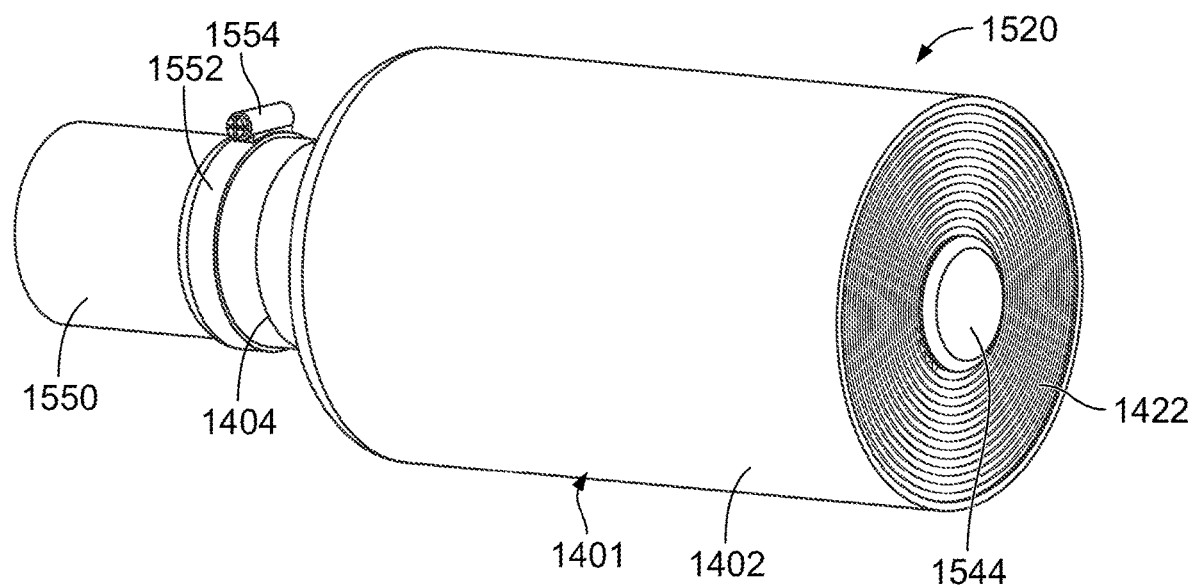
FIG. 35B is a front perspective view of a filter element coupled to a conduit, according to another embodiment.
Figure 36A:
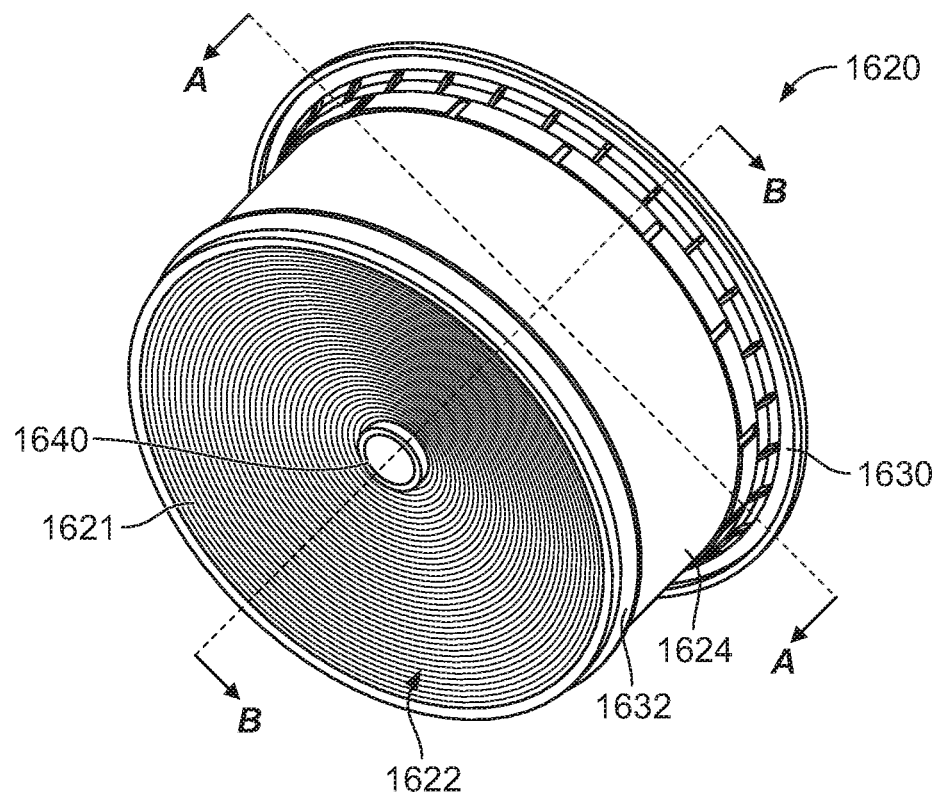
FIG. 36A is a bottom perspective view of a filter element, according to an embodiment.
Figure 36B:
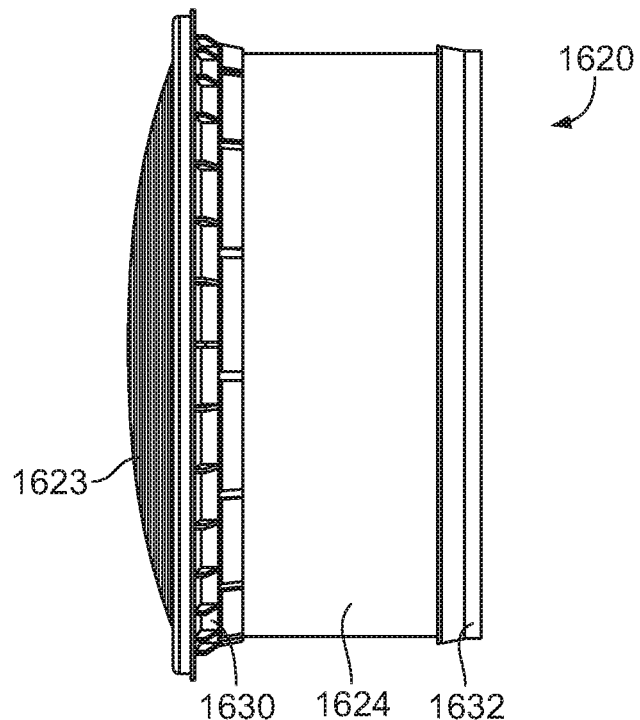
FIG. 36B is a side view of the filter element.
Figure 36C:
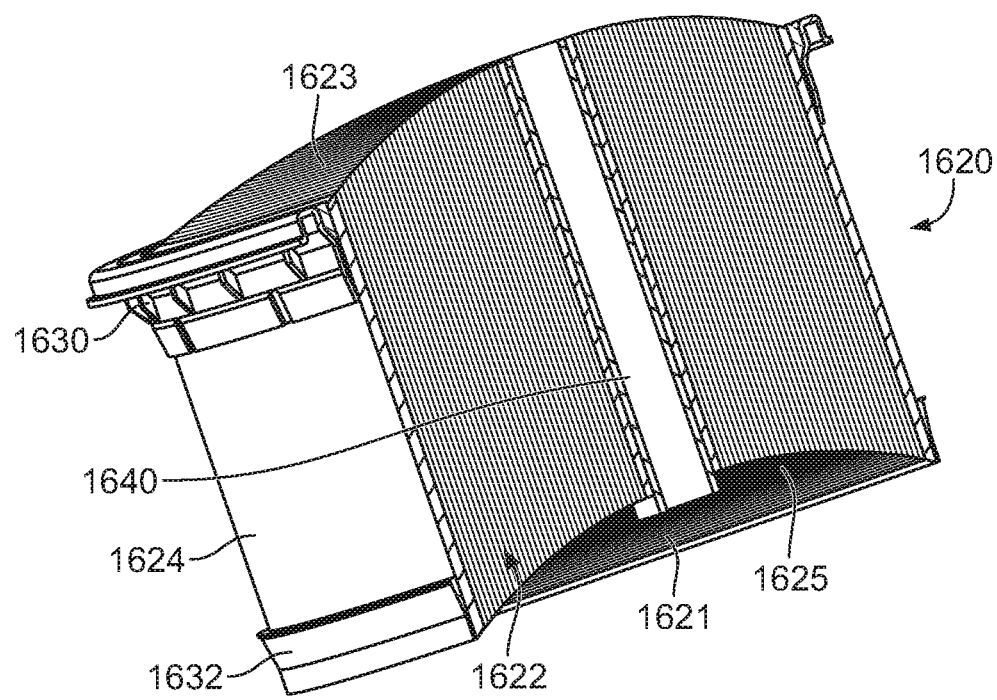
FIG. 36C is a side cross-section view taken along the line A-A in FIG. 36A.
Figure 36D:
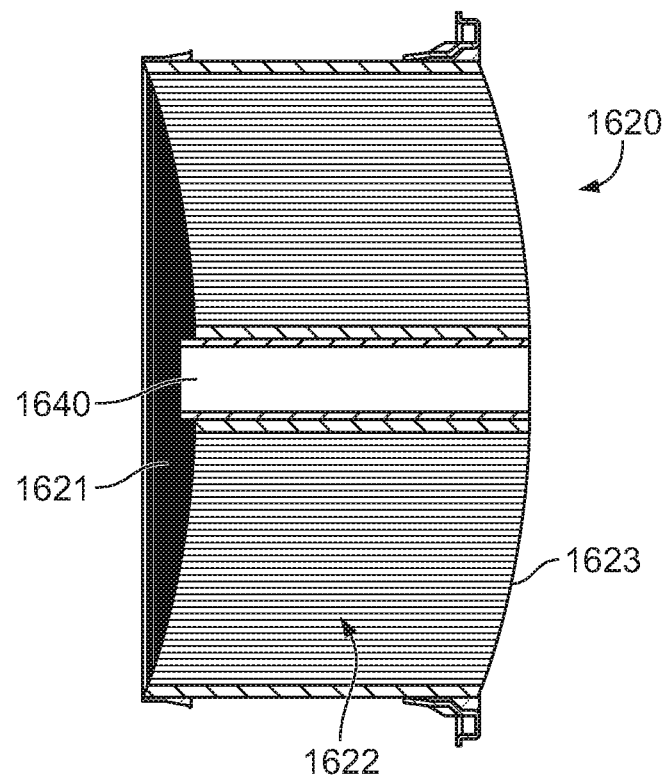
FIG. 36D is a side cross-section view taken along the line B-B in FIG. 36A of the filter element of FIG. 36A.

FIG. 35A is a side cross-section view, and FIG. 35B is a front perspective view of a filter assembly 1500 including a filter element 1520 coupled to a conduit 1550, according to another embodiment. The filter element 1520 is similar to the filter element 1420 and includes the filter media pack 1422 disposed in the housing portion 1402 of the filter housing 1401. Different from the core 1440, the filter assembly 1500 includes a hollow core 1540 that has an end wall 1541 that does not include an aperture defined therethrough.

The coupling portion 1404 of the filter housing 1401 is disposed circumferentially around the outer surface of the conduit 1550. The filter assembly 1500 further comprises a clamp 1552 disposed around the coupling portion 1404 so as to secure the coupling portion 1404 to the conduit 1550. For example, as shown in FIG. 35B, the clamp 1552 includes a circular band provided with a lead screw 1554 that is configured to tighten the clamp 1552 (i.e., reduce a circumference thereof) so as to secure the coupling portion 1404 to the conduit 1550.

While FIGS. 34A-34B and 35A-35B show the cores 1440, 1540 as having a circular cross-section, in other embodiments, the filter assembly 1400, 1500 may include cores having any suitable cross-section. In some embodiments, the core for the filter assembly 1400, 1500 may have a non-circular core cross-section, such that the filter media pack wrapped therearound has a filter media pack cross-sectional shape corresponding to the core cross-sectional shape. For example, the core cross-sectional shape may be a triangular, polygonal, rhomboidal, elliptical, or oval, and the filter media pack cross-sectional shape corresponds to the core cross-sectional shape.

Filter media packs generally have an inlet surface and an outlet surface that is flat. In certain situations, shapes of inlet or outlet conduits coupled to the filter element may create restrictions on shapes of the filter element. In various embodiments, an inlet surface or an outlet surface of a filter media pack may define a curvature or generally a non-flat profile. For example, FIGS. 36A-36D are various views of a filter element 1620, according to an embodiment. The filter element 1620 comprises a filter media pack 1622 (e.g., comprising a tetrahedral filter media) that may be stacked on or wrapped around an outer surface of a core 1640. The core 1640 is hollow, but in other embodiments, a solid core may be used.

A polymeric layer 1624 (e.g., a foam urethane or structural polyurethane) is disposed on an outer surface of the filter media pack 1622. The filter media pack 1622 includes an inlet surface 1621 configured to receive unfiltered fluid, and an outlet surface 1623 configured to expel filtered fluid from the filter media pack 1622. A radial seal member 1632 is disposed circumferentially around the filter media pack 1622 proximate to the inlet surface 1621. A support structure 1630 disposed circumferentially around the filter media pack 1622 proximate to the outlet surface 1623 and coupled thereto. As shown in FIGS. 36A-D, the inlet surface 1621 defines a concave shaped curvature curving inwards from outer edges of the inlet surface 1621, and the outlet surface 1623 defines a convex shaped curvature curving outwards from the filter media pack 1622. For example, as filter media layers are stacked on the core 1640, each filter media layer is axially offset from the previous layer, or a filter media layer is wrapped around the core 1640 to form the filter media pack 1622, each subsequent coil is offset slightly from the previous coil so as to produce the concave shaped inlet surface 1621 and the convex shaped outlet surface 1623. Such a shape may maximize space utilization and allows installation in filter housing having non-flat inlet and outlet surfaces.

Figure 37:
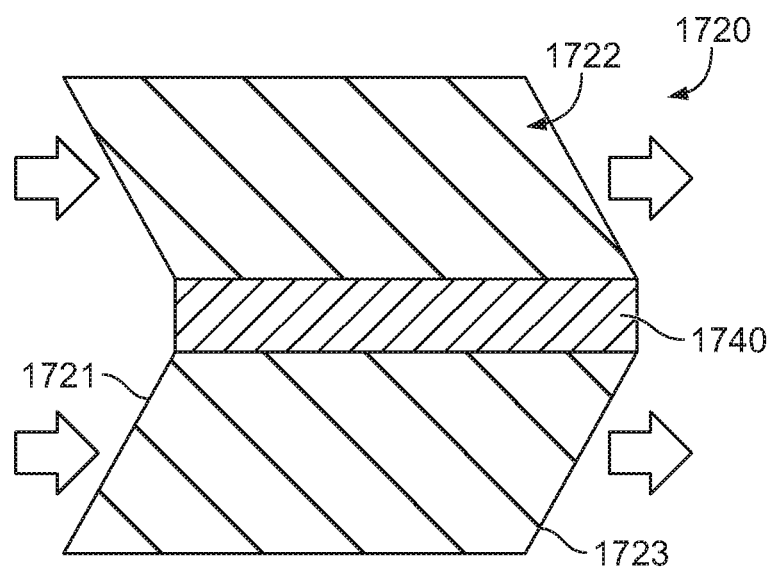
FIG. 37-38 are side cross-section views of filter elements, according to various embodiments.

FIG. 37 is a side cross-section view of a filter element 1720, according to another embodiment. The filter element 1720 includes a filter media pack 1722 stacked on or wrapped around a core 1740. The filter media pack 1722 is stacked or wrapped such that an inlet surface 1721 tapers from a rim of the inlet surface 1721 towards the core 1740, and an outlet surface 1723 thereof tapers outwardly from an outer edge of the outlet surface towards the core 1740 such that the inlet surface 1721 and the outlet surface 1723 have a chevron shape.

Figure 38:
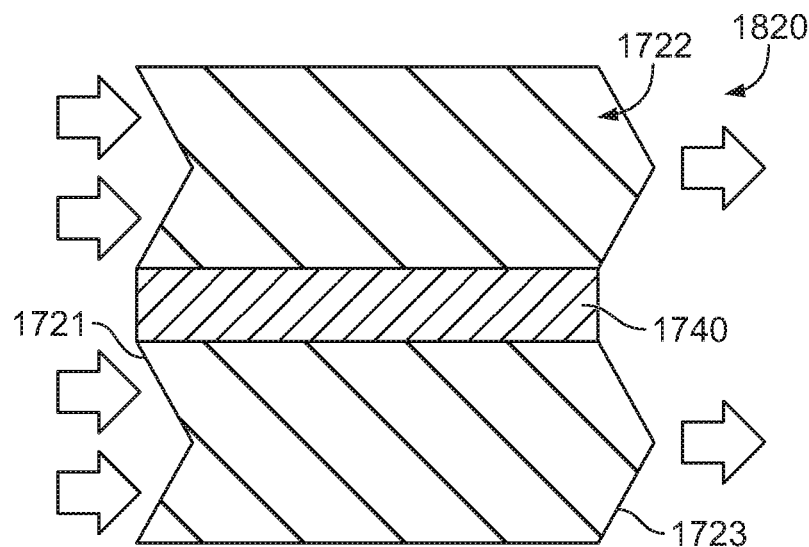

FIG. 38 is a side cross-section view of a filter element 1820, according to another embodiment. The filter element 1820 includes the filter media pack 1722 stacked on or wrapped around the core 1740 such that the inlet surface 1721 defines a circumferential chevron shape or V-shape projecting inwards from the core 1740, and the outlet surface 1723 defines an outward projecting chevron or V shape. In other embodiments, the inlet surface 1721 and/or the outlet surface 1723 may include a gradual transition in shape that then reverses direction.

Figure 39:
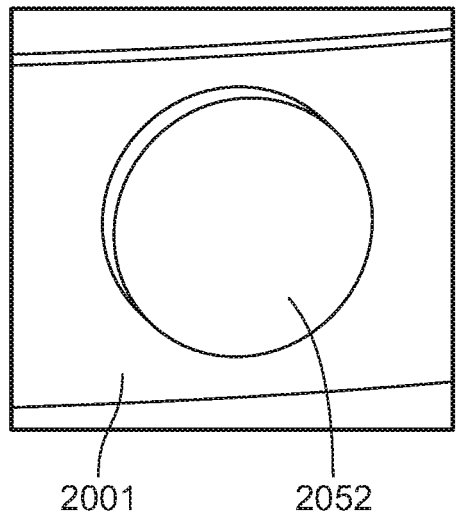
FIG. 39 is a side view of a portion of a filter housing having a circular protrusion defined on an inner surface thereof.
Figure 40:
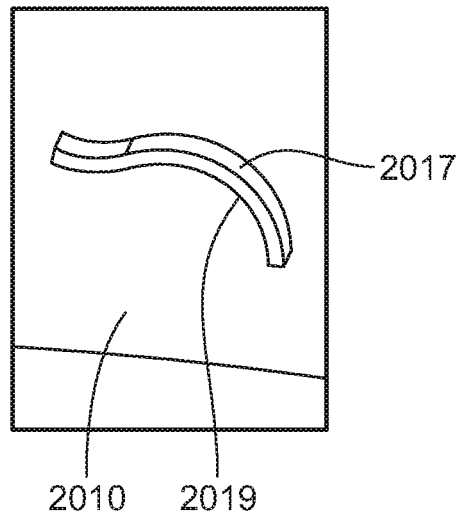
FIG. 40 is a side view of a portion of an outer surface of a filter element having mating engagement features corresponding to the circular protrusion.
Figure 41:
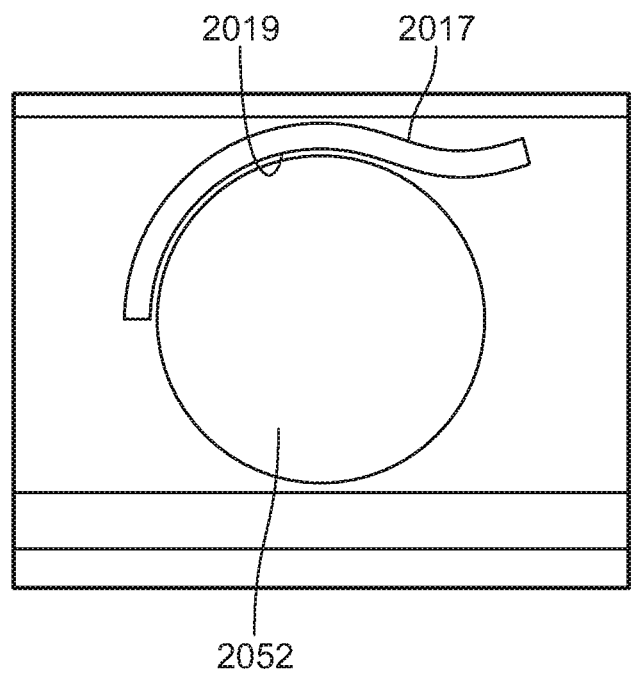
FIG. 41 is a schematic illustration showing the engagement feature engaging the circular protrusion, according to an embodiment.

Various coupling structures may be used to secure a filter element (e.g., any of the filter elements described herein) within a filter housing, and allow swift coupling and uncoupling of a filter element from a filter housing. For example, FIG. 39 shows a perspective view of a portion of an inner surface of a filter housing 2001, and FIG. 40 shows an outer surface of a filter element 2010, according to an embodiment. A circular protrusion 2052 projects radially inwards from the inner surface of the filter housing 2001, and a corresponding engagement feature comprising a ledge 2017 protrudes radially outwards from an outer surface of the filter element 2010. In other embodiments, the protrusion 2052 may be formed on an outer surface of the filter element 2010, and the ledge 2017 formed on an inner surface of the filter housing 2001. The ledge 2017 includes a curved portion 2019 such that the ledge 2017 has an eyebrow shape. The curved portion 2019 defines a curvature corresponding to an arc segment of the circular protrusion 2052 and is configured to engage the circular protrusion 2052 as shown in FIG. 41 to secure the filter element 2010 to the filter housing 2001.

Figure 42A:
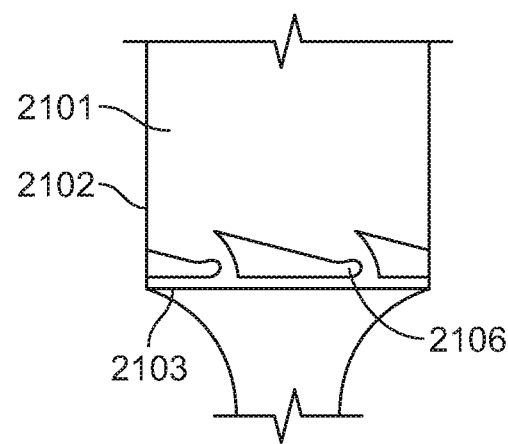
FIG. 42A is a side view of a portion of a filter housing including ramps.
Figure 42B:
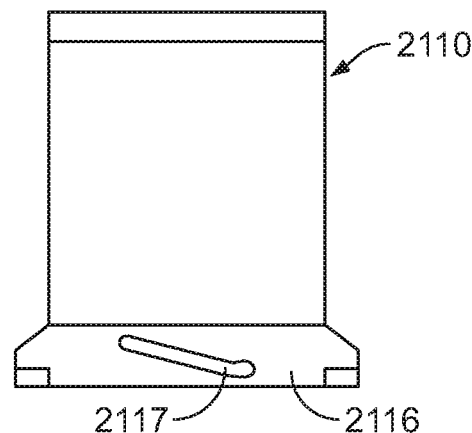
FIGS. 42B and 42C are side views and top view of a filter element including engagement features, according to an embodiment.
Figure 42C:
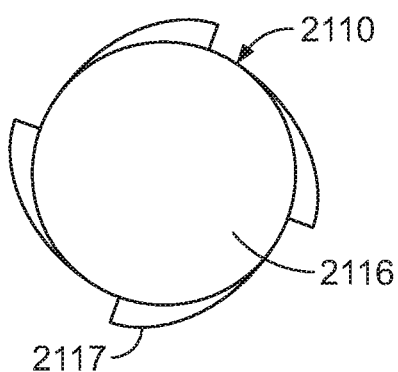

FIGS. 42A-44C show various embodiments of coupling structures for securing a filter element within a filter housing. For example, FIG. 42A shows a side cross-section view of a filter housing 2101, according to an embodiment. A plurality of ramps or slots 2106 are defined (e.g., molded) into an inner surface of a sidewall 2102 of the filter housing 2101 proximate to a base 2103 of the filter housing 2101. FIG. 42B shows a side view, and FIG. 42C shows a top view of a filter element 2110, according to an embodiment. The filter element 2110 comprises a plurality of mating engagement features configured to engage the ramps 2106. Each of the engagement feature comprises a curved rib 2117 protruding radially outwards from an outer surface of the filter element 2110 (e.g., defined on an outer surface of an end plate 2116 coupled to a filter media pack of the filter element 2110). The curved rib 2117 is configured to slide into the corresponding ramp 2106 so as to secure the filter element 2110 within the filter housing 2001.

Figure 43A:
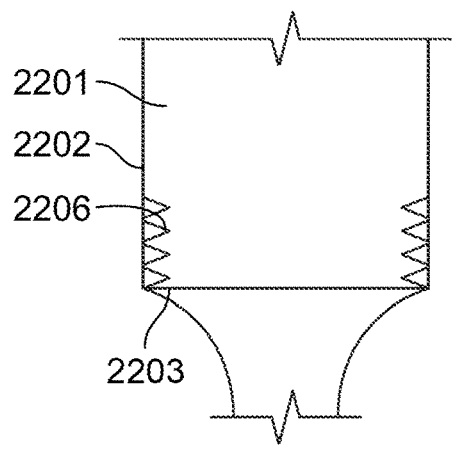
FIG. 43A is a side view of a portion of a filter housing including filter housing threads.
Figure 43B:
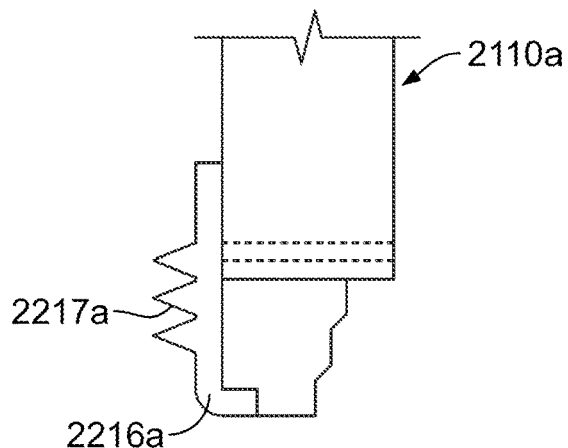
FIGS. 43B and 43C are side views two embodiments of a filter element including filter element threads configured to engage the filter housing threads, according to an embodiment.
Figure 43C:
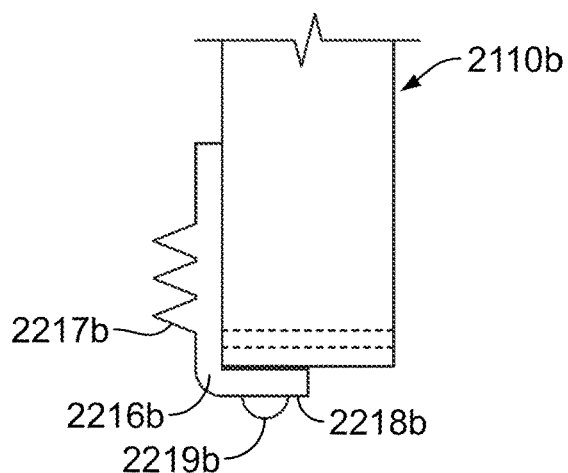

FIG. 43A shows a side cross-section view of a filter housing 2201, according to an embodiment. Filter housing threads 2206 are defined on an inner surface of a sidewall 2202 of the filter housing 2201 proximate to a base 2203 thereof. FIG. 43B shows a side view of a filter element 2210a, according to one embodiment. Filter element threads 2217a are defined on a sidewall of an end plate 2216a of the filter element 2210a, and are configured to matingly engage the filter housing threads 2206 to secure the filter element 2210a within the filter housing 2201. FIG. 43C is a side view of a filter element 2210b, according to another embodiment. The filter element 2210b is similar to the filter element 2210a, and includes an end plate 2216b having filter element threads 2217b defined on a sidewall thereof and configured to engage the filter housing threads 2206. Furthermore, the end plate 2216b also includes a circular sealing member 2219b projecting axially from an end plate base 2218b of the end plate 2216b, and is configured to form an axial seal with an inner surface of the base 2203 of the filter housing 2201.

Figure 44A:
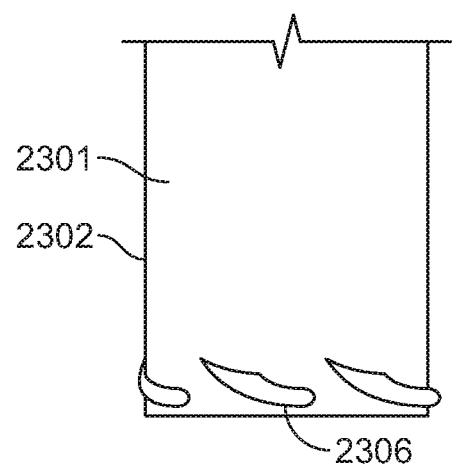
FIG. 44A is a side view of a portion of a filter housing including ramps.
Figure 44B:
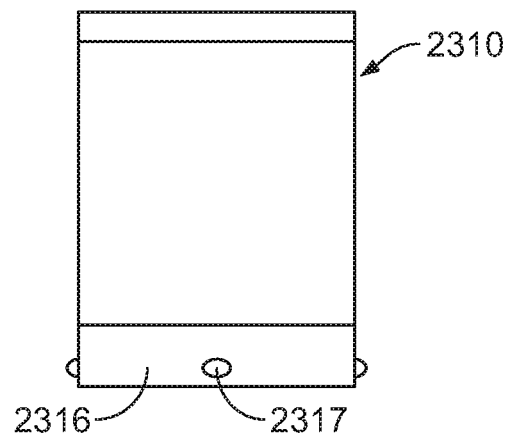
FIGS. 44B and 44C are a side view and a top view, respectively, of a filter element including lugs configured to engage the ramps, according to an embodiment.
Figure 44C:
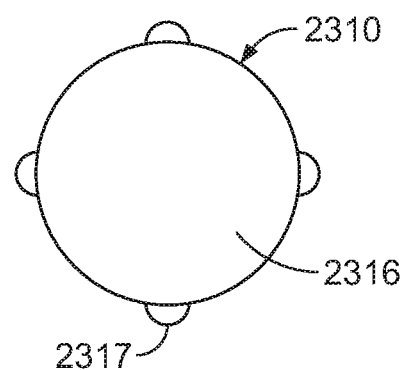

FIG. 44A shows a side cross-section view of a filter housing 2301, according to yet another embodiment. A plurality of ramps 2306 are defined (e.g., molded) into an inner surface of a sidewall 2302 of the filter housing 2301. FIG. 44B shows a side view, and FIG. 44C shows a top view of a filter element 2310, according to an embodiment. The filter element 2310 comprises a plurality of mating engagement features configured to engage the ramps 2306. Each of the engagement feature comprises a lug 2317 protruding radially outwards from an outer surface of the filter element 2310 (e.g., defines on an outer surface of an end plate 2316 coupled to a filter media pack of the filter element 2310). The lug 2317 is configured to slide into the corresponding ramp 2306 so as to secure the filter element 2310 within the filter housing 2301.

Figure 45:
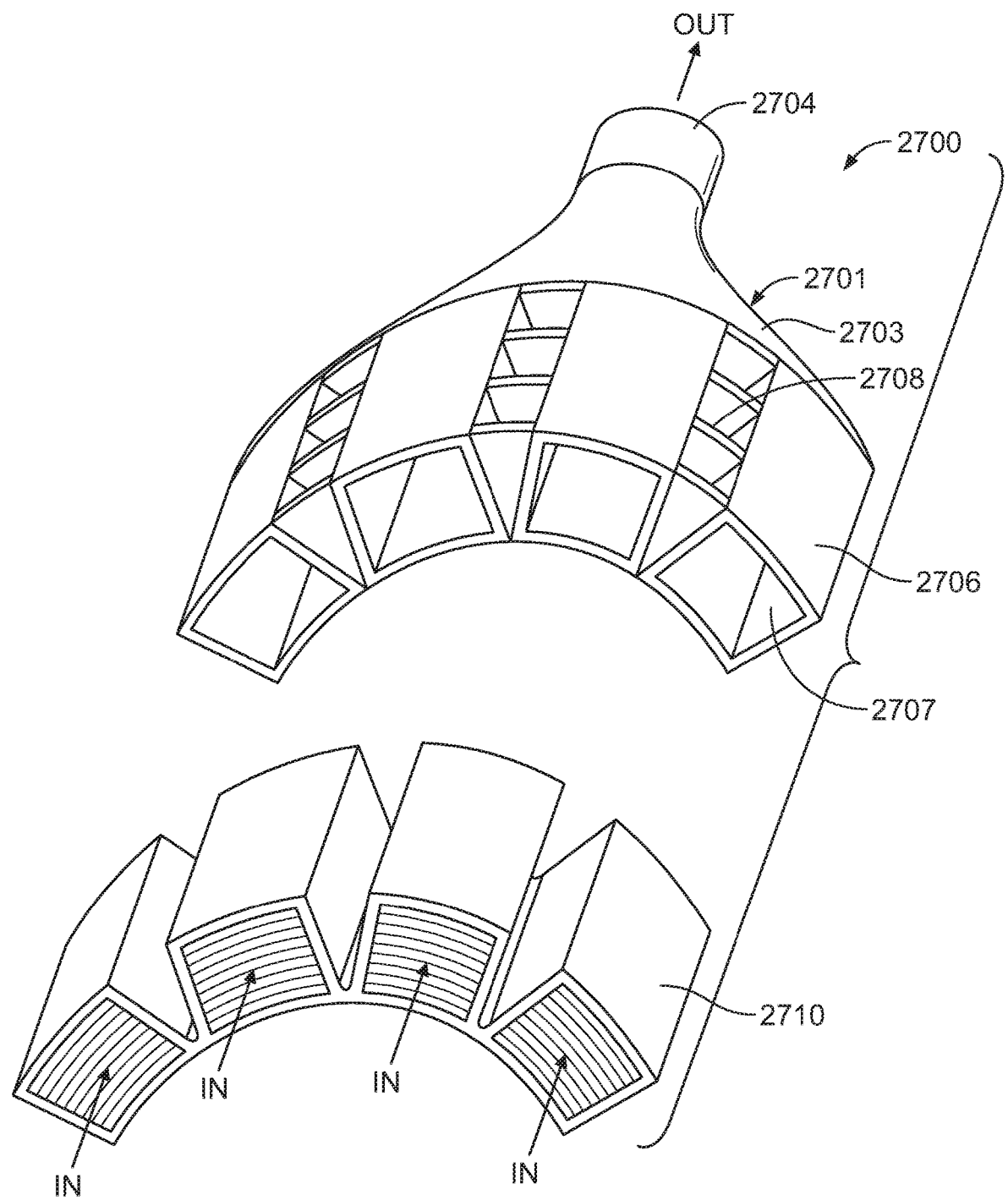
FIG. 45 is a front perspective view of a filter housing having a plurality of filter housing segments, each configured to house a filter element therein, according to an embodiment.

FIG. 45 is a front perspective view of a filter assembly 2700 including a filter housing 2701 having a plurality of filter housing segments 2706, each configured to house a filter element 2710 therein, according to an embodiment. The filter housing 2701 includes a base 2703 that has tapered cross-section that reduces in thickness to an outlet 2704. In other words, the fluid outlet 2704 has a smaller cross-section (e.g., diameter) relative to a cross-section of an end of the base 2703 opposite to the outlet 2704.

Figure 46:
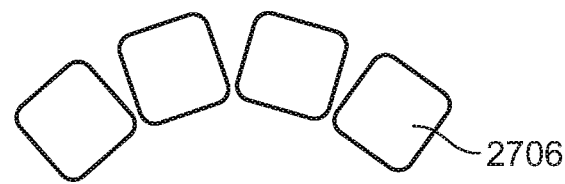
FIGS. 46-51 are schematic illustrations of various configurations of the plurality of filter housing segments shown in FIG. 45, according to various embodiments.

The filter housing 2701 also includes a plurality of filter housing segments 2706 extending from an outer periphery of the base 2703 in a direction away from the outlet 2704. Each of the plurality of filter housing segments 2706 has a rectangular cross-section and define an internal volume 2707 configured to house the filter element 2710 (e.g., any of the filter elements described herein) having a corresponding cross-section. Each of the filter housing segments 2706 is in fluid communication with the outlet 2704 through the base 2703. The filter housing segments 2706 are arranged in a semi-circular array by rotationally offsetting each filter housing segment 2706 relative to the filter housing segment 2706 disposed adjacent thereto. In other words, the plurality of filter housing segments 2706 are disposed along an arc segment, as shown in FIG. 46. Ribs 2708 are disposed between the filter housing segments 2706 to reinforce the filter housing segments 2706.

Figure 47:
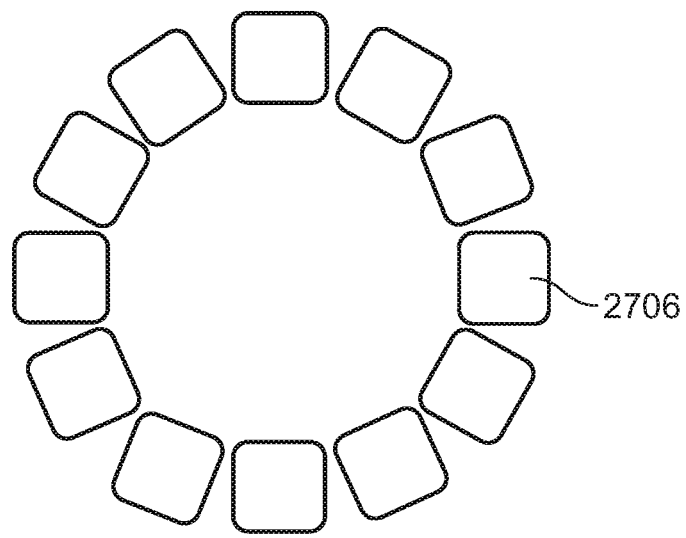
Figure 48:
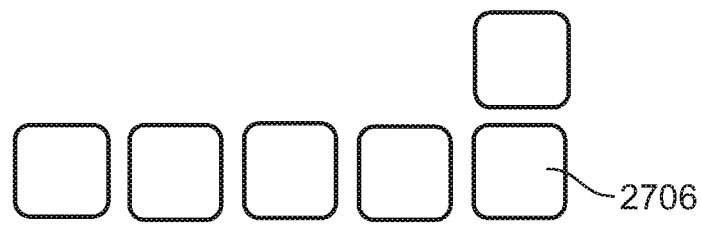
Figure 49:
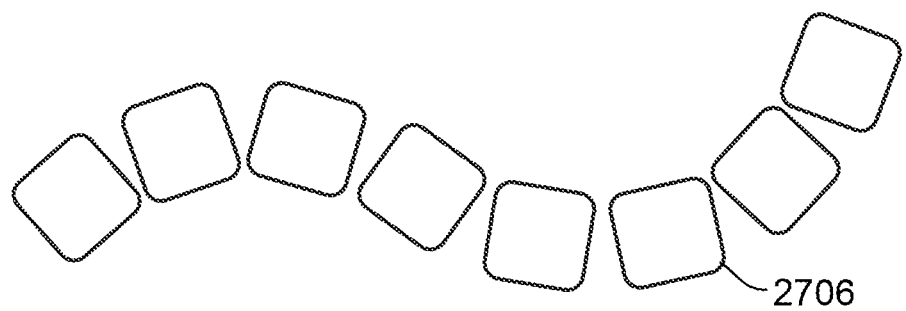
Figure 50:
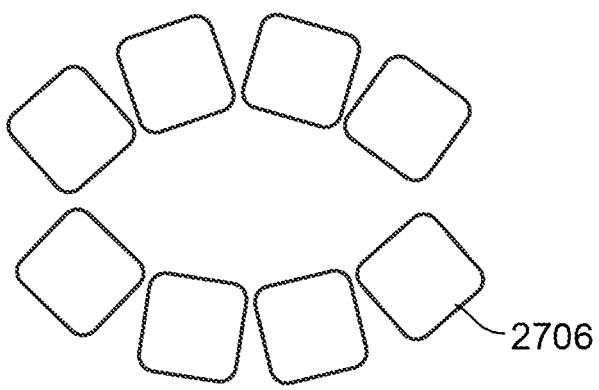
Figure 51:
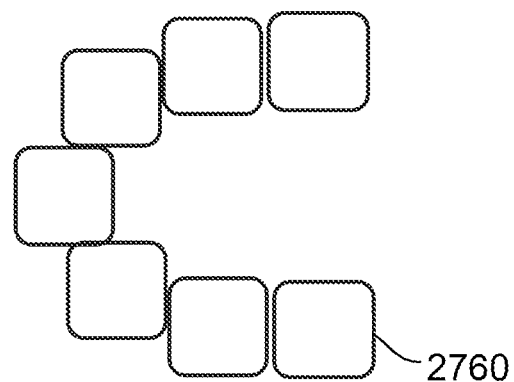
Figure 52:
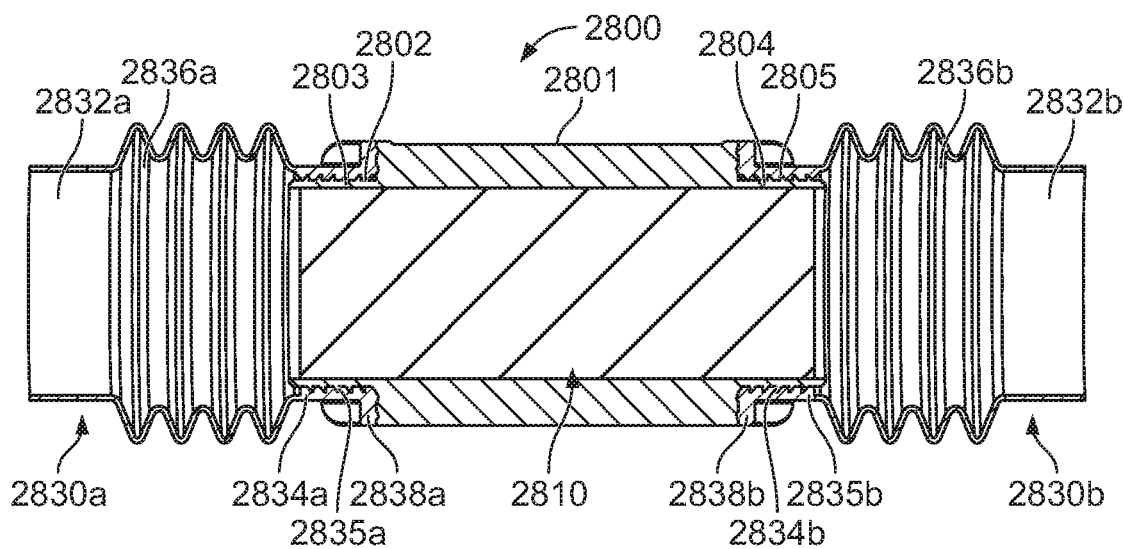
FIG. 52 is a side view of a filter assembly including a filter housing coupled to a first conduit and a second conduit, each of which have bellows defined therein, according to an embodiment.

While FIGS. 45 and 46 show the plurality of filter housing segments 2706 arranged in an arc, the plurality of filter housing segments 2706 can be disposed in any suitable configuration to form a filter housing have any suitable shape. For example, FIG. 47 shows the plurality of filter housing segments 2706 disposed in a circular array, FIG. 48 shows the plurality of filter housing segments 2706 disposed in a L shaped array, FIG. 49 shows the plurality of filter housing segments 2706 disposed in a wavy shape, FIG. 50 shows the plurality of filter housing segments 2706 disposed in an oval shape, and FIG. 51 shows the plurality of filter housing segments 2706 arranged in a C shape. In this manner, a filter housing having a plurality of filter housing segments can be arranged in any suitable configuration to obtain any suitable shape.

In various embodiments, a filter housing may be configured to serve as a turnbuckle for secure inlet and outlet conduits coupled thereto. Referring now to FIGS. 52-55, a filter assembly 2800 is shown, according to an embodiment. The filter assembly 2800 includes a filter housing 2801 defining an inner volume within which a filter element 2810 is disposed. The filter housing 2801 may be formed from any suitable material, for example, rubber, plastics, etc.

The filter housing 2801 includes a first coupling portion 2802 extending axially from a first end surface 2807, and a second coupling portion 2804 extending from a second end surface 2809 of the filter housing 2801. First housing threads 2803 are defined on the first coupling portion 2802 and may include left handed threads. Furthermore, second housing threads 2805 are defined on the second coupling portion 2804 and may include right handed threads. Thus, the first coupling portion 2802 and the second coupling portion 2804 have threads defined thereon that rotate in opposite directions to each other, analogous to a turnbuckle. Each of the first housing threads 2803 and the second housing threads 2805 can have multiple turns (e.g., provide 360 degrees of travel), and include partial turn (e.g., provide less than 360 degrees of travel).

A first conduit 2830a is coupled to the first coupling portion 2802, and a second conduit 2830b is coupled to the second coupling portion 2804, the first conduit 2830a being substantially similar to the second conduit 2830b (collectively referred to herein as "conduit 2830a/b"). The conduits 2830a/b may be formed from any suitable material, for example, rubber, plastics or polymers. The first conduit 2830a includes a first conduit inlet portion 2832a for allowing unfiltered fluid to enter the first conduit 2830a and a first conduit coupling portion 2834a defining a plurality of first conduit threads 2835a on an inner surface thereof structured to be coupled to the first housing threads 2803. Bellows 2836a are defined between the first conduit inlet portion 2832a and the first conduit coupling portion 2834a, and provide flexibility to the first conduit 2830a by allowing axial compression or extension thereof.

Similarly, the second conduit 2830b includes a second conduit outlet portion 2832b for allowing filtered fluid to be expelled from the second conduit 2830b, and a second conduit coupling portion 2834b defining a plurality of second conduit threads 2835b on an inner surface thereof structured to be coupled to the second housing threads 2805. Bellows 2836b are defined between the second conduit outlet portion 2832b and the second conduit coupling portion 2834b.

Figure 55:
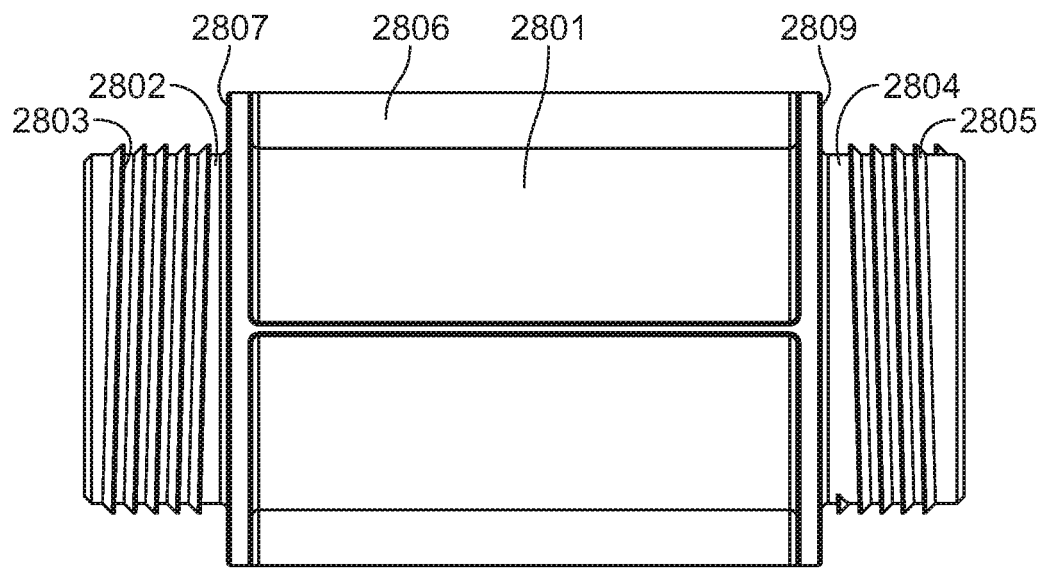
FIG. 55 is a side view of a filter housing of the filter assembly of FIG. 52.

To couple the conduits 2830a/b to the filter housing 2801, the filter housing 2801 is rotated like a turnbuckle to cause the first housing threads 2803 to engage the first conduit threads 2835a, and the second housing threads 2805 to engage the second conduit threads 2835b causing the conduits 2830a/b to axially extend at the bellows 2836a/b such that the conduits 2830a/b are under axial tension. In some embodiments, radial ribs 2806 may be provided on an outer surface of the filter housing 2801 as shown in FIG. 55, which serve as grippers to facilitate rotation of the filter housing 2801 relative to the conduits 2830*a/b*.

Figure 53:
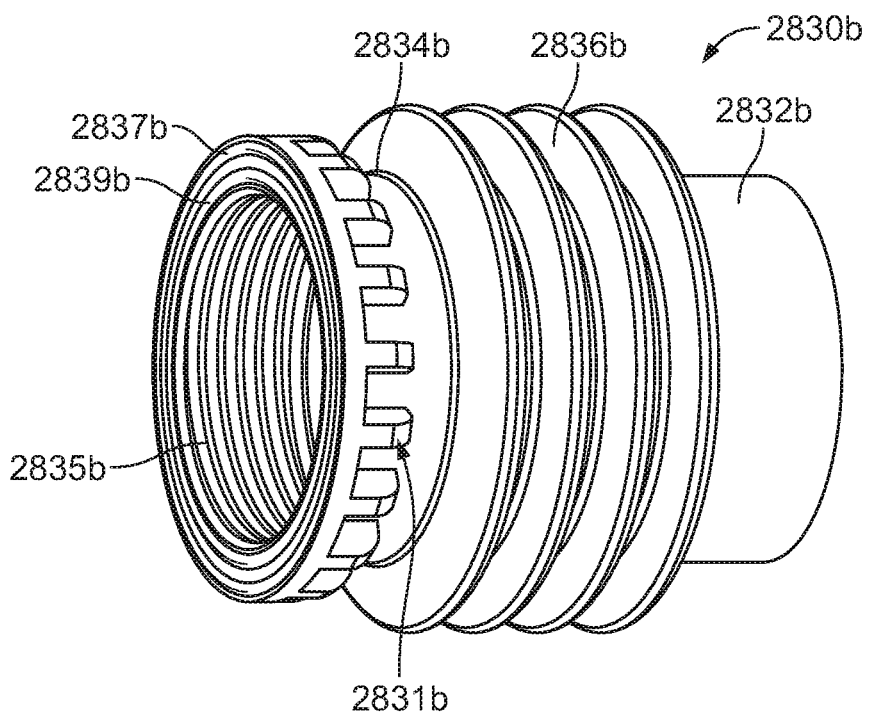
FIG. 53 is a front perspective view of the second conduit of FIG. 52.
Figure 54:
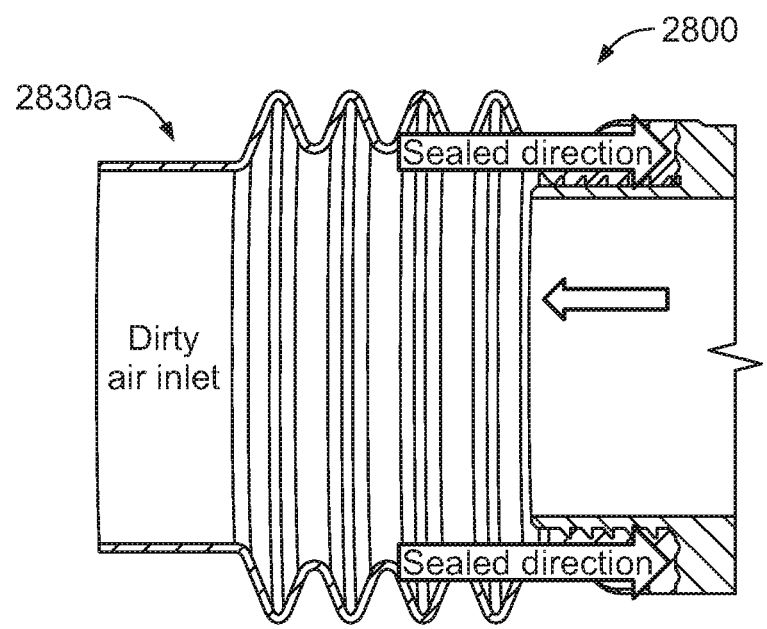
FIG. 54 is a side cross-section view of a portion of the filter assembly of FIG. 52.

FIG. 53 shows a perspective view of the second conduit 2830*b*. Sealing members 2837*b* and 2839*b* (e.g., sealing rings) are formed on an end face of the second conduit 2830*b*. Similar sealing members are also defined on an end face of the first conduit 2830*a*. A plurality of stiffening ribs 2831 are defined on an outer surface of the second conduit coupling portion 2834*b*, and may also serve as grippers. Rotation of the filter housing 2801 in a first direction relative to the conduits 2830*a/b* causes the end faces of each of the conduits 2830*a/b* to be drawn in towards the first end surface 2807 and the second end surface 2809 such that the sealing members 2837*b* and 2839*b* form an axial and/or radial seal with the second end surface 2809. Similar sealing members formed on a corresponding end surface of the first conduit 2830*a* form an axial and/or radial seal with the first end surface 2807. The filter housing 2801 can be uncoupled from the conduits 2830*a/b* by rotating the filter housing 2801 in a direction opposite to the first direction, for example, to allow replacement of the filter element 2810.

Figure 56:
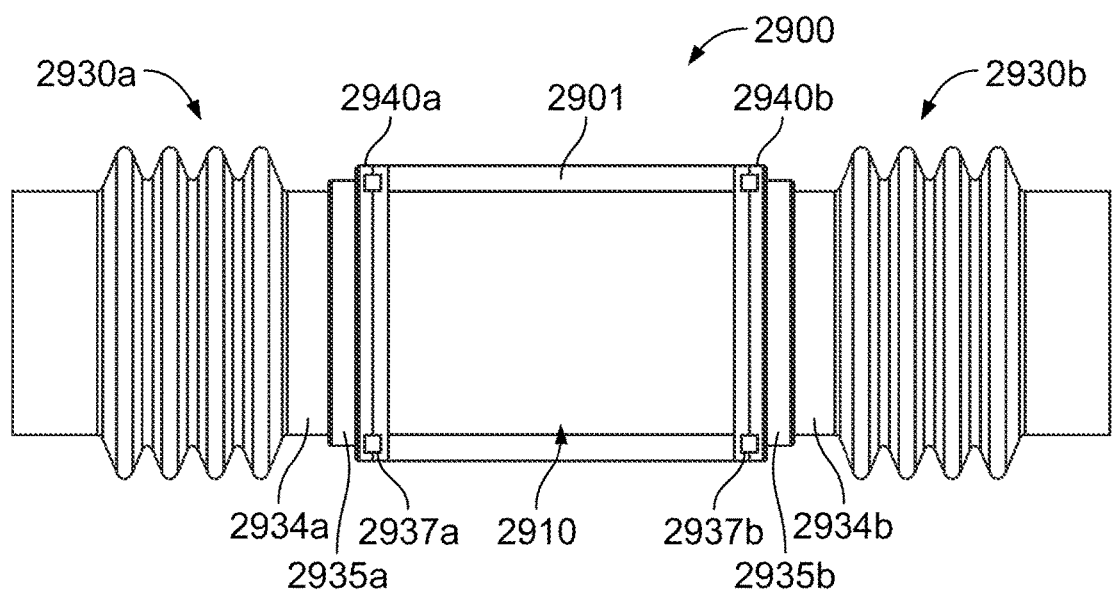
FIG. 56 is a side view of a filter assembly comprising a filter housing coupled to a first conduit and a second conduit, each of which have bellows defined therein, according to another embodiment.

FIG. 56 is a side view of a filter assembly 2900 comprising a filter housing 2901 coupled to the first conduit 2930*a* and the second conduit 2930*b*, according to another embodiment. A filter element 2910 is disposed within the filter housing 2901. A first sleeve 2935*a* and a second sleeve 2935*b* are over molded over a first conduit coupling portion 2934*a* and a second conduit coupling portion 2934*b* of the first conduit 2930*a* and the second conduit 2930*b*, respectively. The sleeves 2935*a/b* are configured to overlap corresponding coupling portions of the filter housing 2901 and may be coupled thereto, e.g., friction fit or snap-fit thereto. Sealing members 2937*a/b* (e.g., a die cut gasket or an O-ring) is disposed between the sleeves 2935*a/b* and end surfaces of the filter housing 2901, and form an axial seal to prevent leakage.

Figure 57:
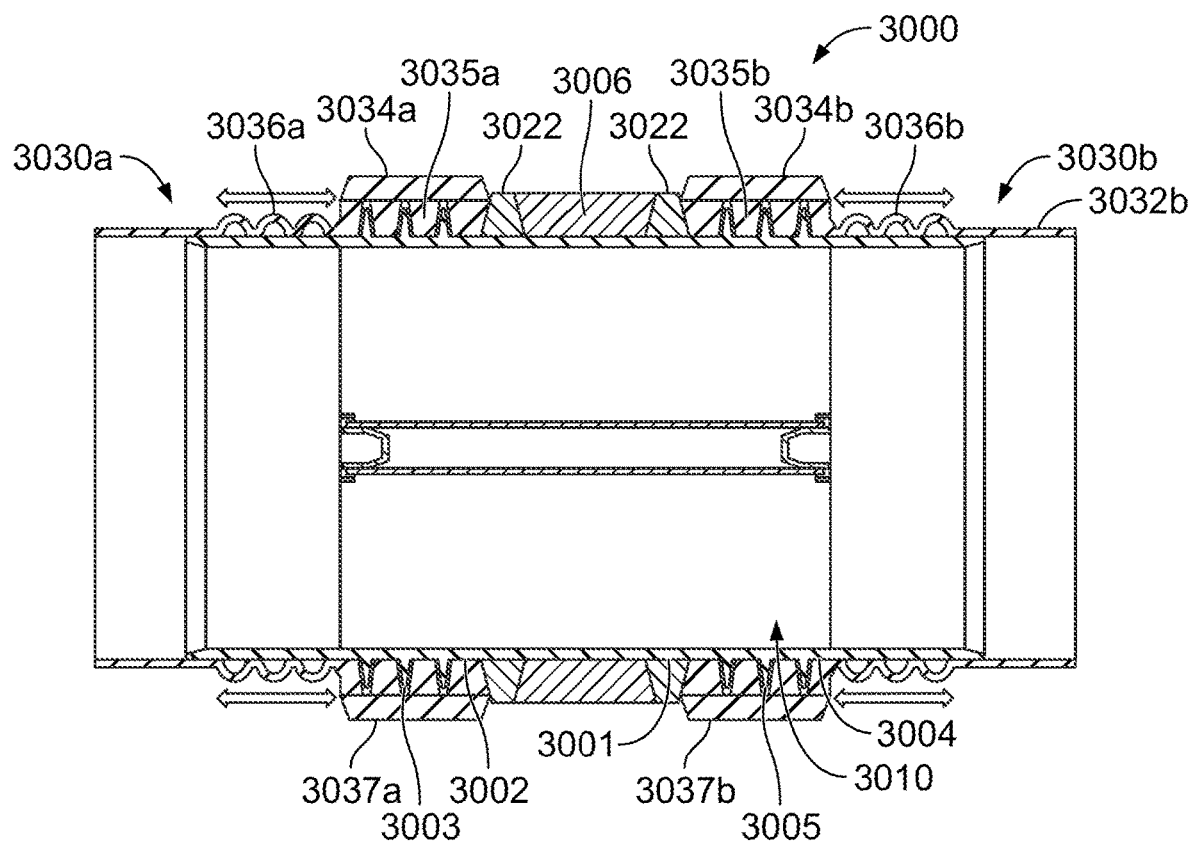
FIG. 57 is a side cross-section view of a filter assembly comprising a filter housing coupled to a first conduit and a second conduit, each of which have bellows defined therein, according to still another embodiment.

FIG. 57 is a side cross-section view of a filter assembly 3000 comprising a filter housing 3001 coupled to a first conduit 3030*a* and a second conduit 3030*b*, according to still another embodiment. A filter element 3010 is disposed within the filter housing 3001. The filter housing 3001 includes a first coupling portion 3002 and a second coupling portion 3004 that extend into the first conduit 3030*a* and the second conduit 3030*b*, respectively. First housing threads 3003 and second housing threads 3005 are defined circumferentially on the first coupling portion 3002 and the second coupling portion 3004. A radial rib 3006 protrudes radially from an outer surface of the filter housing 3001 and serves as a gripper for facilitating rotation of the filter housing 3001.

The conduits 3030*a/b* have bellows 3036*a/b* defined along a length thereof. A first conduit coupling portion 3034*a* of the first conduit 3030*a* is configured to be disposed circumferentially around the first coupling portion 3002, and a second conduit coupling portion 3034*b* of the second conduit 3030*b* is configured to be disposed around the second coupling portion 3004. First conduit threads 3035*a* and second conduit threads 3035*b* are configured to couple to the first housing threads 3003 and the second housing threads 3005, respectively. Grippers 3037*a/b* are formed on an outer surface of the conduit coupling portions 3034*a/b* and structured to facilitate rotation of the conduits 3030*a/b* relative to the filter housing 3001. Dove tail seals 3022 are disposed between ends of the conduits 3030*a/b* and the rib 3006 formed on the outer surface of the filter housing 3001, and form axial and/or radial seal therebetween.

Figure 58:
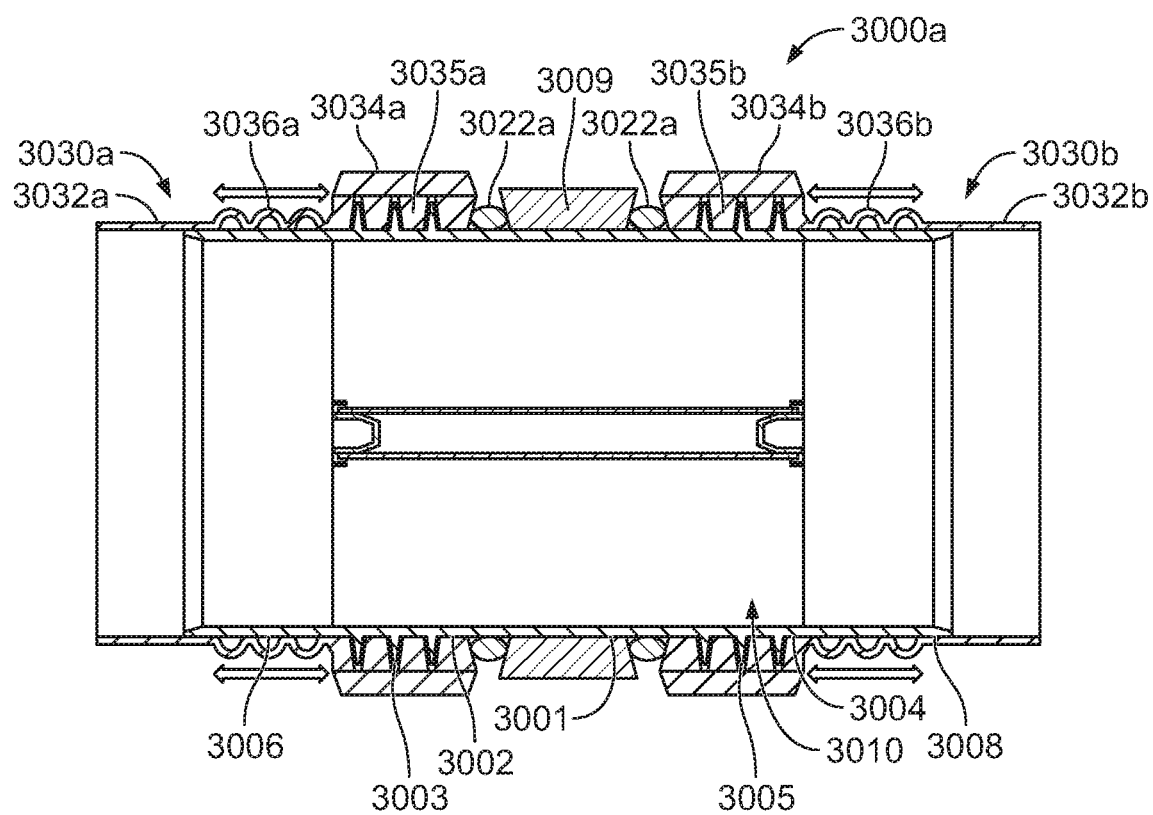
FIG. 58 is a side cross-section view of a filter assembly comprising a filter housing coupled to a conduit having bellows defined therein, according to yet another embodiment.

FIG. 58 is a side cross-section view of a filter assembly 3000*a*, according to yet another embodiment. The filter assembly 3000*a* is similar to the filter assembly 3000 with a difference that instead of the dove tail seals 3022, axial compression seals 3022*a* are used.

Figure 59:
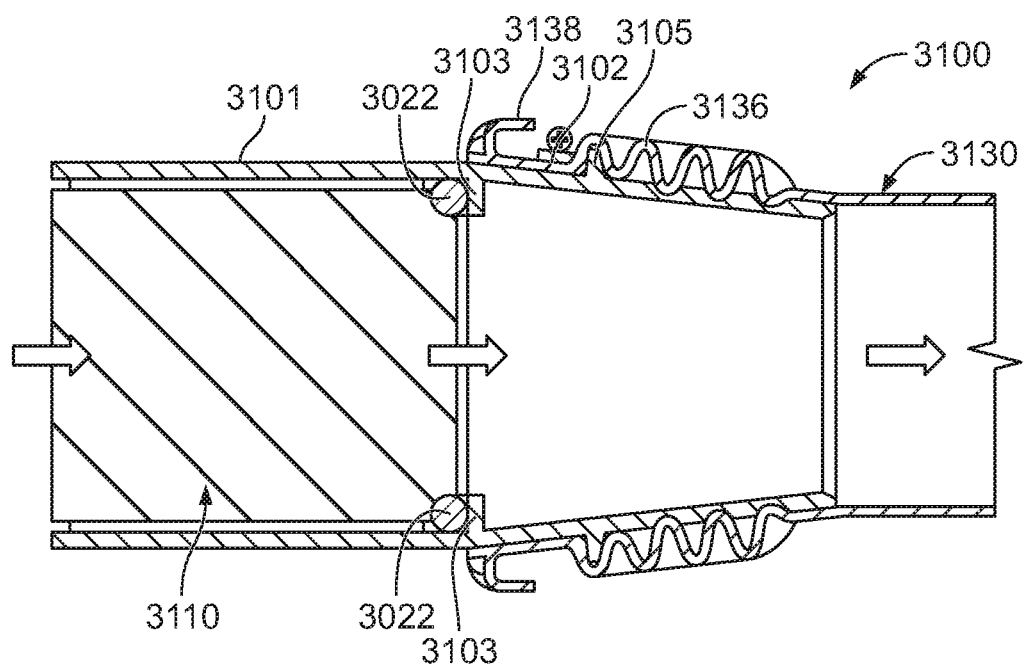
FIG. 59 is a side cross-section view of a filter assembly comprising a filter housing coupled to a first conduit and a second conduit, each of which have bellows defined therein, according to still another embodiment.

FIG. 59 is a side cross-section view of a filter assembly 3100 comprising a filter housing 3101 coupled to a conduit 3130, according to still another embodiment. A filter element 3110 (e.g., comprising a tetrahedral filter media) is disposed within the filter housing 3101. A circumferential ledge 3103 protrudes radially inwards from an inner surface of the filter housing 3101. The filter element 3110 is positioned proximate to the ledge 3103 and a sealing member 3122 is positioned between the filter element 3110 and the ledge 3103.

A circumferential rib 3105 is formed on an outer surface of a coupling portion 3102 of the filter housing 3101 downstream of the filter element 3110. The conduit 3130 is disposed circumferentially around the coupling portion 3102. Bellows 3136 are defined in the conduit 3130 and are configured to engage the circumferential rib 3105 so as to secure the conduit 3130 to the filter housing 3101. Surfaces of the bellows 3136 in contact with an outer surface of the filter housing coupling portion 3102 also form radial seals therewith. A handle 3138 is formed at an end of the conduit 3030 which can be engaged by a user to either mount the conduit 3130 onto the filter housing 3101 or uncouple the conduit 3130 therefrom.

Figure 60:
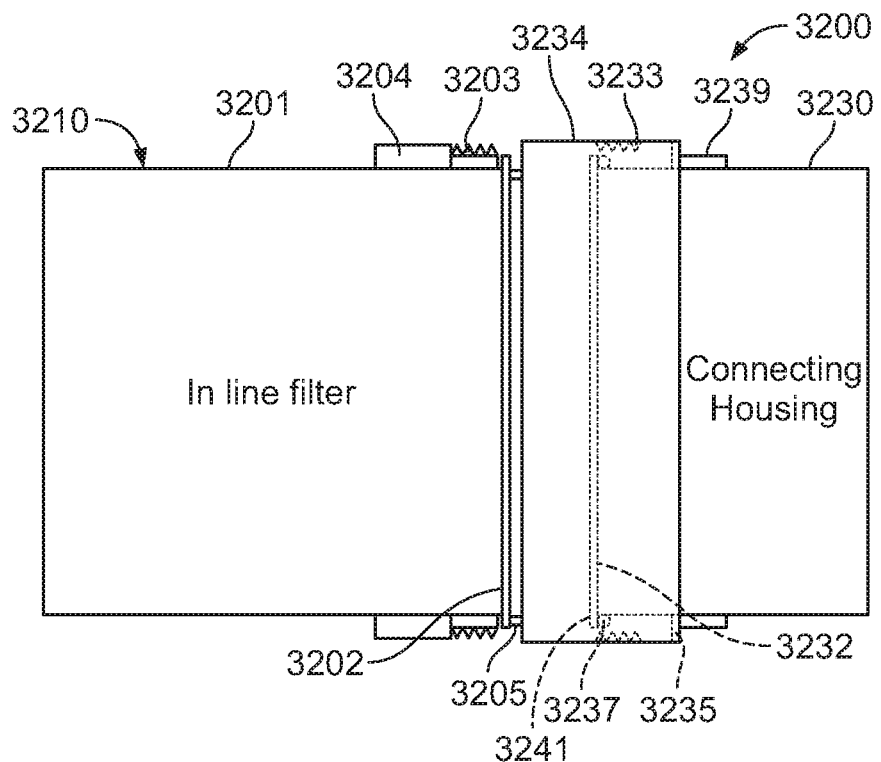
FIG. 60 is a side view of a filter element configured to be coupled to a conduit, according to an embodiment.

FIG. 60 is a side view of a filter assembly 3200 comprising a filter element 3210 configured to be coupled to a conduit 3230, according to an embodiment. The filter element 3210 may be disposed in a filter housing 3201, for example, formed by a polymeric layer, as previously described herein. A circumferential rib 3204 is formed on an outer surface of the filter housing 3201, and filter housing threads 3203 are defined between the rib 3204 and a filter housing end surface 3202 of the filter housing 3201. A first sealing member 3205 is disposed on the filter housing end surface 3202.

The conduit 3230 (e.g., a connecting housing) includes a collar 3234 disposed circumferentially around an outer surface of the conduit 3230 proximate to a conduit end surface 3232 that faces the filter element 3210. An inner cross-section of the collar 3234 corresponds to an outer cross-section of the filter housing 3201 at the rib 3204. Collar threads 3233 are defined on an inner surface of the collar 3234 and structured to mate with the filter housing threads 3203. A conduit rib 3239 is formed around the conduit 3230 inwards of the collar 3234. The collar 3234 also includes a collar sidewall 3235 projecting radially from a rim of the collar 3234 that is distal from the filter element and may contact the conduit 3230.

A circumferential conduit ledge 3241 protrudes radially outwards from an inner rim of the conduit 3230 located proximate to the filter element 3210. A second sealing member 3237 is disposed circumferentially around the conduit 3230 adjacent to the conduit ledge 3241. The collar 3234 is slidingly disposed on the conduit 3230 and configured slide axially between the conduit rib 3239 and the conduit ledge 3241, the conduit rib 3239 and the conduit ledge 3241 serving as motion limiters by engaging the collar sidewall 3235 so as to define an extent of motion of the collar 3234.

Figure 61:
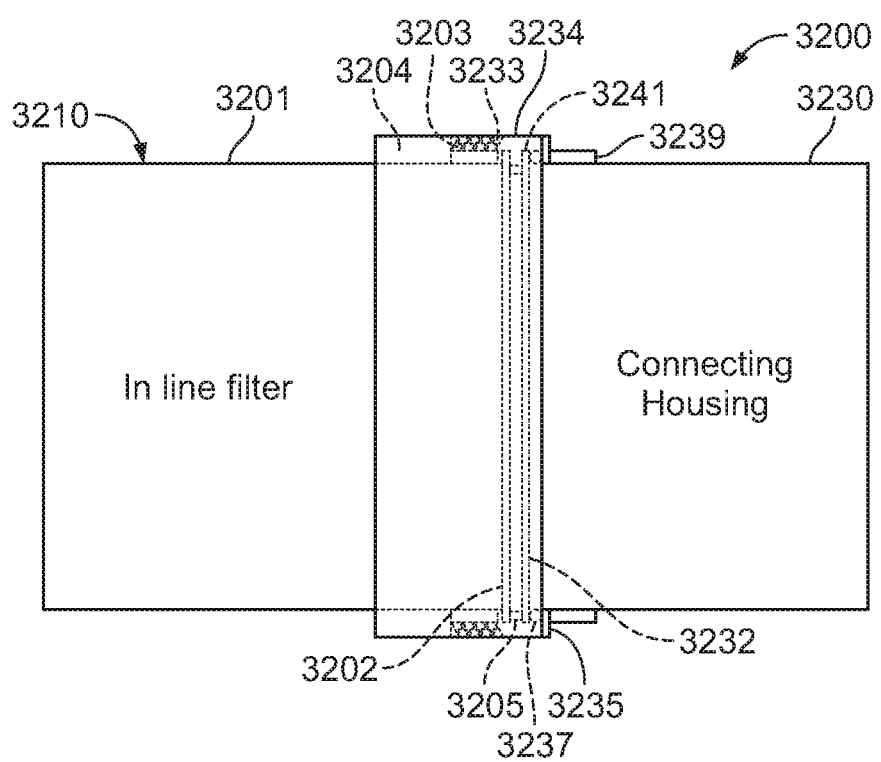
FIG. 61 is the side view of the filter element coupled to the conduit.

FIG. 60 shows the filter element 3210 before being coupled to the conduit 3230, and FIG. 61 shows a side view of the filter element after being coupled to the conduit 3230. To couple the conduit 3230 to the filter element 3210, the collar 3234 is axially displaced such that at least a portion of the collar 3234 overlaps the filter housing 3201. The collar 3234 is then rotated about the conduit 3230 to cause the collar threads 3233 to engage the filter housing threads 3203. The collar 3234 slides along the outer surface of the conduit 3230 until the collar sidewall 3235 engages the second sealing member 3237 disposed adjacent to the conduit ledge 3241. The collar sidewall 3235 pulls the conduit 3230 towards the filter element 3210 until the first sealing member 3205 contacts and forms an axial seal with the conduit end surface 3232, and the second sealing member 3237 is squeezed between the collar sidewall 3235 and the conduit ledge 3241 so as to form an axial seal therebetween, and may additionally form a radial seal between the inner surface of the collar 3234 and the outer surface of the conduit 3230.

In various embodiments, simple axial and/or radial sealing members may be used to seal any of the filter media packs or filter elements described herein. For example, axial and/or radial sealing members may be used to provide axial or radial fluid sealing of outer surfaces of the various filter elements described herein to inner surfaces of housings within which the filter elements are disposed, and/or to filter heads that the housing may be coupled to.

Figure 62:
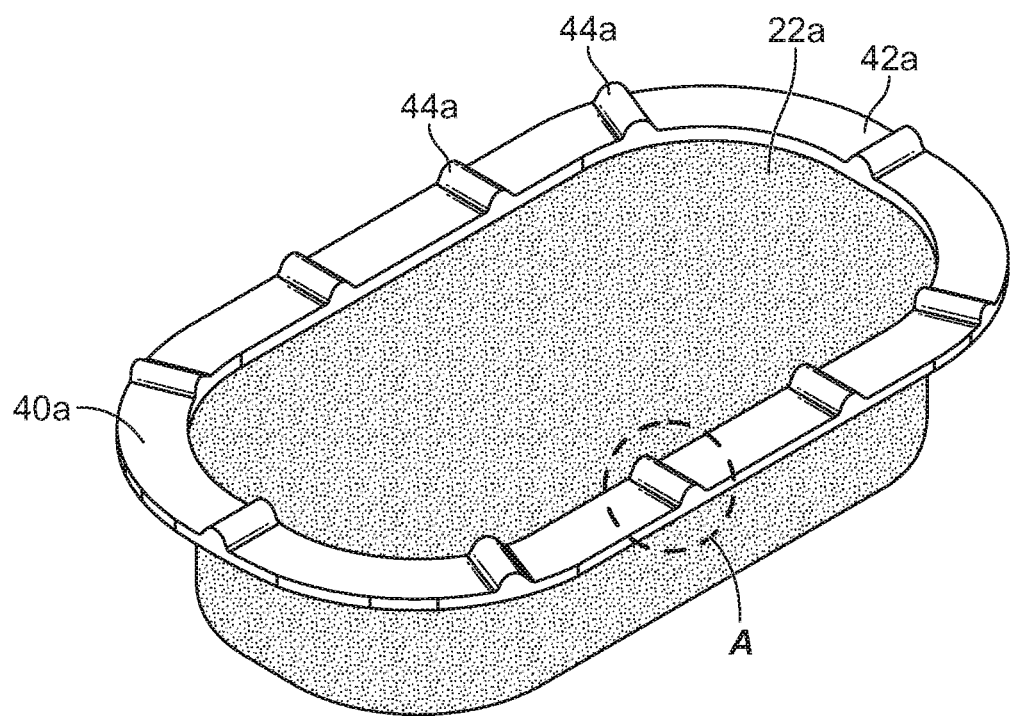
FIG. 62 is a top perspective view of a sealing member coupled to a filter media pack, according to an embodiment.
Figure 63:
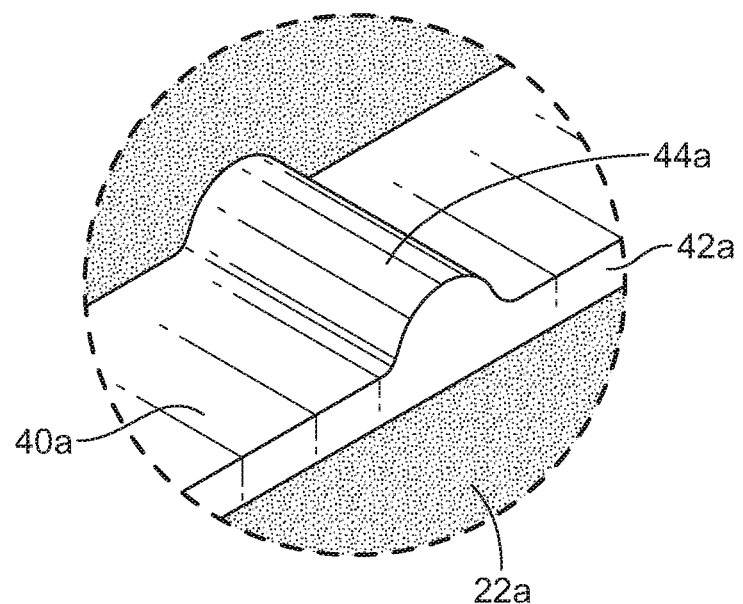
FIG. 63 is an enlarged view of a portion of the sealing member of FIG. 62 indicated by the arrow A in FIG. 62.

In other embodiments, complex shaped axial or radial sealing members may be used to seal the various filter elements described herein. For example, in some embodiments, the sealing member may include a humped arched gasket described, for example, in U.S. Pat. No. 8,061,530 (incorporated by reference herein in its entirety). For example, a sealing member includes a keyed interface as shown at 40a in FIG. 62. FIG. 62 is a perspective view of filter element 22a having a border 42a which may be composed of gasket material itself or may have a gasket added thereto. The keyed interface 40a permits installation or replacement of only an authorized filter element 22a mating to the mating interface. The keyed interface permits installation or replacement of the filter element only in a given orientation. The filter element 22a has a border configured to mate with a housing having corresponding grooves at a gasket 42a therebetween and providing the noted mating interface. The gasket 42a and at least one of the housing and the filter element 22a engage each other in detent relation providing the noted keyed interface. The gasket 42a extends along an extension direction along a perimeter. The gasket 42a has one or more projections (such as the humped arches such as 44a as shown in FIGS. 62 and 63), spaced along the perimeter and extending transversely of the noted extension direction. The housing may have one or more concave recessed slits configured to complementally receive respective projections therein. The projections and slits may be regularly or irregularly spaced, and may be symmetric or non-symmetric around the perimeter. In one embodiment, gasket 42a is in-molded to and integral with filter element 22a. The plurality of projections and the plurality of concave recessed slits defined in the housing may be in complemental detent relation engagement and may be selectively spaced along the perimeter to provide dimensional stability of the housing at the gasket 42a in sealing relation along the border. At least one of the sides, shape and spacing of at least the set of one or more projections and the set of one or more concave recessed slits may be selectively configured to allow a one-way fit of the filter element 22a in the housing to ensure correct installation every time. In various embodiments, the keyed interface may include a frame (e.g., a polymer frame) with the projections molded in the gasket 42a disposed thereon, or the projections may be formed directly in a polymeric layer disposed directly on a filter media pack, as previously described herein.

Figure 64A:
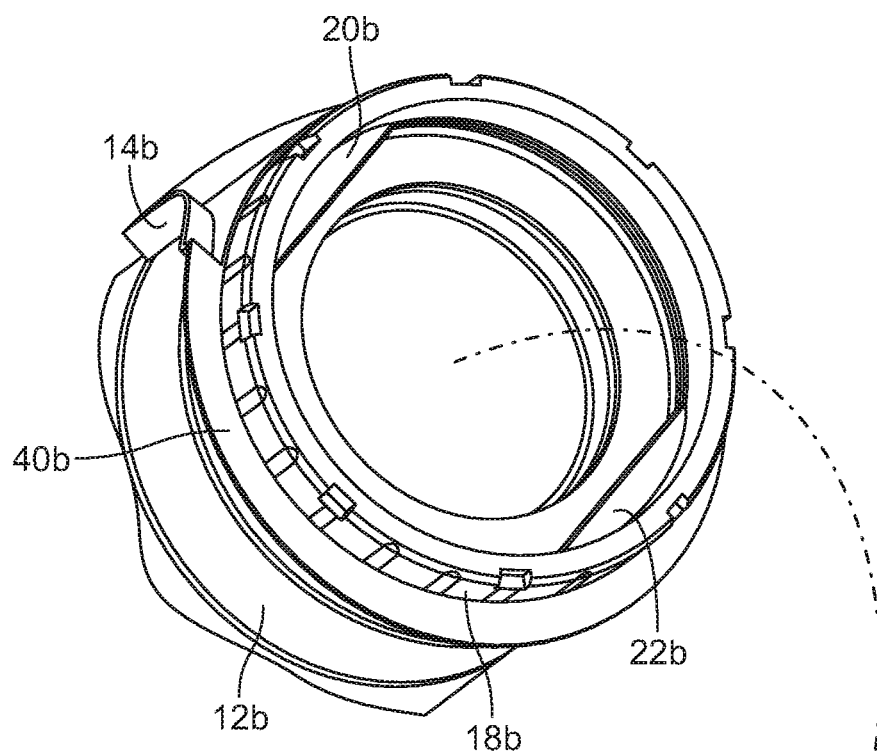
FIG. 64A and 64B illustrate one embodiment of an end seal cap of a filter element and a corresponding and mating end cap of a housing chamber.
Figure 64B:
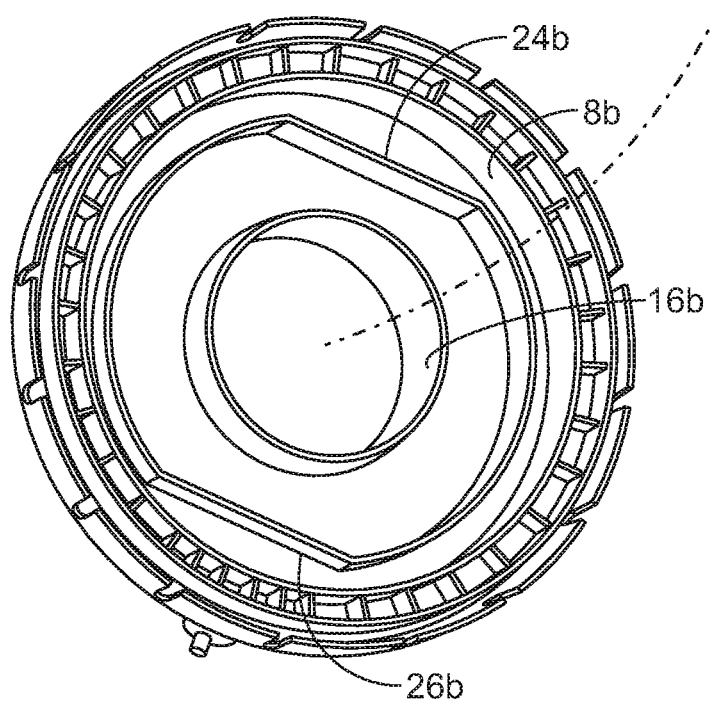

In some embodiments, a sealing member may include a chorded end seal cap as described in U.S. Pat. No. 9,498,743 that is incorporated by reference herein in its entirety. For example, FIGS. 64A and 64B illustrate one embodiment of an end seal cap 18b of a filter element 12b and a corresponding and mating end cap 8b of a housing chamber having an outlet 16b for emitted air. The end seal cap 18b of the filter element 12b includes internal chords 20b, 22b, which mate with corresponding internal chords 24b, 26b on the end cap 8b of a housing chamber and orient the filter element 12b within the housing chamber, for example, such that the ramp 14b aligns with the inlet 6b of the housing chamber. The shape bounded by the internal chords and inner perimeter of the circle formed by the end seal cap 18b may be any shape (e.g., a non-circular shapes such as an oval, rectangle with rounded corners, racetrack, etc. to facilitate proper orientation of the element). In various embodiments, the end seal cap 18b may include a frame (e.g., a polymer frame) with the internal chords 20b, 22b molded in a gasket 42a disposed thereon, or the internal chords 20b, 22b may be formed directly in a polymeric layer disposed directly on a filter media pack, as previously described herein.

Figure 65:
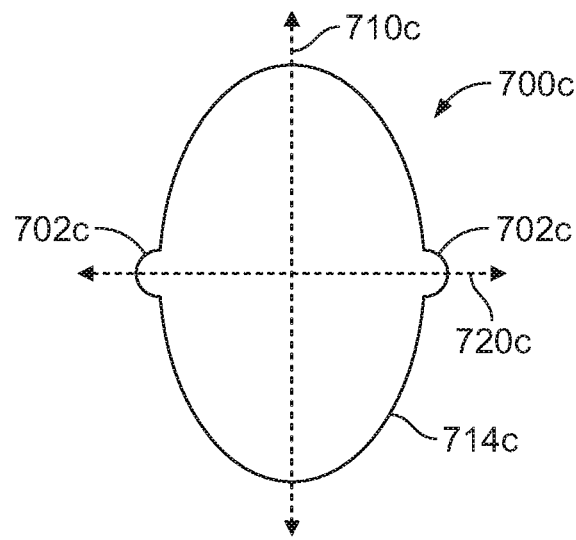
FIG. 65 shows a schematic view of a seal member profile for use with a filter element, according to another embodiment.

In some embodiments, any of the filter elements or filter media packs described herein may be sealed in a housing using an oval shaped or any other shaped sealing member having various profiles as described in International Patent Application No. PCT/US2018/063976 that is incorporated by reference herein in its entirety. For example, referring to FIGS. 65-68, various embodiments of seal member profiles are shown. Referring to FIG. 65, a seal member profile 700c is shown according to an example embodiment. The seal member profile 700c includes two protrusions 702c (e.g., outwardly curved surfaces) formed on the outer perimeter 714c. The protrusions 702c are positioned on the transverse axis 720c and symmetrically about both the longitudinal axis 710c and the transverse axis 720c such that filter element could be rotated to two positions for installation onto a filter housing (e.g., two degrees of freedom for proper installation).

Figure 66:
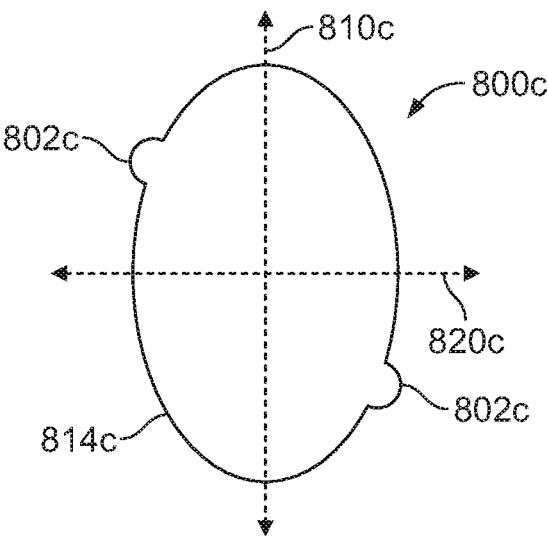
FIG. 66 shows a schematic view of a seal member profile for use with a filter element, according to another embodiment.

Referring to FIG. 66, a seal member profile 800c is shown according to another example embodiment. The seal member profile 800c includes two protrusions 802c (e.g., outwardly curved surfaces) formed on the outer perimeter 814c. The protrusions 802c are not symmetrically positioned about the longitudinal axis 810c or the transverse axis 820c. However, the protrusions 802c are positioned such that the filter element could be rotated to two positions for installation onto a filter housing (e.g., two degrees of freedom for proper installation).

Figure 67:
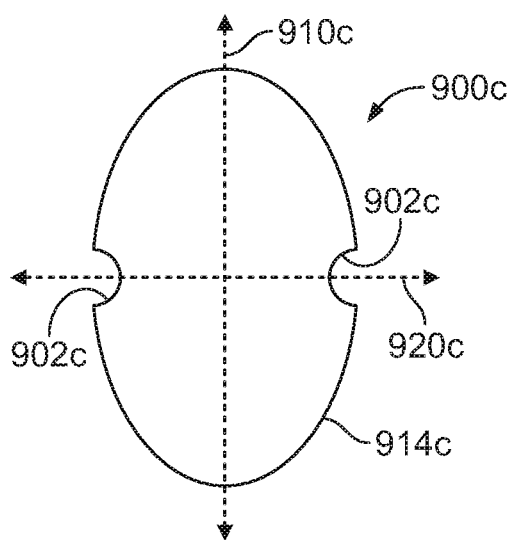
FIG. 67 shows a schematic view of a seal member profile for use with a filter element, according to another embodiment.

Referring to FIG. 67, a seal member profile 900c is shown according to still another example embodiment. The seal member profile 900c includes two recesses 902c (e.g., inwardly curved surfaces) formed on the outer perimeter 914c. The recesses 902c are positioned on the transverse axis 920c and symmetrically about both the longitudinal axis 910c and the transverse axis 920c such that the filter element could be rotated to two positions for installation onto a filter housing (e.g., two degrees of freedom for proper installation).

Figure 68:
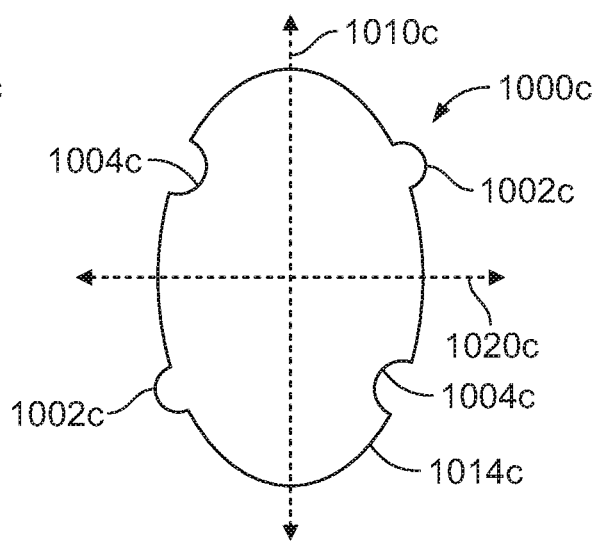
FIG. 68 shows a schematic view of a seal member profile for use with a filter element, according to another embodiment.

Referring to FIG. 68, a seal member profile 1000c is shown according to yet another example embodiment. The seal member profile 1000c includes two protrusions 1002c (e.g., outwardly curved surfaces) and two recesses 1004c (e.g., inwardly curved surfaces) formed on the outer perimeter 1014c. The protrusions 1002c and recesses 1004c are not symmetrically positioned above the longitudinal axis 1010c or the transverse axis 1020c. However, the protrusions 1002c and recesses 1004c are positioned such that the filter element could be rotated to two positions for installation onto a filter housing (e.g., two degrees of freedom for proper installation). Other various combinations of protrusions and recesses can be used to aid in alignment of a seal with a corresponding sealing interface.

Figure 69:
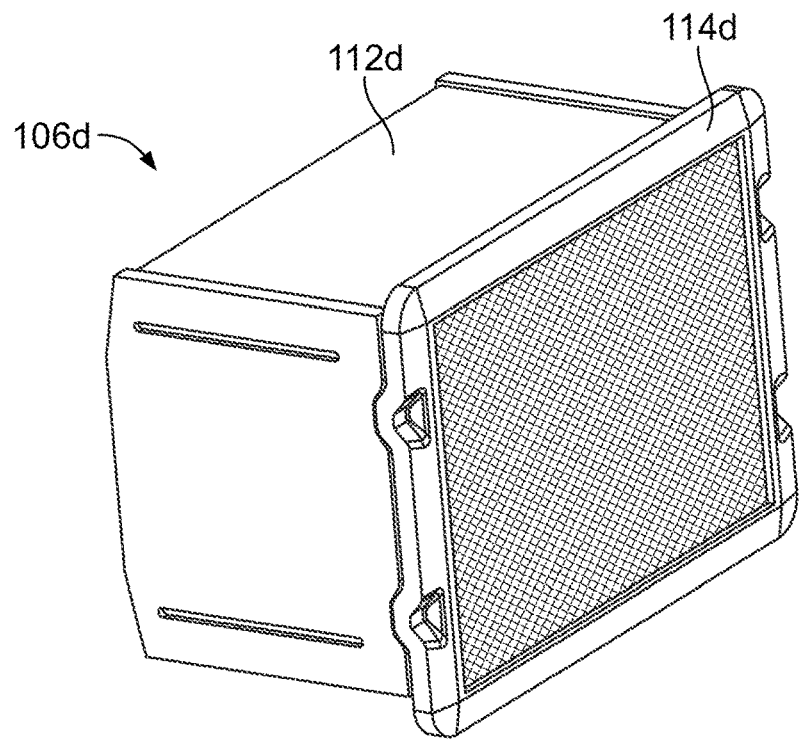
FIG. 69 shows a perspective view of a filter element including a sealing member, according to an embodiment.

In some embodiments, any of the filter elements or filter media pack described herein may be sealed via a sealing member as described in PCT Application No. PCT/US2018/018696, the entire disclosure of which is incorporated herein by reference in its entirety. For example, a perspective view of a filter element 106d is shown in FIG. 69. The filter element 106d comprises filter media pack 112d and a seal member 114d. The filter media pack 112d include, for example, pleated filter media pack arranged in a panel or pleat block or a filter media pack including tetrahedral filter media. Although shown as being generally rectangular in shape, the filter element 106d may be arranged in other shapes, such as a cylinder, an oval, or the like.

The seal member 114d is comprised of may be attached to the filter media pack 112d with an adhesive, such as polyurethane. In some arrangements, the seal member 114d includes an embedded frame member or stiffening member to help maintain the shape of the seal member 114d. In further or additional arrangements, the seal member 114d is connected to the filter media pack 112d through an intermediate frame member, such as a circumferential support. As described in further detail below, the seal member 114d generally includes both planar portions and non-planar portions (i.e., curved, arched, contoured, portions comprised of multiple intersecting sub-portions, etc.) portions configured to interact with matching planar and curved surfaces of a corresponding housing and the cover. The seal member 114d is an axial seal member configured to form a seal with the housing and the cover such that fluid being filtered through a filtration system including the filter element 106d cannot bypass the filter element 106d.

Figure 70:
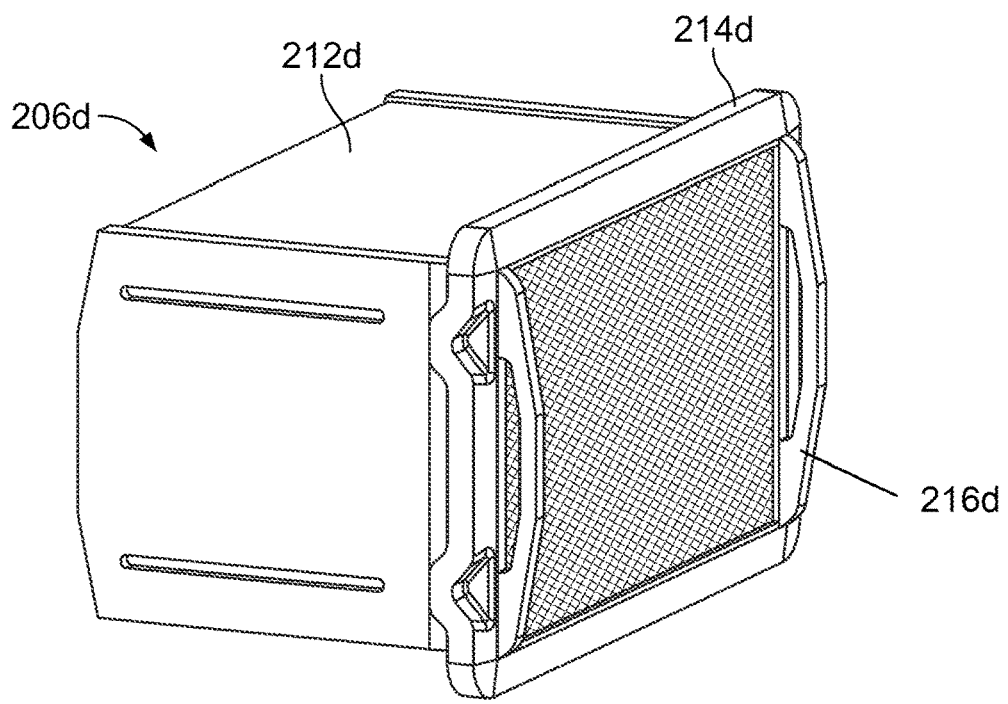
FIG. 70 shows a perspective view of a filter element including a sealing member, according to another embodiment.

FIG. 70 shows a portion of the filter element 206d, according to another embodiment, that is configured to be disposed in a housing. The filter element 206d comprises filter media pack 212d and a seal member 214d. The filter media pack 212d may be substantially similar to the filter media pack 112d, as previously described herein. The seal member 214d is comprised of and may be attached to the filter media pack 212d with an adhesive, such as polyurethane. In some arrangements, the seal member 214d may include an embedded frame member or stiffening member to help maintain the shape of the seal member 214d. In further or additional arrangements, the seal member 214d is connected to the filter media pack 212d through an intermediate frame member, such as a circumferential support.

As described in further detail below, the seal member 214d generally includes both planar portions and non-planar portions (i.e., curved, arched, contoured, portions comprised of multiple intersecting sub-portions, etc.) portions configured to interact with matching planar and curved surfaces of a corresponding housing and cover. The seal member 214d may be an axial seal member configured to form a seal with the housing and the cover such that fluid being filtered through a filtration system including the filter element 206d cannot bypass the filter element 206d.

The filter element 206d may be substantially similar in structure and function to the filter element 106d apart from the following difference. The filter element 206d also comprises a plurality of handles 216d extending axially from an end of the filter element 206d. In some embodiments, the plurality of handles 216d may be coupled to the seal member 214d or monolithically formed therewith (e.g., molded with the seal member 214d). In other embodiments, the plurality of handles 216d may be coupled to the intermediate frame member or any other support structure of the filter element 206d. The plurality of handles 216d may facilitate insertion and/or removal of the filter element 206d from the central compartment of the housing 202d.

Figure 71:
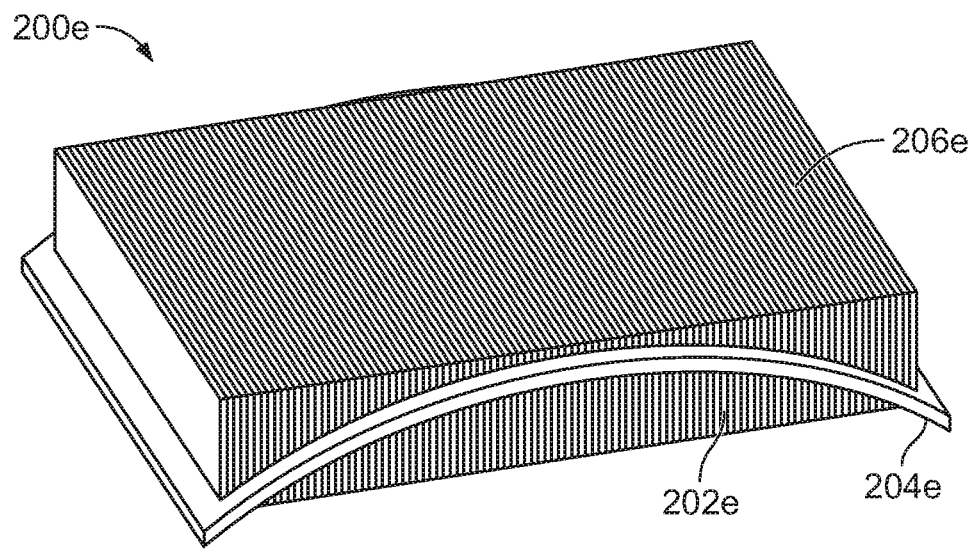
FIG. 71 shows a perspective view of a filter element including a seal member, according to an embodiment.

In some embodiments, a seal member for sealing a filter element and/or a filter media pack may include twists, turns or varying thickness as described in International Patent App. No. PCT/US2018/026671 (incorporated by reference herein in its entirety). Referring to FIG. 71, a perspective view of a filter element 200e is shown according to an example embodiment. The filter element 200e generally comprises a filter media pack 202e and a seal member 204e. The filter media pack 202e may include a pleated filter media pack but in other embodiments may include a filter media pack including tetrahedral filter media. Each face or side of the filter media pack 202e is generally planar in shape. Accordingly, the filter media pack 202e forms a right rectangular cuboid. The filter media pack 202e has a first face 206e and a second face (not shown) opposite the first face 206e and generally parallel to the first face 206e. In some arrangements, the first face 206e is an inlet face and the second face is an outlet face. In such arrangements, air to be filtered flows into the pleat block 202e through the first face 206e, passes through the filter media, and out of the filter media pack 202e through the second face. In other arrangements, the first face 206e is an outlet face, and the flow through the filter media pack 202e is reversed. The filter element 200e is substantially rigid such that the shape of the filter element 200e and the filter media pack 202e is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the filter media pack 202e edges with a stiffening agent, such as BASF® Elastocast 55090, polyurethane, edge bonding, etc.).

The seal member 204e wraps around the filter media pack 202e as shown in FIG. 71. The seal member 204e may be formed from and/or attached to the filter media pack 202e with an adhesive (e.g., polyurethane). The seal member 204e is comprised of a flexible material, such as urethane, and is configured to be compressed against a housing to form a seal against a housing. Two lengths of the seal member 204e are arched (i.e., curved) along one axis. The arched lengths of the seal member 204e are configured to interact with complimentarily arched or curved surfaces of a filter housing.

Figure 72:
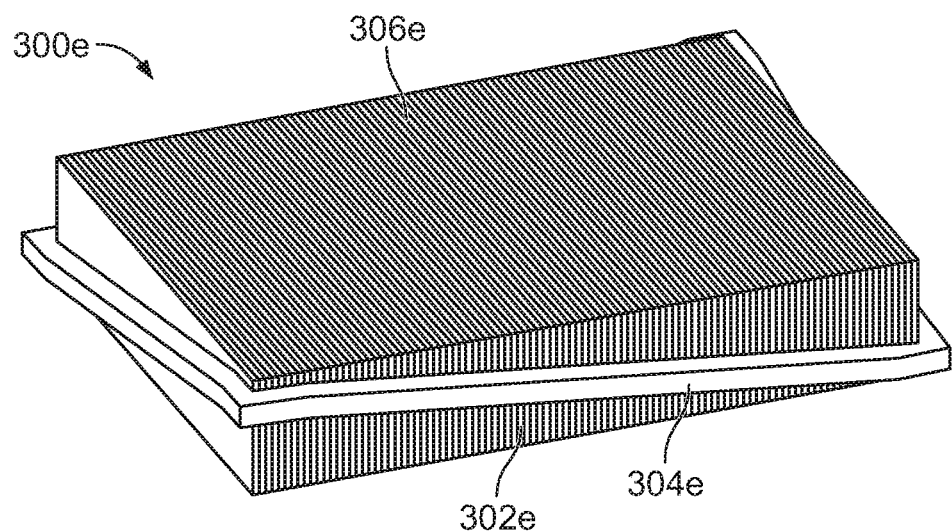
FIG. 72 shows a perspective view of a filter element including a seal member, according to another embodiment.

Referring to FIG. 72, a perspective view of a filter element 300e is shown according to an example embodiment. The filter element 300e generally comprises a filter media pack 302e and a seal member 304e. The filter media pack 302e may include a pleated filter media pack but in other embodiments may include a filter media pack including tetrahedral filter media. Each face or side of the filter media pack 302e is generally planar in shape. Accordingly, the filter media pack 302e forms a right rectangular cuboid. The filter media pack 302e has a first face 306e and a second face (not shown) opposite the first face 306e and generally parallel to the first face 306e. In some arrangements, the first face 306e is an inlet face and the second face is an outlet face. In such arrangements, air to be filtered flows into the filter media pack 302e through the first face 306e, passes through the filter media, and out of the filter media pack 302e through the second face. In other arrangements, the first face 306e is an outlet face, and the flow through the filter media pack 302e is reversed. The filter element 300e is substantially rigid such that the shape of the filter element 300e and the filter media pack 302e is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the filter media pack 302e edges with a stiffening agent, such as BASF® Elastocast 55090, polyurethane, edge bonding, etc.).

The seal member 304e wraps around the filter media pack 302e as shown in FIG. 72. The seal member 304e may be formed from and/or attached to the filter media pack 302e with an adhesive (e.g., polyurethane). The seal member 304e is comprised of a flexible material, such as urethane, and is configured to be compressed against a housing to form a seal against a housing. Each length of the seal member 304e is angled or curved with respect to an axis. The angled or curved lengths of the seal member 304e are configured to interact with complimentarily arched or curved surfaces of a filter housing.

Figure 73:
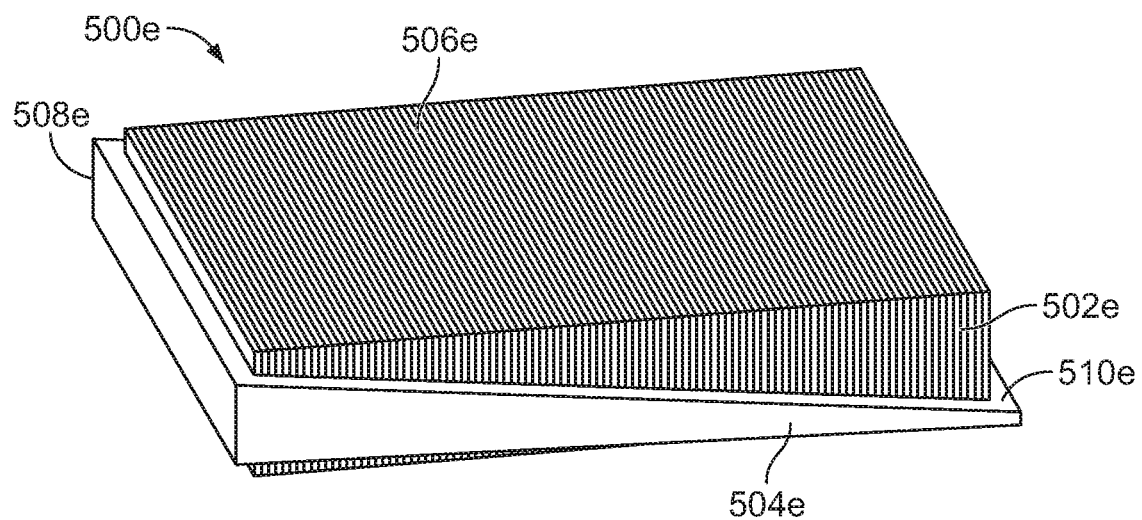
FIG. 73 shows a perspective view of a filter element including a seal member, according to still another embodiment.

Referring to FIG. 73, a perspective view of a filter element 500e is shown according to still another example embodiment. The filter element 500e is a panel filter element. The filter element 500e generally comprises a filter media pack 502e and a seal member 504e. The filter media pack 502e may include a pleated filter media pack but in other embodiments may include a filter media pack including tetrahedral filter media. Each face or side of the filter media pack 502e is generally planar in shape. Accordingly, the filter media pack 502e forms a right rectangular cuboid. The filter media pack 502e has a first face 506e and a second face (not shown) opposite the first face 506e and generally parallel to the first face 506e. In some arrangements, the first face 506e is an inlet face and the second face is an outlet face. In such arrangements, air to be filtered flows into the filter media pack 502e through the first face 506e, passes through the filter media, and out of the filter media pack 502e through the second face. In other arrangements, the first face 506e is an outlet face, and the flow through the filter media pack 502e is reversed. The filter element 500e is substantially rigid such that the shape of the filter element 500e and the filter media pack 502e is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the filter media pack 502e edges with a stiffening agent, such as BASF® Elastocast 55090, polyurethane, edge bonding, etc.).

The seal member 504e wraps around the filter media pack 502e as shown in FIG. 73. The seal member 504e may be formed from and/or attached to the filter media pack 502e with an adhesive (e.g., polyurethane) or through a compressive press fit. The seal member 504e is comprised of a flexible material, such as urethane, and is configured to be compressed against a housing to form a seal against a housing. Two lengths of the seal member 504e7 are angled with respect to the plane defined by the first face 506e. Additionally, the thickness of the seal member 504e varies from a thick end 508e to a thin end 510e. The angled lengths of the seal member 504e are configured to interact with complimentarily arched or curved surfaces of a filter housing.

While FIGS. 62-73 show various seal members, other seal members that includes features of one or more of the seal members described herein are contemplated. For example, seal members may include non-planar seal members as described in FIGS. 71-73 that also include the humped arches 44a of FIGS. 62-63, the chords 24b, 26b described with respect to FIGS. 64A-64B, seal member profiles as described with respect to FIGS. 65-68, or seal members 114d, 214d including notches as described with respect to FIGS. 69-70.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

What is claimed is:

1. A filter element, comprising:
a core having a non-circular core cross-sectional shape; and
a filter media pack comprising a plurality of filter media layers stacked on an outer periphery of the core such that the filter media pack has a filter media pack cross-sectional shape that corresponds to the non-circular core cross-sectional shape, the plurality of filter media layers comprising a first filter media layer and a second filter media layer, the first filter media layer comprising a first layer inlet edge, a first layer outlet edge, a first layer first edge extending between the first layer inlet edge and the first layer outlet edge, and a first layer second edge extending between the first layer inlet edge and the first layer outlet edge, the second filter media layer comprising a second layer inlet edge, a second layer outlet edge, a second layer first edge extending between the second layer inlet edge and the second layer outlet edge, and a second layer second edge extending between the second layer inlet edge and the second layer outlet edge, wherein the first layer inlet edge and the second layer inlet edge define an inlet surface, the first layer outlet edge and the second layer outlet edge define an outlet surface, the first layer first edge is aligned with the second layer first edge and the first layer second edge is aligned with the second layer second edge.

2. The filter element of claim 1, wherein each of the core cross-sectional shape and the filter media pack cross-sectional shape is triangular.

3. The filter element of claim 1, further comprising a sealing member, and wherein the sealing member comprises planar portions and non-planar portions configured to interact with matching planar and curved surfaces of a corresponding housing.

4. The filter element of claim 3, wherein the sealing member is an axial sealing member configured to form a seal with the housing.

5. The filter element of claim 4, wherein the sealing member comprises an embedded frame member to maintain a shape of the sealing member.

6. The filter element of claim 1, wherein the filter media pack comprises:
a plurality of sidewalls parallel to a flow axis of the filter element; and
a polymeric layer disposed on at least one sidewall of the plurality of sidewalls.

7. The filter element of claim 1, wherein the plurality of filter media layers have different lengths.

8. The filter element of claim 1, further comprising a sealing member comprising a flexible material configured to be compressed against a housing to form a seal against the housing.

9. The filter element of claim 1, wherein the core has a cross-sectional shape of one of a parallelogram and a rhombus.

10. The filter element of claim 1, wherein the core is hollow.

11. A filter element, comprising:
a core having a non-circular core cross-sectional shape; and
a filter media pack comprising a plurality of filter media layers stacked on an outer periphery of the core such that the filter media pack has a filter media pack cross-sectional shape that corresponds to the non-circular core cross-sectional shape, an edge of a first filter media layer of the plurality of filter media layers is aligned with a corresponding edge of a second filter media layer of the plurality of filter media layers,
wherein the filter media pack includes a plurality of sidewalls, and wherein at least one sidewall of the plurality of sidewalls is formed by corresponding edges of the plurality of filter media layers to define a curvature.

12. A filter element, comprising:
a core having a non-circular core cross-sectional shape, the core comprising:
a central shaft extending from a first shaft end to a second shaft end; and
a plurality of circumferential ribs each protruding radially from the central shaft; and
a filter media pack comprising a plurality of filter media layers stacked on an outer periphery of the core such that the filter media pack has a filter media pack cross-sectional shape that corresponds to the non-circular core cross-sectional shape.

13. The filter element of claim 12, wherein the central shaft has a circular cross section.

14. The filter element of claim 13, wherein each of the plurality of circumferential ribs have a triangular cross-section.

15. The filter element of claim 13, wherein the plurality of circumferential ribs are spaced at fixed intervals along the central shaft.

16. The filter element of claim 12, wherein the core further comprises:
a first circumferential rib of the plurality of circumferential ribs disposed at a first end of the central shaft; and
a rib sidewall extending from outer edges of the first circumferential rib and away from the central shaft such that a cavity is defined by the first circumferential rib and the rib sidewall, wherein the cavity is configured to receive a corresponding shaped pin or key.

17. A filter element, comprising:
a core having a non-circular core cross-sectional shape; and
a filter media pack comprising a plurality of filter media layers stacked on an outer periphery of the core such that the filter media pack has a filter media pack cross-sectional shape that corresponds to the non-circular core cross-sectional shape, an edge of a first filter media layer of the plurality of filter media layers is aligned with a corresponding edge of a second filter media layer of the plurality of filter media layers,
wherein the filter media pack has a concave-shaped inlet surface.

18. The filter element of claim 17, wherein an outlet surface of the media pack has a convex shape.

19. A filter element, comprising:
a core having a non-circular core cross-sectional shape; and
a filter media pack comprising a plurality of filter media layers stacked on an outer periphery of the core such that the filter media pack has a filter media pack cross-sectional shape that corresponds to the non-circular core cross-sectional shape, an edge of a first filter media layer of the plurality of filter media layers is aligned with a corresponding edge of a second filter media layer of the plurality of filter media layers,
wherein the plurality of filter media layers are stacked such that an inlet surface of the media pack defines a first chevron shape projecting inwards from the core.

20. The filter element of claim 19, wherein the plurality of filter media layers are stacked such that an outlet surface of the media pack defines a second chevron projecting outwards from the core.

* * * * *